(12) United States Patent
Davies et al.

(10) Patent No.: US 12,074,993 B2
(45) Date of Patent: Aug. 27, 2024

(54) METHOD OF USING A BLOCKCHAIN

(71) Applicant: NCHAIN LICENSING AG, Zug (CH)

(72) Inventors: Jack Owen Davies, London (GB); Daniel Joseph, Cardiff (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 207 days.

(21) Appl. No.: 17/771,407

(22) PCT Filed: Oct. 12, 2020

(86) PCT No.: PCT/IB2020/059570
§ 371 (c)(1),
(2) Date: Apr. 22, 2022

(87) PCT Pub. No.: WO2021/079225
PCT Pub. Date: Apr. 29, 2021

(65) Prior Publication Data
US 2022/0400020 A1    Dec. 15, 2022

(30) Foreign Application Priority Data
Oct. 24, 2019  (GB) ...................... 1915444

(51) Int. Cl.
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0825* (2013.01); *H04L 9/3236* (2013.01); *H04L 9/3247* (2013.01)

(58) Field of Classification Search
CPC ....... H04L 9/50; H04L 9/0825; H04L 9/3236; H04L 9/3247; H04L 2209/30;
(Continued)

(56) References Cited

U.S. PATENT DOCUMENTS 11,907,677 B1 * 2/2024 Borhany ................. G06F 40/51
2008/0075286 A1   3/2008 Kim et al.
(Continued)

FOREIGN PATENT DOCUMENTS

WO    2018215947    11/2018
WO    2019100845     5/2019

OTHER PUBLICATIONS

GB1915444.2 Combined Search and Examination Report dated Apr. 8, 2020.
(Continued)

*Primary Examiner* — Huan V Doan
(74) *Attorney, Agent, or Firm* — Messner Reeves LLP

(57) ABSTRACT

Contributions to a work by contributors having respective levels in a defined hierarchy are recorded in one or more blockchain transactions. One or more lower-level contributors provide, to a higher-level contributor, one or more lower-level contributions respectively, and the higher-level contributor provides a higher-level contribution responsive to the one or more lower-level contributions. A higher-level contributor transaction comprises one or more inputs, which in turn comprise: one or more pointers to one or more spendable outputs of one or more lower-level contributor transactions and one or more transaction signatures. The transactions contain contributions commitments which, together with the one or more pointers, represent the relationship between the higher-level contributor and the lower-level contributors within the defined hierarchy. The one or more transaction signatures prove that relationship.

20 Claims, 27 Drawing Sheets

(58) Field of Classification Search
CPC . H04L 2209/56; H04L 9/3255; H04L 9/3271; G06F 21/64; G06Q 10/103
See application file for complete search history.

(56) References Cited

U.S. PATENT DOCUMENTS

| | | |
|---|---|---|
| 2011/0158405 A1 | 6/2011 | Choi et al. |
| 2017/0272250 A1 | 9/2017 | Kaliski, Jr. |
| 2019/0028276 A1 | 1/2019 | Pierce |
| 2019/0190701 A1* | 6/2019 | Mitra .................. G06N 5/022 |
| 2019/0236562 A1 | 8/2019 | Padmanabhan |

OTHER PUBLICATIONS

PCT/IB2020/059570 International Search Report and Written Opinion dated Jan. 13, 2021.

Anonymous: Merkle tree—Wikipedia, Oct. 30, 2018 (Oct. 30, 2018), XP055667313, Retrieved from the Internet: URL: https://en.wikipedia.org/w/index.php?title=Merkle tree&oldid=866395282.

* cited by examiner

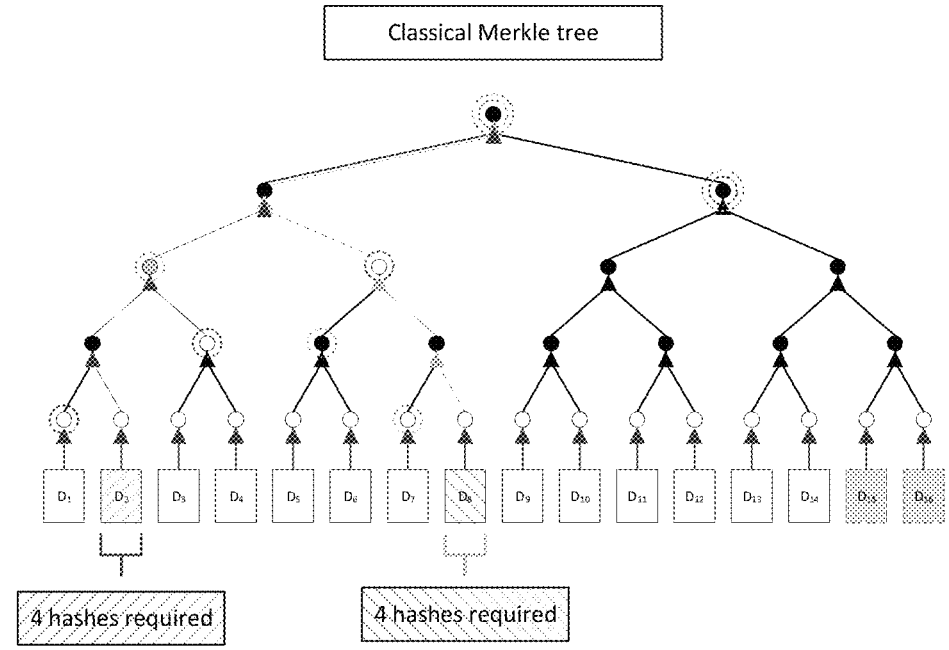
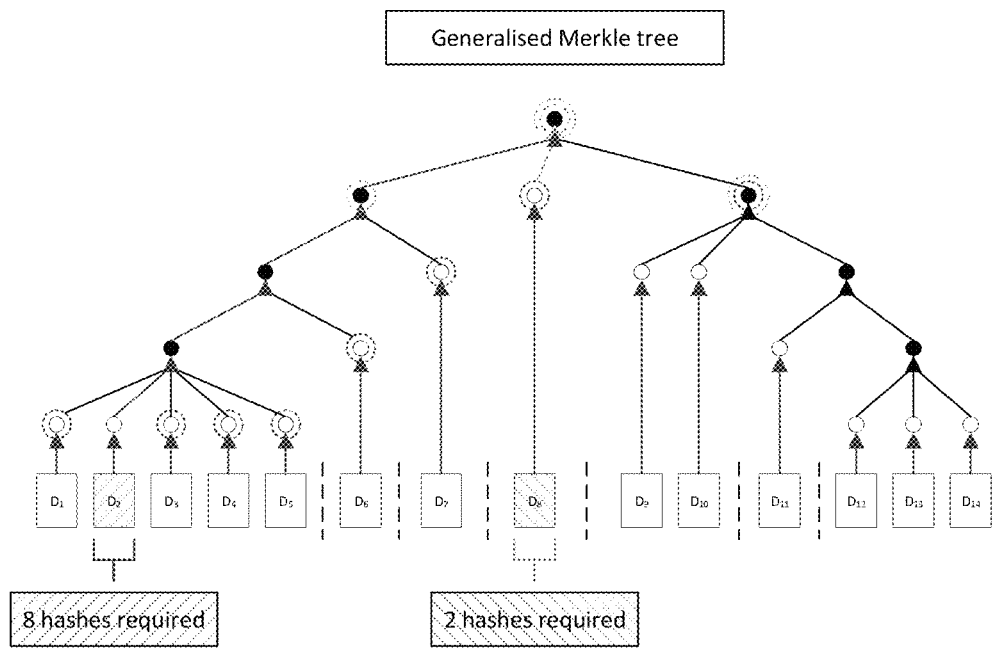
Figure 11

METHOD OF USING A BLOCKCHAIN

CROSS REFERENCE TO RELATED APPLICATIONS

This application is the U.S. National Stage of International Application No. PCT/IB2020/059570 filed on Oct. 12, 2020, which claims the benefit of United Kingdom Patent Application No. 1915444.2, filed on Oct. 24, 2019, the contents of which are incorporated herein by reference in their entireties.

TECHNICAL FIELD

The present disclosure discloses a particular new tier-two application of a blockchain, i.e. secondary functionality added on top of a blockchain.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks. New blocks are created by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, then the transaction (including any user data) will thus remain stored at each of the nodes in the P2P network as an immutable public record.

The miner who successfully solved the proof-of-work puzzle to create the latest block is typically rewarded with a new transaction called a "generation transaction" which generates a new amount of the digital asset. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it nor include it for mining into a block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. The state is modified by running smart-contracts which are included in transactions and run when the transactions are validated by nodes of the blockchain network.

SUMMARY

It would be desirable to harness the benefits of blockchain to provide an immutable record of a work to which multiple contributions are made by different contributors. A technical challenge in this context is that of adequately recording a potentially complex history of contributions by contributors in a potentially complex hierarchy.

The present disclosure provides what may be referred to herein as a "collaborative attestation protocol", in which a set of blockchain transactions is constructed in a way that, advantageously, captures the hierarchical relationship between contributions in terms of spending relationships between those transactions. This is an efficient way of recording the transactions at it utilizes much of the structure that is already present in the transactions, thus reducing the amount of additional data that needs to be included in the transactions in order to fully record the hierarchy of contributions in a cryptographically robust manner (e.g. as unspendable outputs or "dummy" operands of a multi-operand opcode).

A first aspect provides a computer-implemented method of recording, in one or more blockchain transactions, contributions to a work by contributors having respective levels in a defined hierarchy, in which one or more lower-level contributors provide, to a higher-level contributor, one or more lower-level contributions respectively, and the higher-level contributor provides a higher-level contribution responsive to the one or more lower-level contributions, the method comprising: at computer equipment of the higher-level contributor, creating or modifying a higher-level contributor transaction to evidence the higher-level contribution, the created or modified higher-level contributor transaction comprising: one or more inputs comprising: one or more pointers to one or more spendable outputs of one or more lower-level contributor transactions, the one or more lower-level contributor transactions containing one or more lower-level contribution commitments evidencing the one or more lower-level contributions respectively, and one or more transaction signatures of the higher-level contributor satisfying one or more signature challenges of the one or more spendable outputs, wherein the higher-level contributor transaction contains a higher-level contribution commitment computed from the higher-level contribution, wherein the one or more pointers and the contribution commitments represent the relationship between the higher-level contributor and the lower-level contributors within the defined hierarchy, and the one or more transaction signatures prove that relationship.

The contribution commitments (which may for example be contribution hashes) and the transaction pointer(s) represent the contributions and their hierarchical relationships as a form of tree data structure (e.g. a form of hash tree, as explained in greater detail below). The method uses transactions as a conduit, harnessing their "built-in" transactions in order to immutably timestamp the passing of information through the hierarchy, i.e. by leveraging the standard transaction signature properties of the blockchain.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
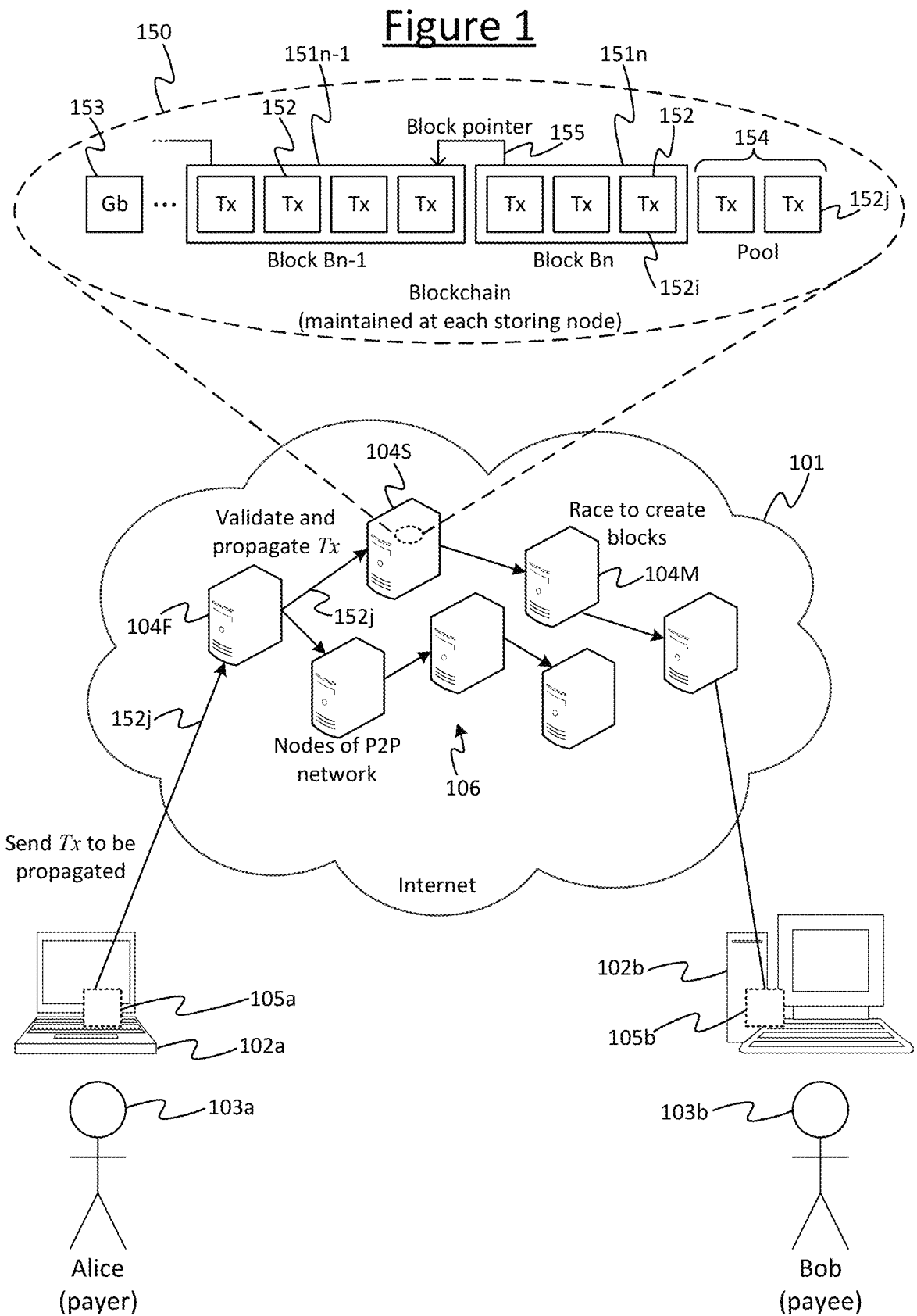
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152j according to the node protocol. Another condition for a transaction to be valid is that the output of the preceding transaction 152i which it attempts to spend or redeem has not already been spent/redeemed by another valid transaction. Again if not valid, the transaction 152j will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151n pointing back to the previously created block 151n-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151n, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151n. This reward gives an incentive for the miners 104M to participate in the proof-of-work race. Often a regular (non-generation) transaction 152 will also specify an additional transaction fee in one of its outputs, to further reward the winning miner 104M that created the block 151n in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. The node software may be implemented in one or more applications at the application layer, or a lower layer such as the operating system layer or a protocol layer, or any combination of these. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152*j*, it handles it in accordance with the node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any storage node 104S that receives the transaction 152*j* will add the new validated transaction 152 to the pool 154 in the copy of the blockchain 150 maintained at that node 104S. Further, any forwarding node 104F that receives the transaction 152*j* will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different nodes 104 may receive different instances of a given transaction first and therefore have conflicting views of which instance is 'valid' before one instance is mined into a block 150, at which point all nodes 104 agree that the mined instance is the only valid instance. If a node 104 accepts one instance as valid, and then discovers that a second instance has been recorded in the blockchain 150 then that node 104 must accept this and will discard (i.e. treat as invalid) the unmined instance which it had initially accepted.

1.2 UTXO-Based Model

Figure 2:
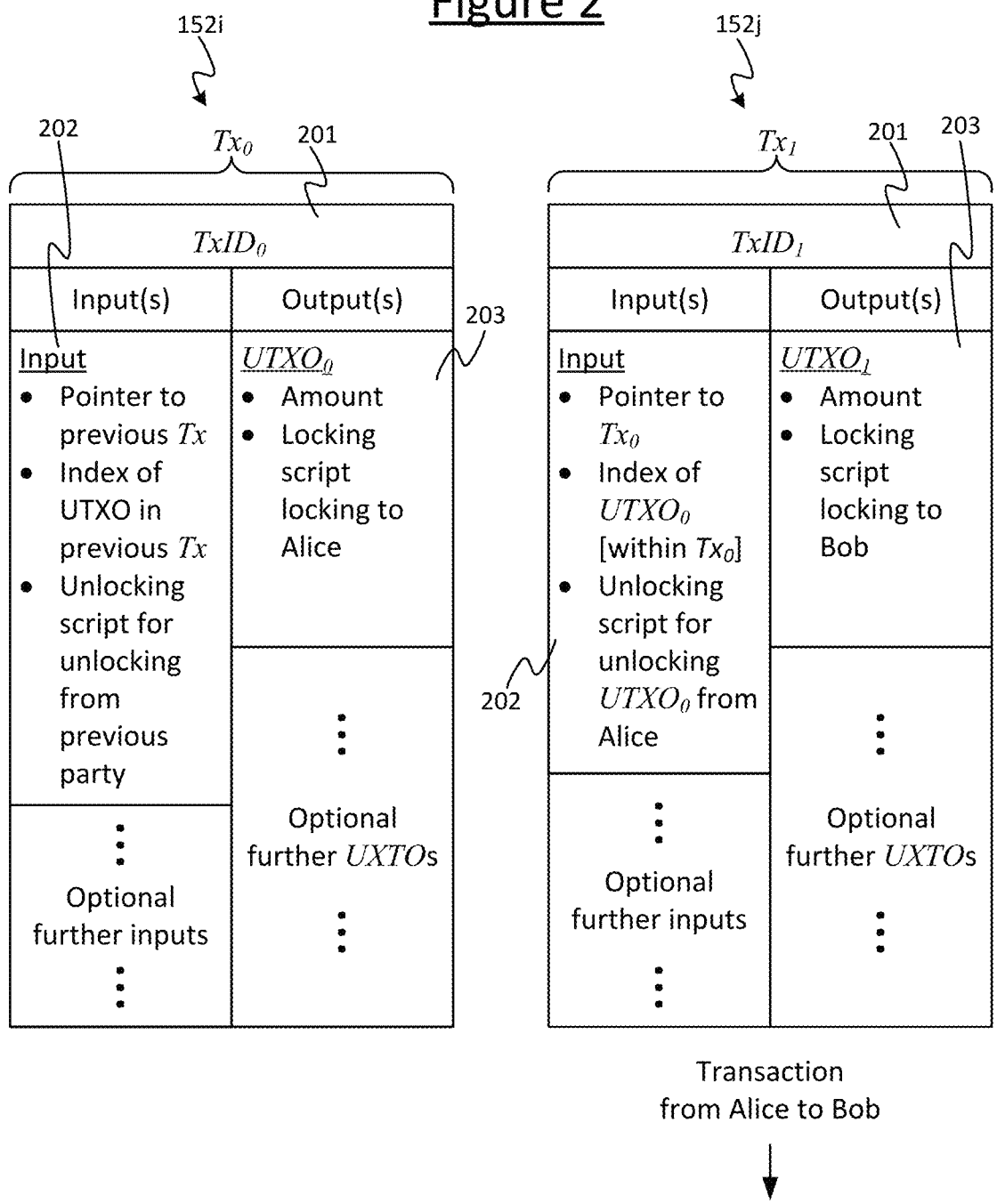
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor mined into blocks 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H($P_A$)>OP_EQUALVERIFY OP_CHECKSIG. "OP_ . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Contributor Hierarchy

Figure 18A:
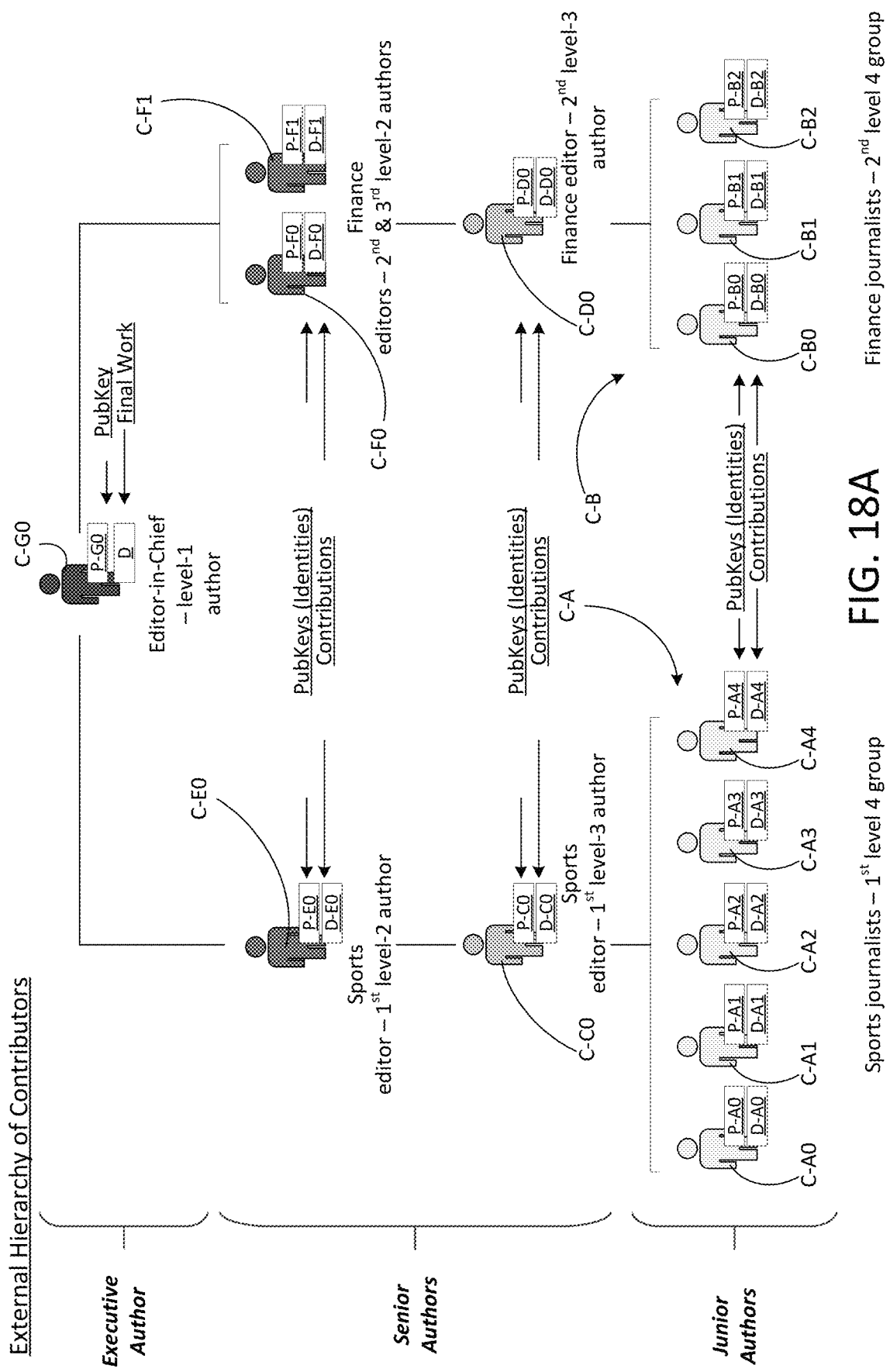
FIG. 18A shows an example hierarchy of contributors.

FIG. 18A shows a schematic block diagram of what is referred to herein as an "external hierarchy" of contributors (contributor hierarchy). Each contributor in the hierarchy is a person or other entity who makes some defined contribution on which a final "work" will ultimately be based.

A core aim of this disclosure is to represent such a hierarchy in a set of blockchain transactions that may be immutably recorded in a blockchain 150.

Note the terms "author" and "contributor" are used interchangeably in this description.

In the example external hierarchy of FIG. 18A, there exist two distinct branches. In the first branch, depicted on the left-hand side, a first group of "junior authors" C-A are said to be at level 4 in the hierarchy. The first group of junior authors C-A consists of five junior authors denoted by reference signs C-A0 to C-A4 respectively. Each is uniquely identified by a public key denoted P-A0 to P-A4 respectively. Each makes a separate, individual contribution denoted D-A0 to D-A4 respectively which is embodied as a data block.

Note that the term "data block" is used in the present context to refer to a set or portion of data capturing an individual contributor's contribution, such as a document, file or other data block. This is quite distinct from a block 151 of the block chain 150. The terms "data block" and "data object" are used synonymously herein.

The first group of junior authors C-A is supervised by a "senior author" at level 3 in the hierarchy. The senior author who supervises the first junior author group C-A may be referred to as the first level-3 senior author and is denoted by reference signs C-C0. He (including she/it) is uniquely identified by a public key P-C0 and makes a contribution D-C0 responsive to the contributions C-A0 to C-A4 of the junior authors he supervises. The first level-3 senior author C-C0 is, in turn, supervised by a first level-2 senior author C-E0. The level-2 senior author C-E0 is uniquely identified by a public key P-E0 and makes his own contribution D-E0 responsive to that of the first level-3 senior author C-C0.

In the branch of the hierarchy shown on the right-hand side, a second group of junior authors C-B, consisting of three junior authors C-B0 to C-B2 in this instance, are each associated with a unique public key denoted by reference signs P-B0 to P-B2 respectively, and each makes an individual contribution D-B0 to D-B2 respectively.

The second group of junior authors C-B is supervised by a second level-3 senior author C-D0, identified by public key P-D0 and who makes his own contribution D-D0 responsive to the contributions D-B0 to D-B2 of the junior authors C-B0 to C-B2 he supervises.

The second level-3 senior author C-D is, in turn, supervised by two level-2 senior authors, referred to as the second level-2 senior author C-F0 and third level-2 senior author C-F1.

Each of the second and third level-2 senior authors C-F0, C-F1 is identified by a public key, denoted by reference signs P-F0 and P-F1 respectively, and each makes his own individual contribution, denoted by reference signs D-F0 and D-F1 respectively, responsive to the contribution D-D0 of the first level-3 senior author C-D0 who they jointly supervise.

An editor in chief C-G0 at level 1 of the hierarchy has ultimate responsibility for the final work (his contribution), denoted by reference sign D, and has the role of supervising all three of the level-2 senior authors C-E0, C-F0 and C-F1. The editor and chief is identified by a public key P-G0.

Although not depicted, at the top of the hierarchy (level 0) is a copyright authority to which/whom the final work D is submitted.

Figure 18B:
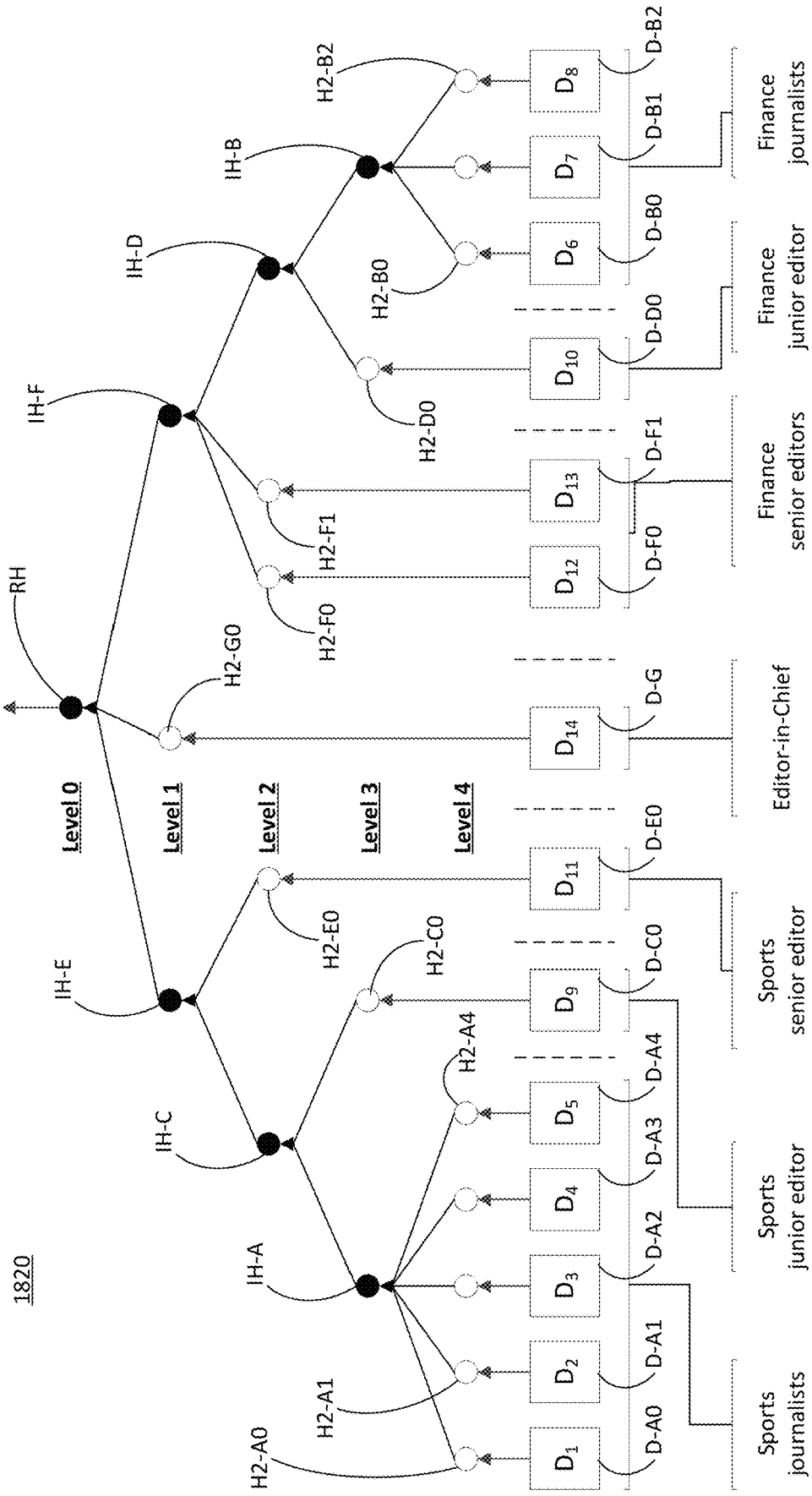
FIG. 18B shows an example hierarchy of contributions represented as a "generalised hash tree"

FIG. 18B shows an example of a data structure which may be used to evidence not only the individual contributions made by the various contributors but also the hierarchical relationship between those contributions that arises by virtue of the hierarchical relationships between the contributors themselves. The data structure is in the form of what is referred to herein as "generalised hash tree" 1820. Generalised hash trees are described in further detail below. For now, suffice it to say that a generalised hash tree has some properties in common with a "classical" hash tree but with fewer restrictions such that it may be constructed to represent hierarchical relationships in a way that is not possible with classical hash trees. The generalised hash tree 1820 is formed of a plurality of nodes at respective levels in the tree and directional edges between those nodes, where each node is either a hash of an underlined data block (leaf node—represented as white circles) or a hash of a concatenation of the values of its "child nodes" (non-leaf nodes—represented as back circles). In brief, in contrast to a classical hash tree, each non-leaf node can have any number of children with the consequence that different non-leaf nodes may have different numbers of children, and moreover a leaf node can appear at any level in the hierarchy with the consequence that a non-leaf node might have children that are a combination of leaf and non-leaf nodes.

For the reasons discussed in further detail below, a generalised hash tree provides a novel and useful way of representing hierarchical relationships of the kind depicted in FIG. 18A. However, before describing the underlying principles of generalised hash trees in more detail, an overview is provided of a protocol by which a set 1920 of blockchain transactions 152—shown in FIGS. 19A and 19B, described below—may be constructed in order to embody a generalised hash tree of the kind depicted in FIG. 18B on a blockchain 150. That is to say, a protocol for constructing blockchain transactions in a way that fully encodes not only the values of the nodes (denoted by reference signs H2-A0 to RH) but also the hierarchical relationships between those nodes.

The protocol may be referred to herein as a "collaborative attestation protocol". Certain general principles and considerations which underpin the collaborative attestation protocol are set out later in the description. First, a concrete example of a method performed according to the protocol is described to provide context.

Before describing the set of blockchain transactions 1920, the structure of the generalised hash tree 1820 will be described in relation to the contributor hierarchy of FIG. 18A.

Following the example of FIG. 18A, each contribution is represented by a leaf node at a level in the generalised hash tree 1820 that corresponds to the level of its contributor in the external hierarchy (i.e. the contribution by any author at level n is represented by a leaf node at level n in the generalised hash tree).

Hence, the contributions of the first group of junior authors C-A are represented by five leaf nodes are level 4 in the hierarchy of the generalised hash tree 1820. Those nodes have respective values, which are represented by reference signs H2-A0 to H2-A4 respectively. Note that some reference signs are omitted from FIG. 18B to avoid excessive clutter. In the present example, the value of each non-leaf node is a double hash of the underlying contribution to which it corresponds. So, for example, the value H2-A1 of the leaf node corresponding to the contribution D-A1 is a double hash of the contribution D-A1; the value H2-A4 of the leaf node representing the contribution D-A4 is a double hash of that contribution D-A4 etc.

Similarly, for the second group of junior authors C-B, each contribution is represented by a leaf node at level 4 in the hierarchy of the generalised hash tree 1820, having a value obtained by double hashing that contribution, e.g. the value H2-B2 of the node corresponding to contribution D-B2 is the double hash of that contribution etc.

At level 3 in the generalised hash tree 1800, the overall contribution by each group of junior authors C-A and C-B is represented by a respective non-leaf node IH-A and IH-B. The value of the non-leaf IH-A representing the overall contribution of the first junior author group C-A is a single hash of a concatenation of the values of all of the leaf nodes representing the contributions of the first group of junior authors C-A, i.e. a single hash of the concatenation of the leaf node values H2-A0 to H2-A4 representing the individual contributions by the first junior author group C-A. Likewise, the value IH-B of the non-leaf node representing the overall contribution of the second group of junior authors C-B is a single hash of a concatenation of the values H-B0 to H-B2 of the leaf nodes representing their individual contributions D-B0 to D-B2.

In addition, the contribution of each level-3 senior author C-C0, C-D0 is represented by a leaf node at level 3 in the generalised hash tree 1820, denoted by reference signs H2-C0 and H2-D0 respectively, each of which is a double hash of the individual contribution D-C0, D-D0 of that senior author.

At level 2 in the generalised hash tree 1820, the overall contribution of both the first group of junior authors C-A together with the contribution of the first level 2 senior author C-C0 supervising that group is represented by a single non-leaf node, having a value IH-C, which is a concatenation of the value IH-A representing the overall contribution of the first group of junior authors C-A with the value H2-C0 of the level 2 leaf node representing the contribution of the first level-3 senior author C-C0.

The overall contribution of the second group of junior authors C-B, together with that of the second level-3 senior author C-D0 supervising that group, is represented by a second non-leaf node at level 2, having an analogously-computed value IH-D.

Because there are three level-2 senior authors C-E0, C-F0, C-F1 in the contributor hierarchy, each making an individual contribution D-E0, D-F0, D-F1, the generalised hash tree 1820 contains thee leaf nodes at level 2 representing each of those contributions D-E0, D-F0 and D-F1. The value H2-E0, H2-F0 and H2-F1 of each of these leaf nodes is computed as a double hash of the contribution represented by that node.

At level 1 in the generalised hash tree, two non-leaf nodes exist having values denoted by reference signs IH-E and IH-F respectively. The non-leaf node having the value IH-E represents the overall contribution of the first group of junior authors C-A, together with the contribution D-C0 of the first level-3 senior author C-C0 supervising that group and the contribution D-E0 of the first level-2 senior author C-E0 supervising him. Again, that value IH-E is computed as a hash of a concatenation of the value IH-C(representing the overall contribution of the first junior author group C-A plus that of their immediate supervisor C-C0) and the value of the leaf node H2-E0 representing the contribution D-E0 of the first level-2 senior author C-E0.

The other level-2 non-leaf node has value IH-F computed as a concatenation of the value IH-D of the non-leaf node (representing the contributions of the second junior author group C-B plus the second level 2 senior author C-D0 directly supervising them) concatenated with the two values H2-F0 and H2-F1 of the two leaf nodes representing the contributions D-F0, D-F1 of the second and third level-2 senior authors supervising the second level-2 senior author H2-D0.

A leaf node at level 1 represents the contribution of the editor-in-chief C-G0, which is the final work D made by him responsive to the contributions D-E0, D-F0 and D-F1 of the level-2 senior authors. The value of that node H2-G0 is computed as a double hash of the final work D.

Finally, at level 0 of the generalised hash tree, a root node has a value RH (root hash) computed as a single hash of a concatenation of the values IH-E, IH-F of the non-leaf nodes at level 1 and the value H2-G0 of the leaf node at level 1.

An example of a method performed in accordance with the collaborative attestation protocol will now be described with reference to FIGS. 19A and 19B. The method creates a set of blockchain transactions 1920 embodying the generalised hash tree 1820 of FIG. 18B.

Figure 19A:
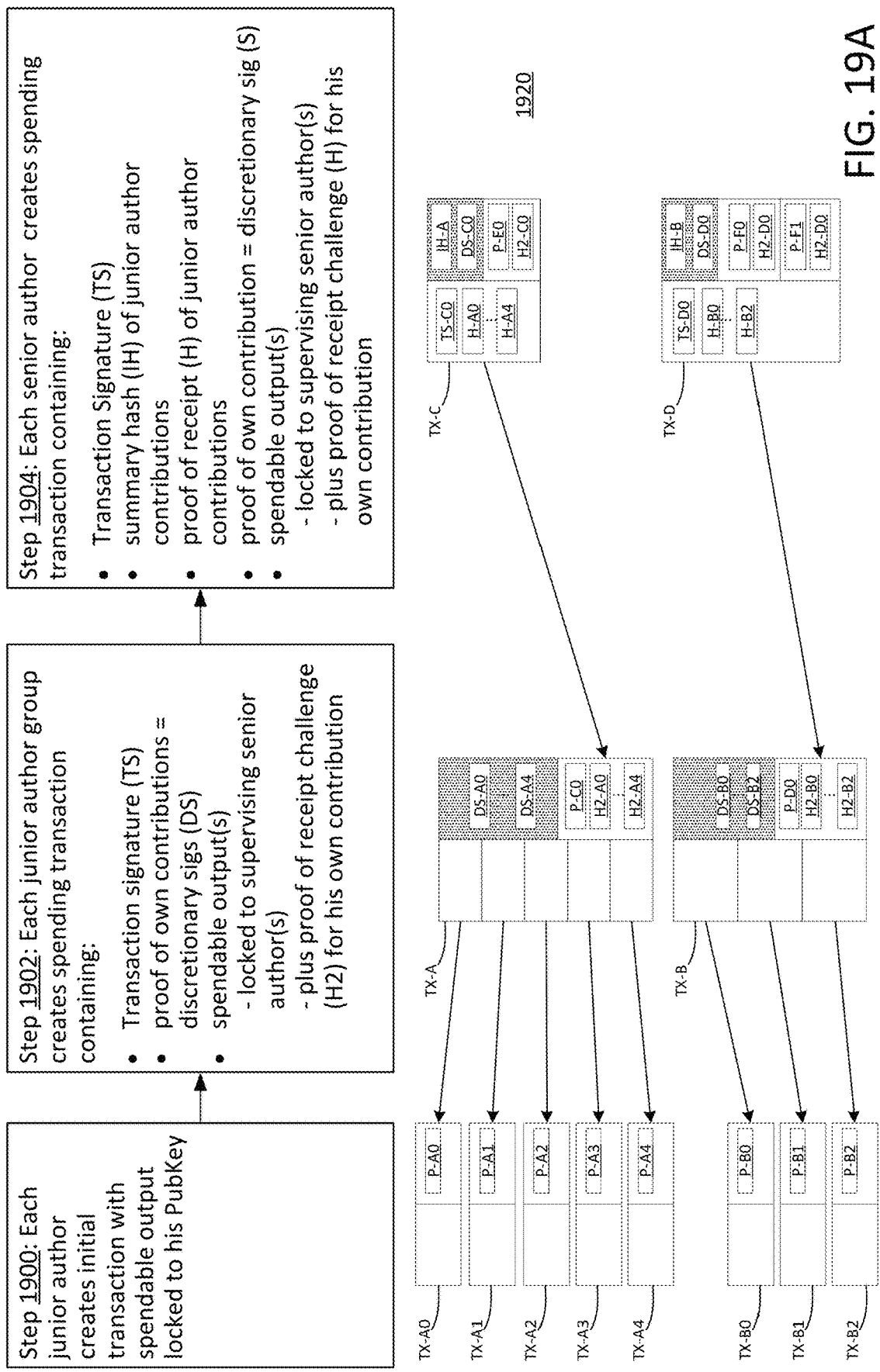
FIGS. 19A and 19B shows steps of a method for creating a set of blockchain transaction to embody a generalised hash tree, together with a schematic representation of the transaction(s) created at each step.
Figure 19B:
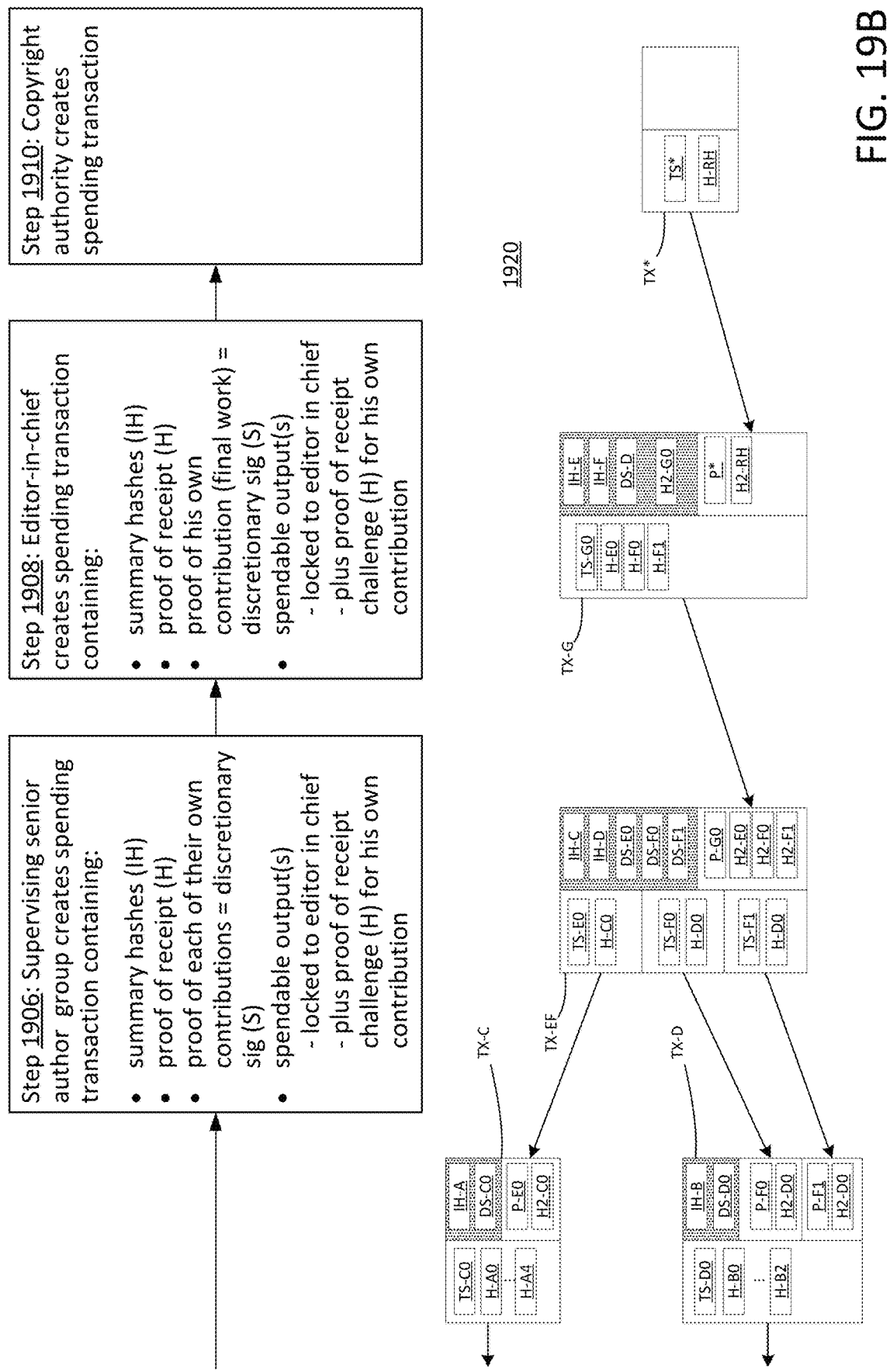

The steps of the method (protocol) are depicted in FIGS. 19A and 19B in a flow chart running horizontally from left to right at the top of the page. Below each step of the flowchart, a corresponding subset of one or more of the set of transactions 1920 is schematically depicted, being the transaction(s) created at that step. At each but the first step, at least one spending transaction is created which has a specific spending relationship with the transactions created in the previous step. It is these spending relationships that represent the hierarchical relationships between nodes within the generalised hash tree of FIG. 18B. The values of the nodes themselves are encoded in the outputs of the transactions 1920 as described in further detail later.

Beginning with FIG. 19A, at step 1900, each junior author in each junior author group C-A, C-B creates an initial transaction with at least one spendable output locked to his own public key. The transactions created at step 1900 by the first group of junior authors C-A are denoted TX-A0 to TX-A4 respectively, and each has at least one spendable output locked to the public key P-A0, . . . , P-A4 of the junior author creating it (i.e. each output is locked to a different junior author of the first group of junior authors C-A). Alternatively, one or more of these transactions could be created by any other party. Alternatively, some of all of these transactions could be combined into a single transaction. What is material is that, in order to set up the next step of the method, there are five separate spendable outputs—in at least one and up to five transactions—each of which is locked to the public key of a different one of the junior authors in the first group C-A. For example, the structure of the tree could be captured, maintaining a 1-1 identifiable map between relationship between an author and his/her content, by setting up a multisig (or similar script, with many signatures) where the order of the keys used for signing preserve the order of junior authors.

The transactions created by the second group of junior authors C-B are denoted by reference signs TX-B0 to TX-B2 and each has at least one spendable output locked to the public keys P-B0, P-B2 of a different junior author of the second junior author group C-B. The description in the preceding paragraph about alternative ways of constructing the initial transactions applies equally.

At step 1902, each junior author group C-A, C-B creates a single spending transaction (i.e. one spending transaction per junior author group), which spends the outputs of all of the initial transactions created by the individual members of that group at step 1900. That transaction may also be referred to as the first group transaction TX-A.

So, in the case of the first group of junior authors C-A who, between them, have created five initial transactions TX-A0 to TX-A4, at step 1902 that group C-A as a whole creates a single spending transaction denoted by reference sign TX-A, which has (at least) five inputs each spending (i.e. pointing to) a different one of the spendable outputs of the five initial transactions TX-A0 to TX-A4.

Recall that at each of the initial transactions TX-A0 to TX-A4 identifies a different one of the first group of junior authors G-A by virtue of the spendable output of that transaction being locked to his public key (P-A0 to P-A4 respectively). The first group transaction TX-A which spends all five of the outputs of the initial transactions TX-A0 to TX-A4 captures the fact that those five junior authors belong to the same group. Using the terminology of this disclosure, they may also be referred to as "sibling" contributors and their contributions may be referred to as sibling contributions. The first group spending transaction TX-A has at least one spendable output, which is locked to the public key P-C0 of the first level-3 senior author C-C0 who supervises the first group of junior authors C-A. This captures the hierarchical relationship between that junior author group C-A and their "immediate" supervisor C-C0 within the set of blockchain transactions 1920.

The first group transaction TX-A also serves as proof of each junior author's contribution. That proof is provided by way of a "discretionary signature" from each of the junior authors. The discretionary signatures of the junior authors TX-A0 to TX-A4 are denoted by reference signs DS-A0 to DS-A4 respectively. Discretionary signatures are described in further detail below. For now, suffice it to say that a discretionary signature is ignored for the purpose of validating the transaction in which it appears, i.e. miners disregard discretionary signatures for the purpose of validating transactions, and is generated by applying a signature function to a single hash of that author's contribution and the private key corresponding to that author's public key. So, the discretionary signature DS-A0 of the junior author TX-A0 is computed by applying a signature generator function to a single hash of that author's contribution D-A0 and the private key counterpart to his public key P-A0. This applies analogously for the remaining junior authors.

Returning to the spendable output of the first group transaction TX-A, as well as being locked to the public key P-C0 of the supervisor C-C0, the locking script of that output also requires proof of receipt of the contributions of the junior authors D-A0 to D-A4 respectively. In the present example, this is a "double hash puzzle", i.e. the unlocking script contains a double hash of each contribution, with the double hash of contribution D-A0 denoted by H2-A0, the double hash of contribution of D-A1 denoted by H2-A1 etc. That locking script can only be redeemed by locking script containing a valid transaction signature and the unlocking script must also contain a single hash of each of the junior author's contributions in order to solve the double hash puzzle for each contribution.

The single hash of the contribution D-A0 is denoted by H-A0, the single hash of the contribution D-A1 is denoted H-A1 etc. These are shown to be comprised in an input of a first "level-3" spending transaction TX-C which is created by the immediate supervisor of the first junior author group C-C0 (i.e. the first level-3 senior author C-C0).

The first level-3 spending transaction TX-C is created at step 1904. The immediate supervisor C-C0 is only in a position to compute the single hash values H-A0 to H-A4 once he has received all of the contributions D-A0 to D-A4 from the junior authors C-A he is supervising (receiving these also allows him to make own contribution D-C0 in response). Therefore, these serve as proof in the first level-3 spending transaction TX-C that the immediate supervisor C-C0 has received those contributions. In addition, the input of the first level-3 spending transaction TX-C contains a valid transaction signature which signs the output or outputs of that transaction TX-C using the private key counterpart to the public key P-C0 of the supervising author C-C0 (as specified in the spendable output of the first group transaction TX-A).

Turning to the output(s) of the first level-3 spending transaction TX-C, there is at least one spendable output which is locked to the public key P-E0 of the first level-2 author C-E0 who supervises the first level-3 senior author C-C0. The spendable output also comprises a double hash puzzle on the contribution of the first level-3 senior author C-C0 denoted by reference sign H2-C0. Hence, that output can only be spent by the first level-2 supervising author C-E0 and only when he has received, from the first level-3 senior author C-C0, the latter's contribution D-C0 so that the former may provide a single hash H-C0 of that contribution D-C0 as proof of receipt. In addition, the one or more outputs of the first level-3 transaction TX-C comprise the hash value IH-A of the non-leaf node shown at level 3 in FIG. 18B to represent the overall contribution of all of the first group of junior authors C-A. This may be referred to below as a "summary hash" and has the effect of explicitly (directly) encoding that non-leaf node in the set of transactions.

Finally, the first level 2 transaction TX-C contains proof of the first level-3 senior author's own contribution D-C0 in the form of a discretionary signature DS-C0. As before, this is generated by applying a signature function to his contribution D-C0 and the private key counterpart to the public key P-C0.

Returning briefly to step 1902, a second single group spending transaction TX-B is created by the second junior author group C-B in an analogous manner. That is, in this case there are three junior authors who have created three initial transactions TX-B0 to TX-B2, and consequently the second group spending transaction TX-B has three inputs each spending a different one of the initial transactions.

Although not shown explicitly in FIG. 19A, each of the five inputs of the first group transaction TX-A and each of the three inputs of the second group spending transaction TX-B contain a valid transaction signature generated using the private key counterpart to the public key specified in the output of the initial transaction which it is spending. So, for example, the first input of the first group spending transaction TX-A contains a transaction signature which signs the outputs of that transaction TX-A using the private key counterpart to the public key P-A0 in the output of the initial transaction TX-A0 etc.

The second group spending transaction TX-B analogously comprises a discretionary signature for each of the junior authors in the second group C-B (generated in the same way and denoted by way of reference signs DS-B0 to DS-B2) and at least one spendable output locked to the public key of the second level-3 senior author C-D0 i.e. the immediate supervisor of the second group of junior authors C-B, and a double hash puzzle on each of the contributions D-B0 to D-B2 of the second junior author group C-B, as denoted by reference signs H2-B0 to H2-B2.

Returning to step 1904, the immediate supervisor C-D0 of the second junior author group C-B creates a second level-3 transaction TX-D having at least one input which spends the spendable output of the second group transaction TX-B, and accordingly contains a valid transaction signature generated by signing the output or outputs of the second level 2 transaction TX-D using the private key counterpart to the public key P-D0 specified in the spendable output of the second group transaction TX-B, and additionally comprises a solution to the double hash puzzle in the form of a single hash of each of the contributions D-B0, . . . , D-B2 of the second junior author group C-B denoted by reference signs H-B0 H-B2 respectively.

In contrast to the first level-3 spending transaction TX-C, the second level-3 spending transaction TX-D has at least two spendable outputs reflecting the fact that the second level-3 senior author C-D0 is supervised by not one but two level-2 senior authors C-F0, C-F1. The first of these spendable outputs is locked to the public key P-F0 of the second level-2 supervising author C-F0 and the second spendable output is locked to the public key P-F1 of the third level-2 supervising author C-F1. Each of those spendable outputs also comprises a double hash puzzle H2-D0 on the contribution D-D0 of the second level 2 senior author C-D0 which must be solved in order to unlock that output. As an alternative to having two spendable outputs, the transaction TX-D could have a single spendable output locked to both public keys P-F0 and P-F1 for example using a two-of-two CHECKMULTISIG opcode with operands P-F0 and P-F1, together with the double hash puzzle H2-D0.

Finally, the second level-3 transaction TX-D comprises, in the one or more outputs thereof, the hash value IH-B of the non-leaf node at level 3 in the generalised hash tree 1820 of FIG. 18B representing the overall contribution of the second junior author group C-B (summary hash using the above terminology), and also proof of the second level-3 senior author's contribution in the form of a discretionary signature DS-D0 generated as above.

The remaining steps of the method are shown in FIG. 19B.

Up to this point, there has been two separate "branches" of transactions reflecting the two branches in the contributor hierarchy. However, in the next step of the method, that is, step 1906, these two branches "merge" to reflect the fact that all three level 1 senior authors C-E0, C-F0 and C-F1 are supervised by the same author, namely the editor-in-chief C-G0. That is, using the above terminology, to reflect the fact that all three level 1 senior authors are "siblings" within the hierarchy, their "parent" being the editor-in-chief C-G0.

Hence, at step 1906, a single level-2 spending transaction TX-EF is created by all three of those authors. The level-2 spending transaction TX-EF has, in this example, three inputs, one of which spends the spendable output of the first level-3 transaction TX-C, and the remaining two of which spend the two spendable outputs of the second level-3 spending transaction TX-D. The first input comprises a valid transaction signature TS-E0 generated using the private key counterpart to the public key P-E0 specified in the output of the first level 2 transaction TX-C, and additionally a proof of receipt of the contribution D-C0 of the first level 2 author C-C0 in the form of a single hash H-C0 of that contribution D-C0. The second and third inputs comprise respectively, valid transaction signatures TS-F0 and TS-F1 generated using the private key counterparts to the public keys P-F0 and P-F1 respectively, and each comprises a proof of receipt of the second level-3 author's contribution D-D0 in the form of a single hash H-D0 thereof. In the case that TX-D instead has a single spendable output with a two-of-two CHECK-MULTISIG operand, the level-2 transaction TX-EF has, in place of the second and third inputs, a single second input which contains two valid transaction signatures TS-F0 and TS-F1 and the proof of receipt H-D0.

The level-2 transaction TX-EF has one or more outputs comprising at least one spendable output locked to the public key P-G0 of the level-1 editor-in-chief C-G0, which additionally requires proof of receipt of each of the three contributions of the three level-2 senior authors in the form of double hash puzzles H2-E0, H2-F0 and H2-F1.

Additionally, the one or more outputs comprise the hash values IH-C and IH-D of the non-leaf nodes at level 2 in the generalised hash tree of FIG. 18B (summary hashes) and, for each of the level-2 authors C-E0, C-F0 and C-F1, a proof that author's contribution in the form of respective discretionary signatures DS-E0, DS-F0 and DS-F1 generated as above. As step 1908, the editor-in-chief C-G0 creates a level-1 transaction TX-G, which validly spends the output of the level-2 transaction TX-EF and accordingly must contain a valid transaction signature TS-G0, and three proof of receipts in the form of single hash values H-E0, H-F0 and H-F1 of the level-2 authors' contributions D-E0, D-F0 and D-F1. In addition, the one or more outputs contain the hash values of the level-3 leaf nodes IH-E and IH-F together with a proof of the editor-in-chief's contribution in the form of discretionary signature DS-D.

The editor-in-chief's contribution is the final work D and this is the contribution on which the discretionary signature DS-D is generated.

The level-1 transaction TX-G has a spendable output locked to a private key of a copyright authority denoted by reference sign P*.

At step 1910, the copyright authority creates a final transaction TX*, which spends the spendable output of the level-1 transaction TX-G. It thus contains a valid transaction signature TS* generated by signing the outputs of the final transaction TX* using the private key counterpart to the public key P* specified in the level-1 transaction TX-G. Further details of the copyright authority's role, in one example implementation, are described below.

Note that the double hash value of each leaf node—generally denoted by reference signs of the form H2-xx—is encoded by way of the double hash puzzle in the relevant spendable output, which must be solved to spend that outputs. Additionally, this value may be duplicated elsewhere in the output(s) of that transaction as described later.

Although in the above, the same private key is used to generate the discretionary signatures as is used to generate the transaction signatures (the latter also referred to herein as non-discretionary signatures), this is not essential. In fact, the discretionary signature can be generated using any private key and indeed any signing algorithm which may or may not be the same as the signing algorithm used to generate the transaction signatures. For example, the transaction signatures may be generated using ECDSA and the discretionary signatures may or may not be generated using ECDSA.

Further details of an example implementation of the collaborative attestation protocol are given below. This example implementation leverages what are referred to herein as "generalised hash trees". The principles of generalised hash trees are first described to provide the relevant context.

2. Hash Trees

The concept of hash trees as a data structure was introduced by Ralph Merkle in 1979. Hash trees have since been used extensively in applications including as a representation of a set of transactions in a block of a blockchain and as a record of state change in versioning systems such as Git version control.

The terms "hash tree" and "Merkle tree" are generally used to refer to the same type of data structure. Where it is considered helpful to draw a distinction between the underlying data structure and a chosen mathematical formulation, the following description may use the term hash tree to refer to the underlying data structure and the term Merkle tree to refer to a hash tree in combination with an indexing scheme for indexing nodes of the hash tree and a set of node equations for constructing the hash tree according to that indexing system.

Merkle trees are generally treated as binary tree data structures comprising nodes and edges. The nodes are represented as hash digests (hash values) and edges are created by application of a one-way function (commonly cryptographic hash functions) to a pair of concatenated nodes, generating a parent. This process is repeated recursively until a single root hash value (root node) is reached.

Merkle trees have been implemented as binary, trinary or more generally k-ary, where k is a common branching factor used throughout the tree. The fact that the branching factor is indeed consistent throughout a Merkle tree is a widely-accepted feature of such trees. Another common feature is that data blocks are only inserted at the bottom layer of the tree (i.e. the layer furthest from the root). A data structure having these constraints may be referred to herein as a "classical" hash (or Merkle) tree.

However, the present disclosure recognized applications in which it is advantageous to have greater flexibility in the construction of Merkle tree than is possible with these common features. Accordingly, a highly generalised treatment of Merkle trees is provided, resulting in a protocol for constructing and manipulating what are referred to herein as "generalised" hash trees. These generalised structures inherit many of the properties of classical Merkle trees, while gaining additional flexibility by removing both the constraints of having a consistent branching factor and of only inserting leaf nodes at the base layer.

The term "schema" may be used herein to refer to the set of constraints imposed on a data structure. For a classical hash tree, those constraints are summarized above and set out in more detail below.

This disclosure provides a novel schema for constructing generalised hash trees, the detail of which are described below.

This disclosure also provides a novel indexing scheme for assigning indexes to nodes of a generalised hash tree. A hash tree indexed according to this indexing scheme may be referred to as a generalised Merkle tree.

Embodiments of the present disclosure are described in detail below. First, there follows a more in-depth description of classical hash trees as context to the described embodiments.

2.1 Classical Hash Trees

A common method for representing large quantities of data in an efficient and less resource-intensive way is to store it in structure known as a hash tree, where a hash is taken to mean the digest of a one-way cryptographic hashing function such as SHA-256.

A typical hash function takes an input of arbitrary size and produces an integer in a fixed range. For example, the SHA-256 hash function gives a 256-bit number as its output hash digest (hash value).

In general, a hash tree is a tree-like data structure comprising "internal" nodes and "leaf" nodes connected by a set of directional edges. Each leaf node represents the cryptographic hash of a portion of data (data block) that is to be "stored" in the tree, and each node is generated by hashing the concatenation of its "children" (child nodes). A child node of a "parent" node is any node directly connected to the parent node by a directional edge. The root node of the hash tree can be used to represent a large set of data compactly, and it can be used to prove that any one of the portions of data corresponding to a leaf node is indeed part of the set. The root node is a single node to which all other nodes are connected either directly or indirectly.

In accordance with terminology used in the art, this disclosure may refer to data being "stored" in the hash tree. However, it will be appreciated that the data is not recoverable from the hash tree itself because of the one-way properties of hash functions (in fact, this is one of the benefits of a hash tree). Rather, the hash tree can be used to verify a data block in the manner described below. Accordingly, where this disclosure refers to data being stored or contained in a hash tree and the like, it will be appreciated that means that the data is represented in the hash tree in the manner set out below, and does not imply that the data is recoverable from the hash tree.

In many applications, binary hash trees are used in which every non-leaf node has exactly two children and leaf nodes are the hash of a block of data. For instance, the bitcoin blockchain uses a binary hash tree implementation to store all the transactions for a block compactly. The root hash is stored in the block header to represent the full set transactions included in a block.

Figure 3:
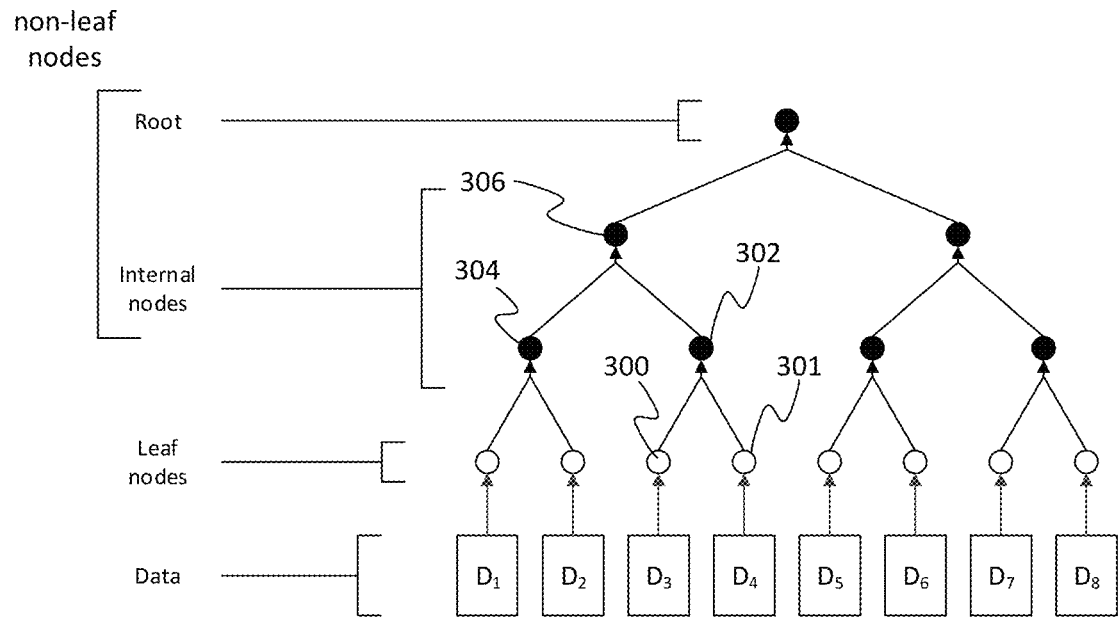
FIG. 3 shows an example of a classical binary hash tree.

FIG. 3 shows a simple binary hash-tree, in which leaf nodes are represented as white circles and non-leaf nodes are represented as black circles, and edges are represented as line segments between pairs of nodes. Each node is embodied as a hash value computed as set out below.

The structure of a binary hash tree is shown in FIG. 3, where arrows represent the application of a hash function, white circles represent leaf nodes and black circles are used both for internal nodes and the root.

This hash tree stores a set of eight portions of data $D_1 \ldots D_8$ by hashing each portion and concatenating the resulting digests pairwise $H(D_1)\|H(D_2), \ldots, H(D_7)\|H(D_8)$, where the '$\|$' operator denotes the concatenation of two strings of data. The concatenated results are then hashed, and the process repeated until there is a single 256-bit hash digest remaining— the Merkle root—as a representation of the entire data set.

By way of example, the nodes denoted by reference numerals 300 and 301 are leaf nodes representing data blocks $D_3$ and $D_4$ respectively. Hence, the hash values of the nodes 301 and 302 are $H(D_3)$ and $H(D_4)$ respectively. The nodes 300 and 301 are said to be "sibling nodes" because they have a common parent node denoted by reference numeral 302. The hash value of the parent node 302 is $H(H(D_3)\|H(D_4))$. In turn, the node 302 is shown to be a sibling node of the node denoted by reference numeral 304 because those nodes have a common parent node 306, which in turn has a hash value equal to the hash of a concatenation of the hash values of its child nodes 302, 304 etc.

2.2 Merkle Trees

The Merkle tree is the original implementation of a hash tree, proposed by Ralph Merkle in 1979; see R. C. Merkle, Stanford University, (1979), Secrecy, Authentication, and Public Key Systems (Merkle's thesis).

A Merkle tree is typically interpreted as a binary hash tree.

In a Merkle tree, each node in the tree has been given an index pair (i,j) and is represented as N(i, j). The indices i,j are simply numerical labels that are related to a specific position in the tree.

An important feature of the Merkle tree is that the construction of each of its nodes is governed by the following equations[1]

[1] These equations have been adapted from Merkle's thesis and simplified.

$$N(i, j) = \begin{cases} H(D_i) & i = j \\ H(N(i, k) \| N(k+1, j)) & i \neq j \end{cases},$$

where k=(i+j−1)/2 and H is a cryptographic hash function.

Figure 4:
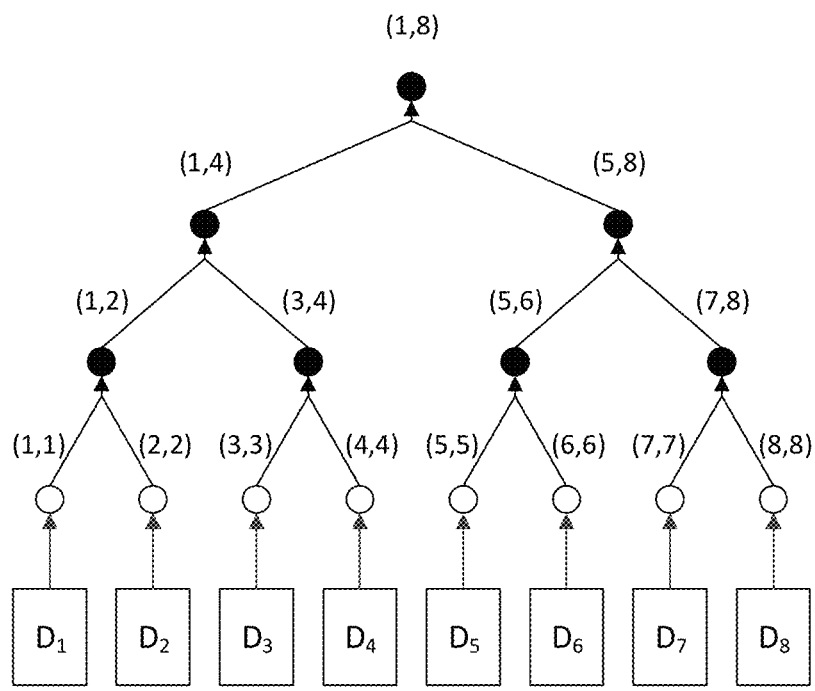
FIG. 4 shows an example of a binary Merkel tree having assigned node indices.

A binary Merkle tree constructed according to these equations is shown in FIG. 4. It can be seen that the i=j case corresponds to a leaf node, which is simply the hash of the corresponding $i^{th}$ block of data $D_1$. The i≠j case corresponds to an internal or root node, which is generated by recursively hashing and concatenating child nodes in the tree until the specific node or the root is reached.

For example, the node N(1,4) is constructed from the four data blocks $D_1, \ldots, D_4$ as $$N(1, 4) = H(N(1, 2) \| N(3, 4))$$
$$= H[H(N(1, 1) \| N(2, 2)) \| H(N(3, 3) \| N(4, 4))]$$
$$= H[H(H(D_1) \| H(D_2)) \| H(H(D_3) \| H(D_4))].$$

Each node has a level (depth) in the tree, which corresponds to the number of directional edges via which that node is connected to the common root node, i.e. node (1,8) in the example of FIG. 4 (the level of the root node itself being zero).

The tree has a depth M defined as the lowest level of nodes in the tree, and the depth m of a node is the level at which the node exists. For example, $m_{root}=0$ and $m_{leaf}=M$, where M=3 in FIG. 4.

Although a binary tree is shown by way of example, it possible to construct a ternary, quaternary or K-ary Merkle tree, where K is the order of branching of the tree, also referred to as the branching factor.

In general, the core properties and paradigms common to all Merkle tree implementations can be summarised by the following:
1. Common branching order K—the branching order of all non-leaf nodes is common. For a binary Merkle tree, all internal nodes and the Merkle root have exactly two children.
2. Position of leaf nodes—all leaf nodes are situated uniformly at the bottom of the tree. This means that data blocks can only be injected into the tree at the same base layer.

These properties are an artefact of the Merkle tree having been designed to store a list of data blocks in $\mathcal{D}$ optimally-efficient manner. However, while this design lends itself extremely well to cryptographic signature schemes and storing of blockchain transactions for example, it is s $\mathcal{D}$ ect to constraints that make it sub-optimal for other applications.

A consequence of property 1 is that, to store N data blocks in a Merkle tree with branching factor K, the tree must have $K^M \geq N$ leaf nodes. This is beneficial in that the depth of the tree grows logarithmically in the total storage requirement. However, this also means that in all the cases where $K^M \geq N$ the Merkle tree must be "padded" with an additional $N'=K^M-N$ leaf nodes containing null data. This means that a Merkle tree will often contain extraneous data that is not of interest to the user of the tree.

Additionally, property 2 means that it is not possible to add or inject data blocks at any level of the tree other than at its base. This makes it very difficult to reflect a hierarchy or structure relating to a data set within the Merkle tree itself.

Merkle Proofs

The primary function of a Merkle tree in most applications is to facilitate a proof that some data block $D_i$ is a $\mathcal{D}$ nber of a list or set of N data blocks ∈ $\{D_1, \ldots, D_N\}$. Given a Merkle root and a candidate data block $D_i$, this can be treated as a 'proof-of-existence' of the block within the set.

The mechanism for such a proof is known as a Merkle proof and consists of obtaining a set of hashes known as the "Merkle path" for a given data block $D_i$ and Merkle root R. The Merkle path for a data block is simply the minimum list of hashes required to reconstruct the root R by way of repeated hashing and concatenation, and may also be referred to as the "authentication path" for a data block.

Method

If, given a Merkle root R and given data block $D_1$ to be "verified"—verified in this context means proving that th $\mathcal{D}$ ata block $D_1$ belongs to the set ∈ $\{D_1, \ldots, D_N\}$ represented by R (i.e. the set of data blocks from which the hash tree is constructed)—the data block $D_1$ is verified as follows. The data block $D_1$ is considered by way of example by the proof can be performed for any given data block to determine whether or not it corresponds to one of the data blocks used to construct the hash tree.

Figure 5:
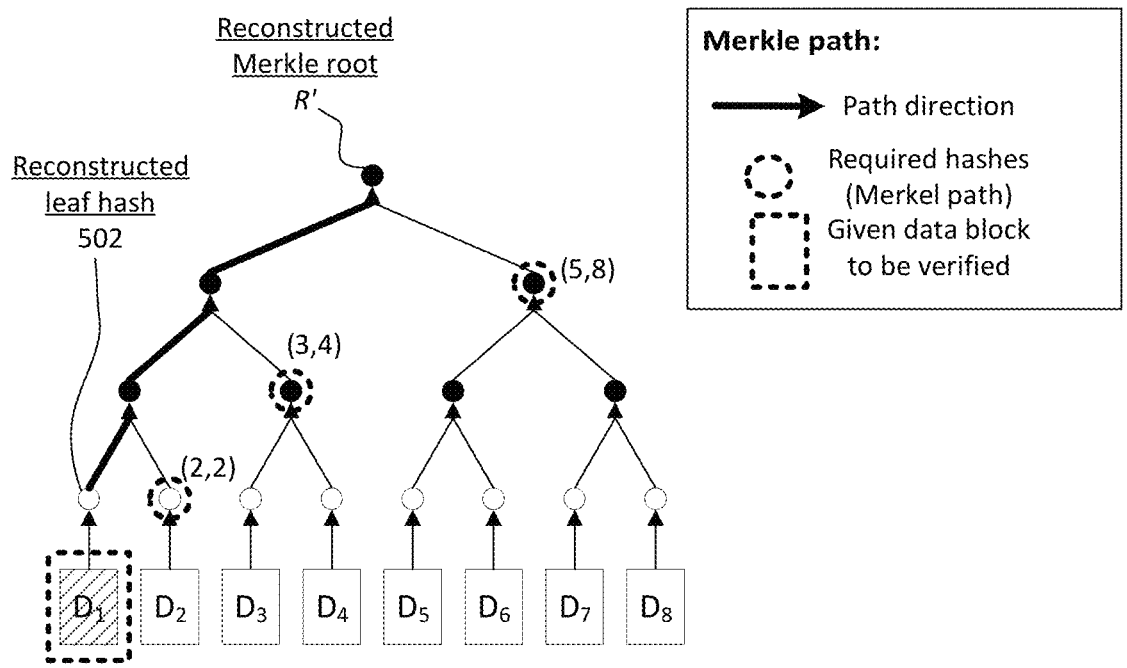
FIG. 5 shows an example of an authentication path for a given data block and a given classical hash tree.

With reference to FIG. 5, to verify the data block $D_1$, a Merkle proof is performed as follows:
  i. Obtain the Merkle root R from a trusted source.
  ii. Obtain the Merkle path Γ from a source. In this case, Γ is the set of hashes:
    Γ={N(2,2), N(3,4), N(5,8)}.
  iii. Compute a Merkle proof using $D_1$ and F as follows:
    a. Hash the data block to obtain:
      $N(1,1)=H(D_1)$ (the "reconstructed leaf hash" 502).
    b. Concatenate with N(2,2) and hash to obtain:
      $N(1,2)=H(N(1,1) \| N(2,2))$.
    c. Concatenate with N(3,4) and hash to obtain:
      $N(1,4)=H(N(1,2) \| N(3,4))$.
    d. Concatenate with N(5,8) and hash to reconstruct the root:
      $N(1,8)=H(N(1,4) \| N(5,8))$,
      R'=N(1,8) (the "reconstructed root hash").
    e. Compare the calculated root R' with the root R obtained in (i):
      I. If R'=R, the existence of $D_1$ in the tree, and therefore the data set , is confirmed.
      II. If R'≠R, the proof has failed and $D_1$ is not confirmed to be a member of .

This is an efficient mechanism for providing a proof-of-existence for some data as part of the data set represented by a Merkle tree and its root. For example, if the data $D_1$ corresponded to a blockchain transaction and the root R is publicly available as part of a block header then it is possible to quickly prove that the transaction was included in that block.

The process of authenticating the existence of $D_1$ as part of the example Merkle tree is shown in FIG. 5. This demonstrates that performing the Merkle proof for a given block $D_1$ and root R is effectively traversing the Merkle tree 'upwards' by using only the minimum number of hash values necessary.

2.1.2 Tree Structures in Graph Theory

A hash tree or Merkle tree may be interpreted in the context of graph theory. A hash tree comprises vertices or nodes of data—hash values—and edges connecting nodes formed by the hashing of multiple concatenated vertices.

More specifically, in graph theory a hash tree is considered to have the following key properties Directed—the edges between nodes are formed by computing a one-way hash function which can only be performed in one-direction. This means that every edge in the hash tree has a direction, and therefore the tree is Acyclic—there are no cyclical paths in the structure of a hash tree.

Graph—a hash tree can be classified as a graph because it comprises vertices and edges that connect its vertices.

The combination of all three of these properties means that a hash tree or Merkle tree satisfies the definition of a directed acyclic graph (DAG).

A directed graph is termed weakly connected if the replacement of its directed edges with undirected edges forms a connected graph. A hash tree satisfies this criterion, so it is also a weakly connected DAG.

A "rooted tree" is defined as a tree in which one vertex or node is identified as the root of the tree, and if the rooted tree also has an underlying directed graph then it is termed a directed rooted tree. Moreover, in a directed rooted tree, all the edges are either directed away from (arborescent) or towards (anti-arborescent) the designated root.

This disclosure recognizes a hash tree or Merkle tree to be an example of the latter—i.e., an anti-arborescent directed rooted tree—whereby all of its edges are constructed by hashing vertices 'towards' the root.

3. Generalised Hash Tree Protocol

The described embodiments provide a generalised hash tree data structure explicitly defined to have the following properties:

Hierarchical position of leaf nodes—leaf nodes can be placed at any level of the tree below the root hash. This allows data to be injected into different levels of the hash tree that reflects an external hierarchy of the data.

Arbitrary number of children—each node may have an arbitrary number of children (or 'in-degree'), which may comprise any number of internal child nodes and any number of leaf child nodes.

Variable branching factor—the branching factor K for an internal node, giving the ratio of the number of children (in-degree) to number of parents (out-degree), does not have to be common throughout the tree.

These properties in combination allow the construction of a hash tree that can represent a data set with a second-tier hierarchy overlaid on top of it, whilst also maintaining the core function of the tree, namely the ability to efficiently verify a given data block using the same Merkle proof principles as set out above.

These core functions are that the tree must be able to represent the entire data set in a single hash value, i.e. the root (i.e. all nodes must be directly or indirectly connected to a common root node) and that it must be possible to perform a Merkle proof of existence on any one block of data in the set, irrespective of its position in the hierarchy.

Figure 6:
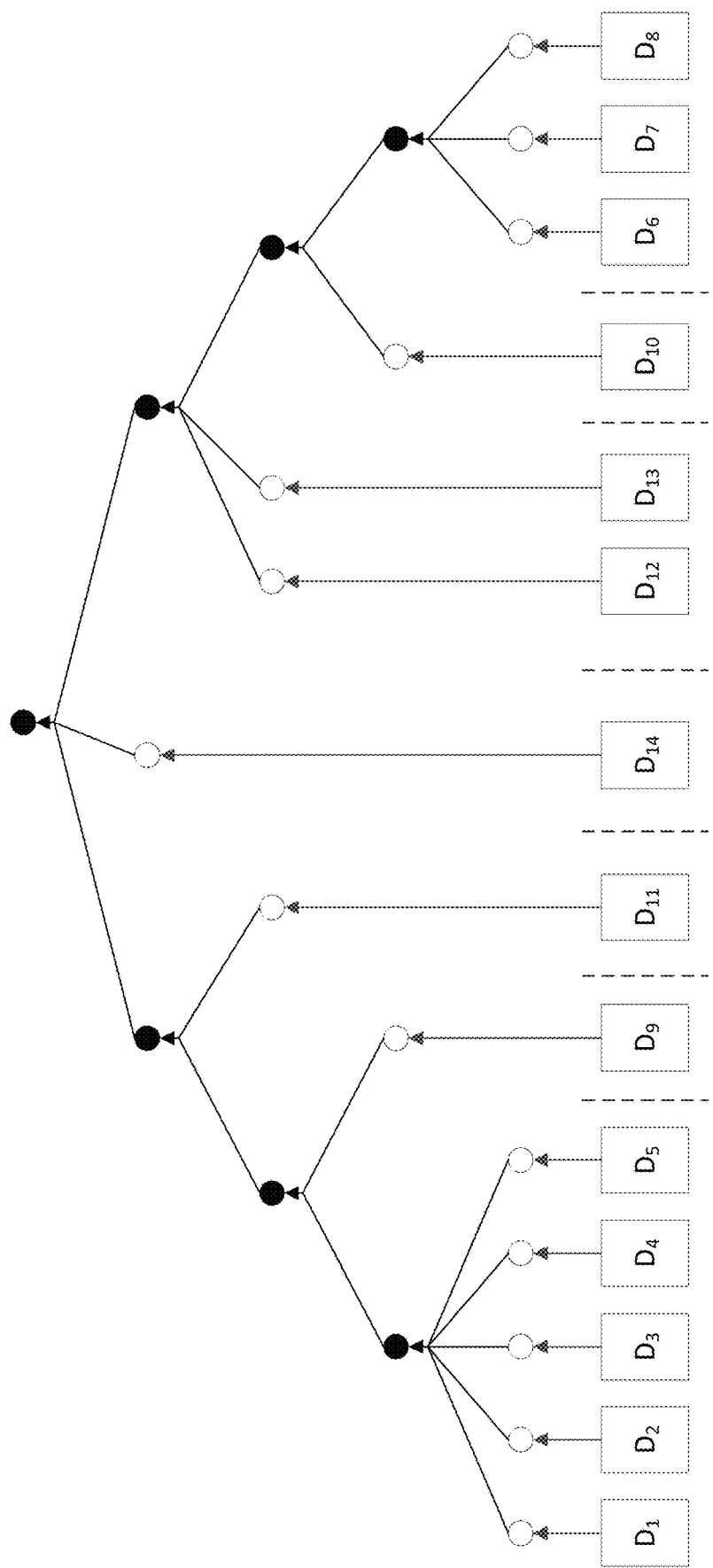
FIG. 6 shows an example of a generalised hash tree.

An example of a generalised hash tree structure is shown in FIG. 6. This example demonstrates a hierarchy of fourteen data blocks $D_1$-$D_{14}$, which are injected into the hash tree at varying levels. This is in contrast to a traditional Merkle tree structure, in which all of these injections of data would happen at the bottom layer of the tree.

Rules of the Generalised Hash Tree

A hash tree which achieves the desired properties can be constructed according the following set of rules. Using the above terminology, this set of rules constitutes the "schema" according to which any generalised hash tree is constructed:

1. Nodes—a node can have at most one parent and an arbitrary number of children. Nodes are generally either leaf nodes or non-leaf nodes, but overall can be diversified into three categories:
    a. A root node is defined by having no parent.
    b. An intermediary node is defined by having at least one parent and at least one child.
    c. A leaf node is defined by having no children.
  Note that both (a) and (b) are examples of non-leaf nodes, while (c) are leaf nodes.
2. Edges—An edge is created by hashing a node concatenated with its siblings in a specific order. The edge between a parent and child is created by hashing of all the parent's children concatenated in sequence.
  Given a parent P and four children, $C_1, C_2, C_3, C_4$, the following edges can be created:

$C_1 \rightarrow P: H(C_1\|C_2\|C_3\|C_4)$ $C_2 \rightarrow P: H(C_1\|C_2\|C_3\|C_4)$ $C_3 \rightarrow P: H(C_1\|C_2\|C_3\|C_4)$ $C_4 \rightarrow P: H(C_1\|C_2\|C_3\|C_4)$ Note that the mathematical construction of each edge is the same, and therefore an edge between parent and child may only be created once the entire set of siblings is known.
  Note also that the resulting hash value $H(C_1\|C_2\|C_3\|C_4)$ is the hash value of the parent node. Therefore, Rule 2 can be equivalently formulated as "the hash value of the parent node is a hash of a concatenation of the hash values of its child nodes" in a specified order.
3. Arbitrary number of children—there is no restriction on the number of children any non-leaf node may have. Leaf nodes have no children by definition (see rule 1).
4. Position of leaf nodes—there is no restriction on the depth at which a leaf node may be placed in the hash tree. A leaf node may therefore exist at any level in the tree.

In order to provide additional robustness against "second pre-image attacks", an additional rule may also be introduced into the schema:

5. Leaf and non-leaf nodes are distinguishable—all leaf nodes may be explicitly distinguishable from non-leaf nodes. This may for example be done by prepending the hash value of each leaf node with a predetermined prefix e.g. 0×00.

A second pre-image attack refers to a situation in which an attacker successfully discovers preimage of a hash value (i.e. a data block which hashes to that value) without knowledge of the original preimage for which the hash value was computed.

Applying the above terminology, a generalised Merkle tree has additional rules relating to indexing and node equations, which may be formalized as follows:

6. Indexing system—all nodes must be labelled uniquely and according to a common indexing system (see 3.1.1).
7. The Golden Rule—when labelling a set of sibling nodes, the non-leaf siblings are labelled before the leaf siblings (see 3.1.2).
8. Node equations—all nodes must obey the node equation for the generalised hash tree. This equation relies on the structure provided by an indexing system and allows the hash value of every node in the tree to be constructed in a recursive manner from its children (see 3.3).

Note: Rules 5 to 8 are optional in respect of generalised hash trees. That is to say, only Rules 1 to 4 define fundamental properties of a generalised hash trees. Rule 5 is an optional implementation feature to provide additional security, and Rules 6 to 8 define a particularly convenient set of node equations for constructing a generalised hash tree and an indexing scheme adopted in those node equations (noting that, although convenient, other indexing schemes and node equation formulations may nonetheless be viable).

3.1.1 Indexing System

Figure 7:
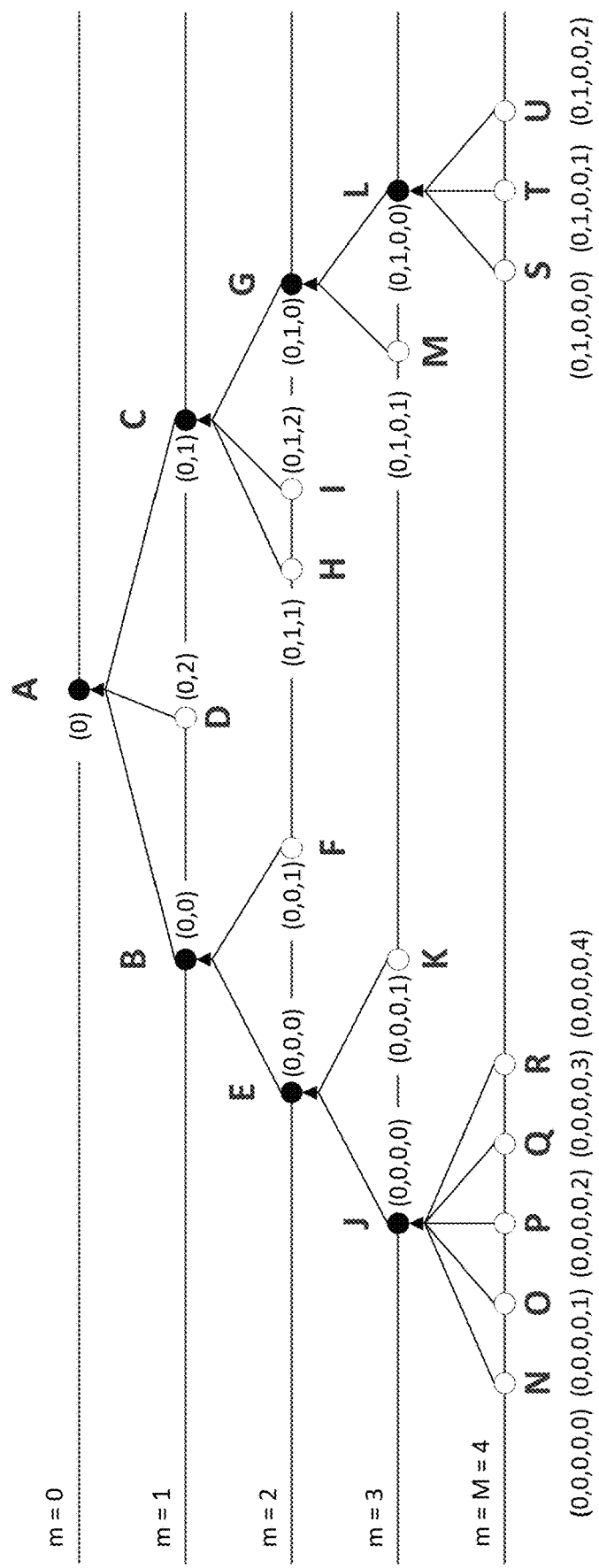
FIG. 7 shows an example of a generalised Merkel tree with index tuples assigned to nodes.

FIG. 7 shows the generalised hash tree of FIG. 6 with all nodes given an alphabetical reference sign A-U.

In order to create a generalised hash tree such as the example shown in FIG. 5 (see 3.2), the above-mentioned indexing and notation system allows each node to be identified easily and betrays its position within the hash tree clearly.

The basic notation used to represent a node in the generalised hash tree is

Node: $N_{0, i_0, \ldots, i_{m-2}, j}$.

The term "index tuple" may be referred to the indexes $(0, i_0, i_{m-2}, j)$ of the node noting that these indexes have a defined order. The level of the node in the tree is encoded in terms the number of indexes of its index tuple: a node with an index tuple containing m+1 indexes is at level m. This description adopts the convention that the root hash is at level m=0 and the deepest leaf node is at level m=M, where M is termed the depth of the tree, and with this definition The sub-script indices trace a path down the tree from the root node to the node in question. This path can be broken down into three types of sub-script indices Root index—the null index '0' is always the first sub-script index, signifying that each node in the tree is connected by a finite number of edges to the root. The root node is labelled $N_0$.

Intermediary index—a node at level m will always have m−2 intermediary indices (null if m≤2). These indices represent the path of nodes from the root to the parent of the node in question. These indices are written as $i_0, \ldots, i_{m-2}$.

Sibling index—the final sub-script index j of a node indicates its position with respect to its siblings.

Each node in a generalised hash tree will have exactly m+1 indices: one root index (0), m−2 intermediary indices $(i_0, i_{m-2})$ and one sibling index (j).

Note also that all indices are non-negative integers, starting from zero and increasing.

For ease of explanation, an internal node may be referred to as an 'intermediary node' when discussing blockchain-based implementations of the generalised hash tree method. Henceforth, these two terms will be considered equivalent and interchangeable.

Note that the root index need not be explicitly encoded when indexes are computed, because it is always zero (i.e. the root index may be implicit in that it is not actually stored as a value when the index tuples are computed).

The Golden Rule

Indexes are assigned in accordance with the above indexing system according to a golden rule (GR). The rule is stated as follows:

GR—when determining the sibling indices j for n sibling nodes, values j=0, j=n−1 are assigned:
  1. From left to right; and
  2. Such that intermediary siblings are assigned before leaf siblings.

Nodes are named top-to-bottom and left-to-right. Top-to-bottom locates the branching path and hence the parent of a node. The right-to-left indicates the position of a child of said parent relative to its siblings.

Hashing

As will be shown in the node equations, the process of hashing has two meanings in the generalised hash tree. Any data block D that is to be included in the tree, at any level, will be double-hashed as $H^2(D)$ to form a leaf node (the value of which is a "double-hash" value). However, whenever multiple leaf and/or internal nodes are combined to form a new internal node in the tree, they are concatenated and hashed only once i.e. H (Leaf$_1$||Leaf$_2$) (to obtain a "single-hash" value).

Double hashing provides the benefit that a single-hash value (i.e. as obtained by applying the hash function only once to the data block—referred to single-hashing) can be published to provide proof of ownership or receipt of the underlying data block, which in turn can be verified in respect of the generalised hash tree, without revealing the data block itself. This is beneficial when the hash tree is used to represent sensitive data. More generally, the term "multi-hash" refers to a hash value obtained by hashing a data block two or more times (i.e. hashing the data block and then, at the very least, hashing the result thereof using the same or a different hash function).

Alternatively, for non-sensitive data, single-hashing may be sufficient, i.e. the hash value of each leaf node may be a single-hash of the underlying data block.

The generalised hash tree and method are not limited to any single hashing algorithm or function, and simply require that a cryptographically-secure one-way function is used.

Indexing the Generalised Hash Tree

FIG. 7 shows an example of the generalised hash tree structure of FIG. 6, whereby the indexing conventions have been employed. Thus:

The root node—there is only ever one root node in the hash tree, in this case labelled A.

e.g. A is labelled: $N_0$.

Intermediary nodes—the nodes B, C, E, G, J and L are all intermediary nodes, acting as a summary of the hashes of the sub-tree beneath it.

e.g. B is labelled: $N_{0,0}$.

e.g. K is labelled: $N_{0,0,0,1}$.

etc.

Leaf nodes—the nodes D, F, H, I, K, M, N, O, P, Q, R, S, T and U are all leaf nodes, comprising the double hash of a data block.

e.g. F is labelled: $N_{0,0,1}$.

e.g. P is labelled: $N_{0,0,0,0,2}$.

e.g. U is labelled: $N_{0,1,0,0,2}$.

etc.

The full list of labels for all the nodes in FIG. 7 are shown in Table 1.

| | | Name | Node Indices | Node Label | Intermediary indices, $\{i_0, \ldots, i_{m-2}\}$ | Sibling index, j | Number of children, n |
|---|---|---|---|---|---|---|---|
| Level of node, m | m = 0 | A | (0) | $N_0$ | {none} | none | 3 |
| | m = 1 | B | (0, 0) | $N_{0,0}$ | {none} | 0 | 2 |
| | | C | (0, 1) | $N_{0,1}$ | {none} | 1 | 3 |
| | | D | (0, 2) | $N_{0,2}$ | {none} | 2 | 0 |
| | m = 2 | E | (0, 0, 0) | $N_{0,0,0}$ | {0} | 0 | 2 |
| | | F | (0, 0, 1) | $N_{0,0,1}$ | {0} | 1 | 0 |
| | | G | (0, 1, 0) | $N_{0,1,0}$ | {1} | 0 | 2 |
| | | H | (0, 1, 1) | $N_{0,1,1}$ | {1} | 1 | 0 |
| | | I | (0, 1, 2) | $N_{0,1,2}$ | {1} | 2 | 0 |
| | m = 3 | J | (0, 0, 0, 0) | $N_{0,0,0,0}$ | {0, 0} | 0 | 5 |
| | | K | (0, 0, 0, 1) | $N_{0,0,0,1}$ | {0, 0} | 1 | 0 |
| | | L | (0, 1, 0, 0) | $N_{0,1,0,0}$ | {10} | 0 | 3 |
| | | M | (0, 1, 0, 1) | $N_{0,1,0,1}$ | {1, 0} | 1 | 0 |
| | m = 4 | N | (0, 0, 0, 0, 0) | $N_{0,0,0,0,0}$ | {0, 0, 0} | 0 | 0 |
| | | O | (0, 0, 0, 0, 1) | $N_{0,0,0,0,1}$ | {0, 0, 0} | 1 | 0 |
| | | P | (0, 0, 0, 0, 2) | $N_{0,0,0,0,2}$ | {0, 0, 0} | 2 | 0 |
| | | Q | (0, 0, 0, 0, 3) | $N_{0,0,0,0,3}$ | {0, 0, 0} | 3 | 0 |
| | | R | (0, 0, 0, 0, 4) | $N_{0,0,0,0,4}$ | {0, 0, 0} | 4 | 0 |
| | | S | (0, 1, 0, 0, 0) | $N_{0,1,0,0,0}$ | {1, 0, 0} | 0 | 0 |
| | | T | (0, 1, 0, 0, 1) | $N_{0,1,0,0,1}$ | {1, 0, 0} | 1 | 0 |
| | | U | (0, 1, 0, 0, 2) | $N_{0,1,0,0,2}$ | {1, 0, 0} | 2 | 0 |

Table 1: The labels and notations for the hash tree of FIGS. 6 and 7.

This table is a complete representation of the hash tree shown in FIG. 6. Such a table representation may be used to tangibly embody a generated hash tree data structure, for example in an off-chain system (see below).

The Node Equations

Recall the notation for a node $N_0, i_0, \ldots, i_{m-2}, j$, which may have any number of children n. Throughout this section, the symbol + is used to represent data concatenation (usually denoted ||) and the use of angle brackets (denoting the pushing of the data within a pair of angle brackets to the stack) is dropped. That is, x+y is taken to mean <x>||<y>.

A function $G_\alpha$ is defined to compute the concatenative sum over all elements a, or at least elements corresponding to a in the range $0 \leq \alpha \leq n-1$, as the following (noting that $\Sigma$ denotes concatenation, not summation, over the defined range):

$$G_\alpha(x) := \Sigma_\alpha x_\alpha = \Sigma_{\alpha=0}^{n-1} x_\alpha = x_0 + x_1 + \ldots + x_{n-1}.$$

In accordance with the generalised hash tree schema, the value of each node can be defined simply as the hash of the concatenative sum of all its children in order (as specified by the golden rule of 3.1.2). This can be written mathematically as $$\text{Node} := H(\Sigma \text{Child}_0 + \text{Child}_1 + \ldots + \text{Child}_{n-1})$$

This definition for the value of a node can now be expressed using the concatenative summation notation from above, where each element $x_\alpha$ becomes a respective child of a node, as the following:

$$N_{0,i_0,\ldots,i_{m-2},j} := H\left(\sum_{\alpha=0}^{n-1} N_{0,i_0,\ldots,i_{m-2},j,\alpha}\right),$$

$$= H\left(N_{0,i_0,\ldots,i_{m-2},j,0} + N_{0,i_0,\ldots,i_{m-2},j,1} + \cdots + N_{0,i_0,\ldots,i_{m-2},j,n-1}\right),$$

which captured the fact that a node is the hash of the concatenation of all its children in order in terms of mathematical operations defined in relation to the above indexing scheme.

The node whose value is being calculated has m+1 indices, therefore its children must necessarily have exactly m+2 indices, whereby the first m+1 indices of the children are identical to those of the parent. Note that the dummy index $\alpha$, used for summation, therefore represents the additional sibling index (the m+$2^{th}$ index) of each respective child of the node in question.

Recursion

This principle of adding an additional index for each incremental increase in the level of the node allows the value of a node to be expressed using a succinct recursive expression.

Greek letters ($\alpha, \beta, \gamma, \ldots \omega$) are used to represent the "dummy" (sibling) indices that express this recursion, so as not to confuse with the Latin letters (i,j) used to express the original m+1 indices of the node to be calculated.

To see how this recursion works in the formula above, consider a node $N_0, i_0, \ldots, i_{m-2}, j$, which has many descendants spanning many generations. The sibling index of the first generation of descendants is denoted by the dummy index $\alpha$, the second generation denoted by $\beta$ and so forth down to the final (deepest) generation denoted by $\omega$.

The formula for the value of the node can then be written in the following way:

$$N_{0,i_0,\ldots,i_{m-2},j} := H\left(\sum_{\alpha=0}^{n-1} N_{0,i_0,\ldots,i_{m-2},j,\alpha}\right), =$$

$$H\left(\sum_{\alpha=0}^{n-1} H\left(\sum_{\beta=0}^{n'-1} N_{0,i_0,\ldots,i_{m-2},j,\alpha,\beta}\right)\right), =$$

$$H\left(\sum_{\alpha=0}^{n-1} H\left(\sum_{\beta=0}^{n'-1} H\left(\sum_{\gamma=0}^{n''-1} N_{0,i_0,\ldots,i_{m-2},j,\alpha,\beta,\gamma}\right)\right)\right), =$$

$$H\left(\sum_{\alpha=0}^{n-1} H\left(\sum_{\beta=0}^{n'-1} H\left(\sum_{\gamma=0}^{n''-1} \ldots H\left(\sum_{\omega=0}^{n'\ldots'-1} N_{0,i_0,\ldots,i_{m-2},j,\alpha,\beta,\gamma,\ldots,\omega}\right)\ldots\right)\right)\right).$$

It can be seen that each first descendant of the node in question can be expanded in terms of its "descendants" (children and, where applicable, grandchildren, i.e. nodes indirectly connected to it via one or more other nodes), and these in turn can be expanded in terms of their descendants recursively until the bottom-most generation (denoted by $\omega$) is reached.

Note here that the summation upper limit changes for each descendant generation to reflect the fact that different descendants may have a different number of children.

For instance, the dummy index a ranges from $0 \leq \alpha \leq n-1$ to indicate that the node whose value is to be calculated has n children. Each of these children may have a different number of children n' themselves (second generation w.r.t the node) and so the dummy index β runs from $0 \leq \beta \leq n'1$ to reflect this.

To summarise, the expression for the value of a node can be written in a recursive way that expresses how the value of a node is built up from not only its children but indeed all of its descendants as $$N_{0},i_{0}, \ldots, i_{m-2},j := H(\Sigma_{\alpha=0}^{n-1} N_{0},i_{0}, \ldots, i_{m-2},j,\alpha),$$

Leaf and Non-Leaf nodes

As outlined in section 3.1, the generalised hash tree may comprise leaf nodes (having no children) and non-leaf children (having at least one child).

These two classes of nodes are fundamentally different. A leaf node represents an 'end point', and usually some data D, that terminates a particular tree branch, while a non-leaf node does not terminate a branch and may have many descendant generations.

This difference is reflected in the node equations to ensure that leaf and non-leaf nodes are treated differently.

The value of a leaf node $N_{0},i_{0}, \ldots, i_{m-2},j$ with n=0 children, is defined as the double-hash of the data packet $D_{0},i_{0}, \ldots, i_{m-2},j$ represented by that node. This is written as $$N_{0},i_{0}, \ldots, i_{m-2},j := H^{2}(D_{0},i_{0}, \ldots, i_{m-2},j), n=0.$$

The distinction between the value of non-leaf nodes and that of leaf nodes is used when writing the final version of the node equations.

Splitting the Summation

In section 3.1.2, the golden rule (GR) established that, for a given set of sibling nodes, non-leaf nodes are labelled before leaf nodes.

The reason for this was to ensure that the recursive formula for nodes would consistently sum the non-leaf children, which in turn must be expanded into their own children, before the leaf children.

Conceptually, this aspect of the GR allows the formula for the value of a node to be computed by splitting the "summation" (or rather, concatenation) into two "summations" over different limits as follows $$N_{0,i_0,\ldots,i_{m-2},j} := H\left(\sum_{\alpha=0}^{n-1} N_{0,i_0,\ldots,i_{m-2},j,\alpha}\right), =$$

$$H\left(\underbrace{\sum_{\alpha=0}^{\epsilon-1} N_{0,i_0,\ldots,i_{m-2},j,\alpha}}_{\text{Sum over non-leaves}} + \underbrace{\sum_{\alpha=\epsilon}^{n-1} N_{0,i_0,\ldots,i_{m-2},j,\alpha}}_{\text{Sum over leaves}}\right).$$

The above split summation considers a node with a total of n children, split into $\epsilon$ non-leaf children and $n-\epsilon$ leaf children respectively. This, in turn, reflects the fact that, in a generalised hash tree, a parent node can have a mixture of both leaf child node(s) and non-leaf-child node(s), in contrast to a classical has tree.

The limits on the left-hand sum represent the concatenation all of the non-leaf children, which is done here before the right-hand sum concatenates all of the leaf children. This is the intended consequence of the GR as formulated previously.

The Node Equations

In summary, a pair of succinct equations for the value of any given node in the generalised hash tree can be written as:

$$N_{0,i_0,\ldots,i_{m-2},j} := \begin{cases} H^2(D_{0,i_0,\ldots,i_{m-2},j}) & n=0 \\ H\left(\sum_{\alpha=0}^{n-1} N_{0,i_0,\ldots,i_{m-2},j,\alpha}\right) & n>0 \end{cases}$$

These equations account for the distinctions between leaf nodes and non-leaf nodes, express the value of a node recursively as the culmination of its descendants and can be separated at any level into non-leaf and leaf children.

These equations can also be rewritten using the concatenative summation function $G_\alpha$ as:

$$N_{0,i_0,\ldots,i_{m-2},j} := \begin{cases} H^2(D_{0,i_0,\ldots,i_{m-2},j}) & n=0 \\ H(G_\alpha(N_{0,i_0,\ldots,i_{m-2},j})) & n>0 \end{cases}$$

Calculating Node Hash Values

Figure 8:
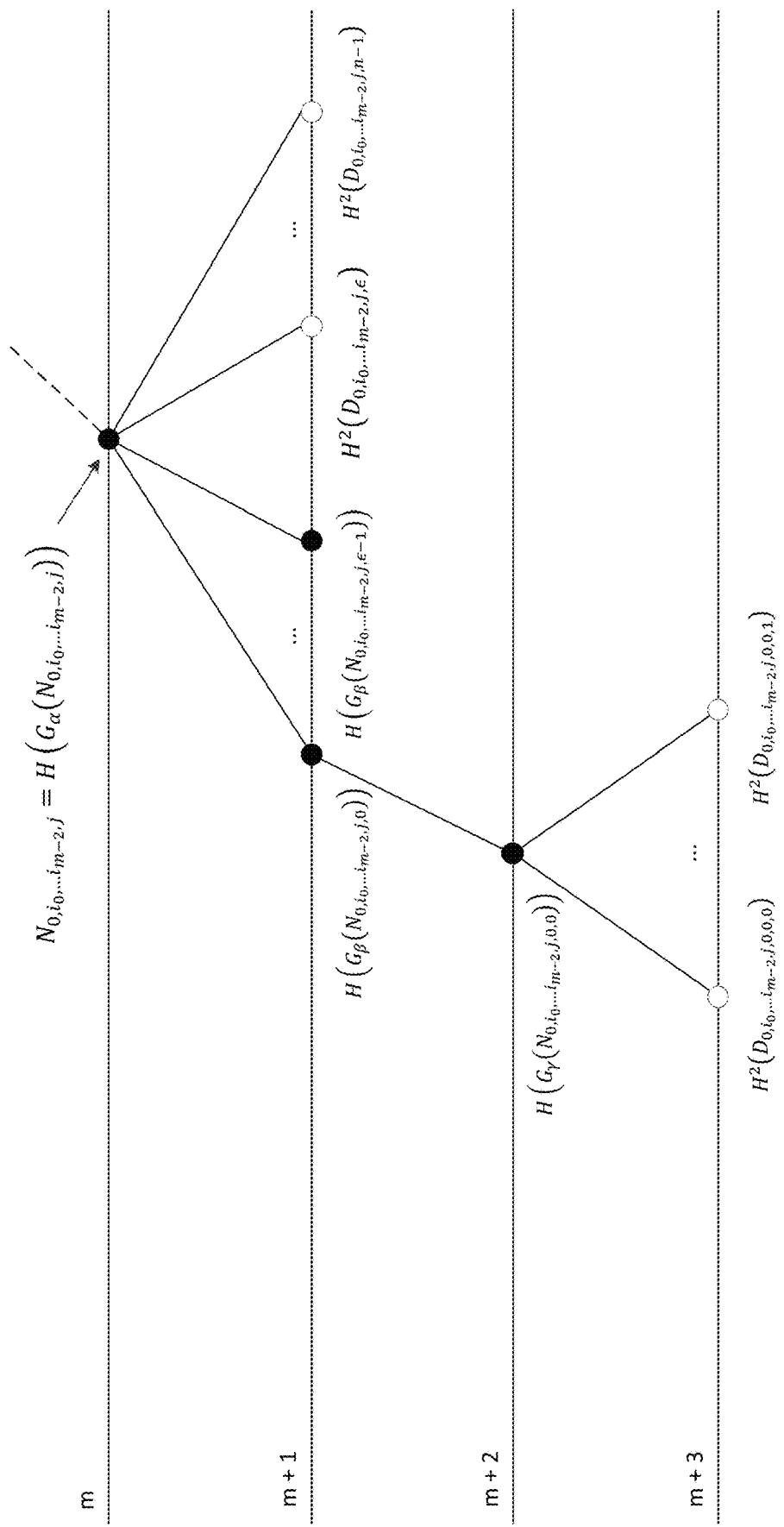
FIG. 8 shows a branch of a second example generalised hash tree and illustrates how the values of nodes are computed via recursive computations.

FIG. 8 shows a branch of a generalised hash tree, showing how a node (level m) is calculated from its descendants.

An example node $N_{0},i_{0}, \ldots, i_{m-2},j$ is shown whose value is to be calculated. The node is at an arbitrary level m and may have multiple "ancestors" above it (denoted by the dotted line; ancestors being nodes to which it is directly or indirectly connected), however only its descendants need to be considered in order to calculate its hash value.

Black circles are used to represent non-leaf nodes and white circles are used to represent leaf nodes.

The value the node is calculated, using the recursive node equations, in a few steps as shown below.

1. Write the node in terms of a concatenative sum:

$$N_{0},i_{0}, \ldots, i_{m-2},j = H(G_\alpha(N_{0},i_{0}, \ldots, i_{m-2},j)).$$

2. Expand the sum in terms of then children of that node. In the diagram these are shown split into $\epsilon$ non-leaf nodes and $n-\epsilon$ leaf nodes:

$$G_\alpha(N_{0,i_0,\ldots i_{m-2},j}) =$$

$$\underbrace{H(G_\beta(N_{0,i_0,\ldots i_{m-2},j,0})) + \cdots + H(G_\beta(N_{0,i_0,\ldots i_{m-2},j,\epsilon-1}))}_{\text{Non-leaf children}} +$$

$$\underbrace{H^2(D_{0,i_0,\ldots i_{m-2},j,\epsilon}) + \cdots + H^2(D_{0,i_0,\ldots i_{m-2},j,n-1})}_{\text{Leaf children}}.$$

3. Expand the non-leaf children again in terms of their own children. In this case, although $N_0, i_0, \ldots, i_{m-2}, j, \epsilon-1$ is a non-leaf and has descendants, only the expansion of the node $N_0, i_0, \ldots, i_{m-2}, j, 0$ is shown for simplicity:

$$G_\beta(N_{0},i_{0}, \ldots, i_{m-2},j,0) = H(G_\gamma(N_{0},i_{0}, \ldots, i_{m-2},j,0,0))$$

4. Expand the final non-leaf descendant in terms of its own children. This leaves two leaf node children, so all branches underneath $N_0, i_0, \ldots, i_{m-2}, j$ have now terminated:

$$G_\gamma(N_{0},i_{0}, \ldots, i_{m-2}, j,0,0) = H^2(D_{0},i_{0}, \ldots, i_{m-2},j,0,0,0) + H^2(D_{0},i_{0}, \ldots, i_{m-2},j,0,0,1)$$

5. Plug in all of the required hash values, from the bottom upwards, in order to calculate the node hash value using the equation from step 1:

$$N_{0,i_0,\ldots i_{m-2},j} = H(G_\alpha(N_{0,i_0,\ldots i_{m-2},j})) =$$

$$H(H(G_\beta(N_{0,i_0,\ldots i_{m-2},j,0})) + \cdots + H(G_\beta(N_{0,i_0,\ldots i_{m-2},j,\epsilon-1})) +$$

-continued $$H^2(D_{0,i_0,\ldots\ i_{m-2},j,\epsilon}) + \cdots + H^2(D_{0,i_0,\ldots\ i_{m-2},j,n-1})) =$$

$$H(H(H(G_\gamma(N_{0,i_0,\ldots\ i_{m-2},j,0,0}))) + \cdots + H^2(D_{0,i_0,\ldots\ i_{m-2},j,n-1})) =$$

$$H(H(H(H^2(D_{0,i_0,\ldots\ i_{m-2},j,0,0,0}) + H^2(D_{0,i_0,\ldots\ i_{m-2},j,0,0,1}))) +$$

$$\cdots + H^2(D_{0,i_0,\ldots\ i_{m-2},j,n-1})).$$

Note how the final line of the calculation is entirely in terms of leaf node hash values, which are dependant only on the data packets D corresponding to these leaf nodes.

Extending a Generalised Hash Tree

A key advantageous property of the generalised hash tree is that it is possible to add new data to the tree at any time after its initial creation.

For example, if a generalised hash tree is used to represent a stable version of a document at one point in time, it is simple to make an additional change at some later time by adding a new data leaf $H^2(D_{new})$ at any point in the tree.

Figure 9:
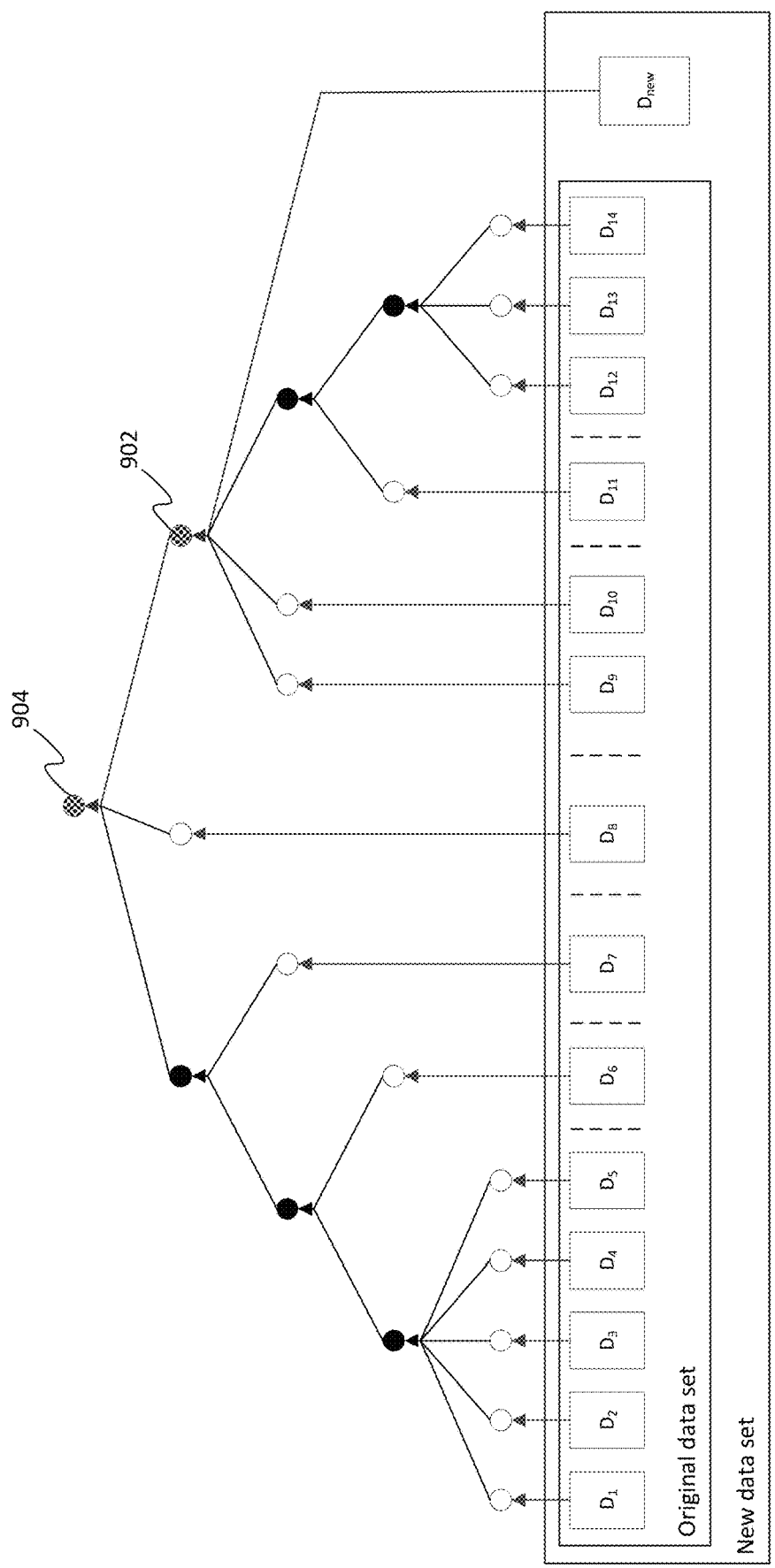
FIG. 9 shows a modified generalised hash tree to which a new leaf node has been added.

By way of example, FIG. 9 shows a generalised hash tree that is extended by an additional data packet $D_{new}$. The nodes of the original tree that need to be updated are shown as chequered circles denoted by reference numerals 902 and 904 respectively, node 904 being the root node.

Depending on where and at which level in the tree the new data is inserted, certain nodes will have to be recalculated as their unique hash values will have changed. This allows a change to propagate from any position in the tree upwards and reflect a hierarchy of change after-the-fact.

For the avoidance of doubt, in a blockchain context, references to changing or modifying a hash tree that has been committed to the blockchain do not imply any modification of immutably recorded data within the blockchain. Rather, for example, set of rules can be constructed for interpreting different versions of a hash tree stored in the blockchain (e.g. a simple rule might be that the latest version is interpreted as overwriting an earlier version of a portion thereof). For example, one could write new transactions to the blockchain to extend the hash tree in this way and interpret the latest 'version' of the data according to its recency as it appeared on the blockchain. Versioning can be resolved between blocks (i.e. which transaction was in the most recent block mined) and also within a block (i.e. which transaction appeared 'highest'/'lowest' in a given block, if they are in the same block).

Computing Merkle Proofs of Existence

An important benefit of the generalised hash tree is that a proof of existence can still be computed with a level of efficiency comparable to a classical Merkle tree, using a Merkle tree proof (see 2.1.1).

Figure 10:
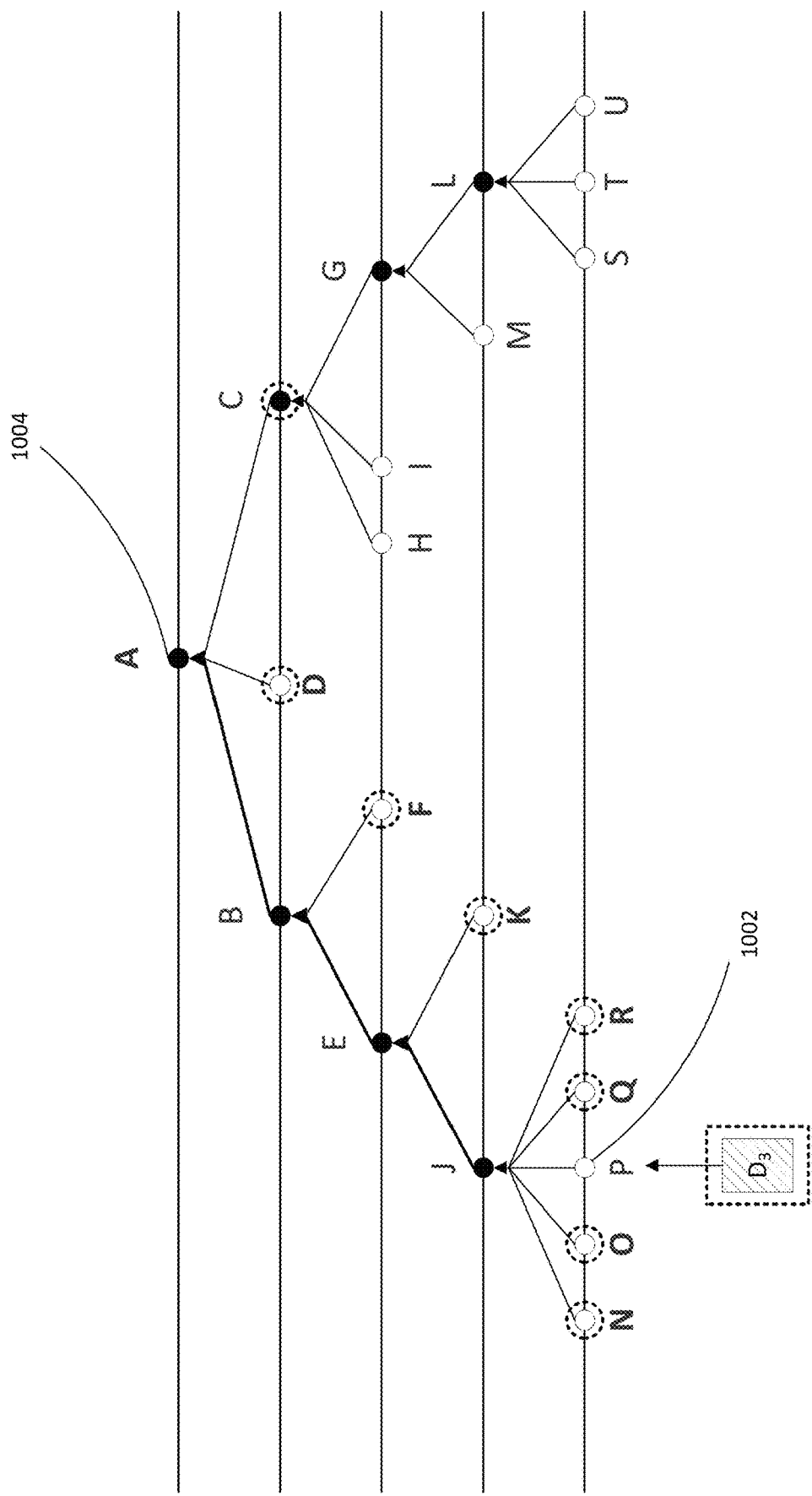
FIG. 10 shows how a Merkel proof may be performed for a generalised hash tree, FIG. 11 compares Merkel proof operations on a classical hash tree with Merkel proof operations in a generalised hash tree.

FIG. 10 shows schematically how a Merkle proof performed on a given (arbitrary) data block $D_3$. As in FIG. 5, nodes belonging to the authentication path for that data block are surrounded by dotted circles.

A reconstructed root hash 1004 is computed by (in this case) double-hashing the data block $D_3$ to be verified (comparable to the root hash 502 of FIG. 5), and a reconstructed root hash 1004 is computed by applying successive concatenation and hashing operations to the reconstructed root hash 1002 and the hash values of the nodes of the authentication paths in accordance with the edge structure of the tree, in order to compute a reconstructed root hash 1004 (comparable to R' in FIG. 5), which in turn can be compared with the hash value of the root node in order to verify the data block $D_3$.

FIG. 10 illustrates fact that, in order to perform a Merkle proof for the generalised hash tree, the same principles are applied as for a classical binary or non-binary Merkle tree. The Merkle path is still just the minimum set of hashes that are required to reach the root node and compare the reconstructed root hash 1004 to its known value.

In the example shown in FIG. 10, the Merkle proof (authentication path) is computed on a block of data $D_3$, whose hash[2] value is given by node P. To validate that this data block is a member of the data set represented by the tree, the hash values of nodes N, O, Q, R, K, F, C, D are required in order.

[2] Which, as noted, is preferably a double-hash of the block $D_3$ at least for sensitive data.

By concatenating the reconstructed root hash 102 for node P with its siblings and hashing, a reconstructed hash value for node J is computed. This process is repeated until the root node A is reached, which should be equal to the expected Merkle root hash value (i.e. the hash value of the root node).

There are a number of interesting properties that emerge when examining Merkle proofs of existence used with generalised hash tree when compared to proofs using classical Merkle trees.

Property 1: Required Number of Hashes

Referring back to section 2.1.1, consider such a binary classical tree of depth M, representing N data blocks. In order to perform a Merkle proof of existence on any one of these data blocks, it will always require $M=\log_2 N$ hash values for a successful proof.

However, in the proposed generalised tree this is not the case. The number of hash values required to compute a proof of existence will vary according to: (i) the depth of the node; and (ii) the number of siblings of the node.

This means that, while in some cases a Merkle proof may require more hash values (and possibly more computation) than in a classical binary tree, in others a Merkle proof will require fewer hash values (therefore possibly less computation).

For example, take the hash tree of FIG. 10. This hash tree stores 14 data blocks, and so its binary tree counterpart would have N=16 leaf nodes (2 null or duplicated values) and a Merkle proof of existence on any of the data blocks would require exactly 4 hash values.

However, the hash tree of FIG. 10 is such that proving the existence of nodes C and D would require only 2 values (fewer than the binary tree), while it would require 8 for nodes N, O, P, Q or R.

FIG. 11 shows a comparison of the varying number of hashes required for proofs in the generalised and classical Merkle tree constructions. This demonstrates the contrast in the number of required hashes between the generalised and classical Merkle tree constructions.

Property 2: Dual-Purpose Proofs

In classical Merkle trees, due to the fact that all leaf nodes are located at the bottom layer (m=M) of the tree, all Merkle proofs will require the same number of hash computations.

In other words, the number of times the 'concatenate and hash' operation is performed as part of a Merkle proof will be the same for each data leaf. For a tree of depth m=M, and where the root node is at m=0, each Merkle proof of existence will require exactly M such operations.

These operations are represented as arrows in FIG. 11. Each arrow represents the operation of concatenating a node with all its siblings and hashing to obtain the result.

The number of these operations (arrows) is a function only of the depth of the leaf node on which the Merkle proof of existence is being performed. This is why in a classical Merkle tree all proofs require M operations—all leaf nodes are at the bottom of the tree.

However, the generalised Merkle tree has been specified such that leaf nodes may exist at any level within the tree. This means that the number of operations involved in Merkle proofs will indeed vary, ranging from 1 to a maximum of M.

This distinction is evident in FIG. 11, where all Merkle proofs on the left-hand tree (classical) will require exactly m=M=4 operations, while in the right-hand tree (generalised) the number of operations varies from 4 for the bottom-level data packets to as few as 1 for the data packet $D_8$.

The very fact that the number of operations for Merkle proofs varies in the case of generalised hash trees means that these Merkle proofs can now be considered dual-purpose:

Purpose 1: A Merkle proof existence that enables a data packet D to be shown to be a member of a larger data set D without possessing the full data set.

Purpose 2: A Merkle proof of existence that enables a data packet D to be shown to exist at a particular level m in a hierarchy of data belonging to the set D.

Only the first of these purposes is applicable to standard Merkle proofs of existence implemented with a classical Merkle tree, whereas both apply to Merkle proofs performed on the generalised hash tree.

This is because not only does a Merkle proof for a generalised hash tree achieve the same proof of set membership as in the classical case, but the number of operations used in performing the proof also betrays the height (level) at which the data D is included in the hash tree.

When the data leaves form a hierarchy, the Merkle proof may then be used to show that the data was inserted in the tree at a given level m—if the proof comprises exactly m 'concatenate and hash' operations—and thus both set membership and hierarchical position within that set.

4. Example Blockchain Encoding

Figure 12A:
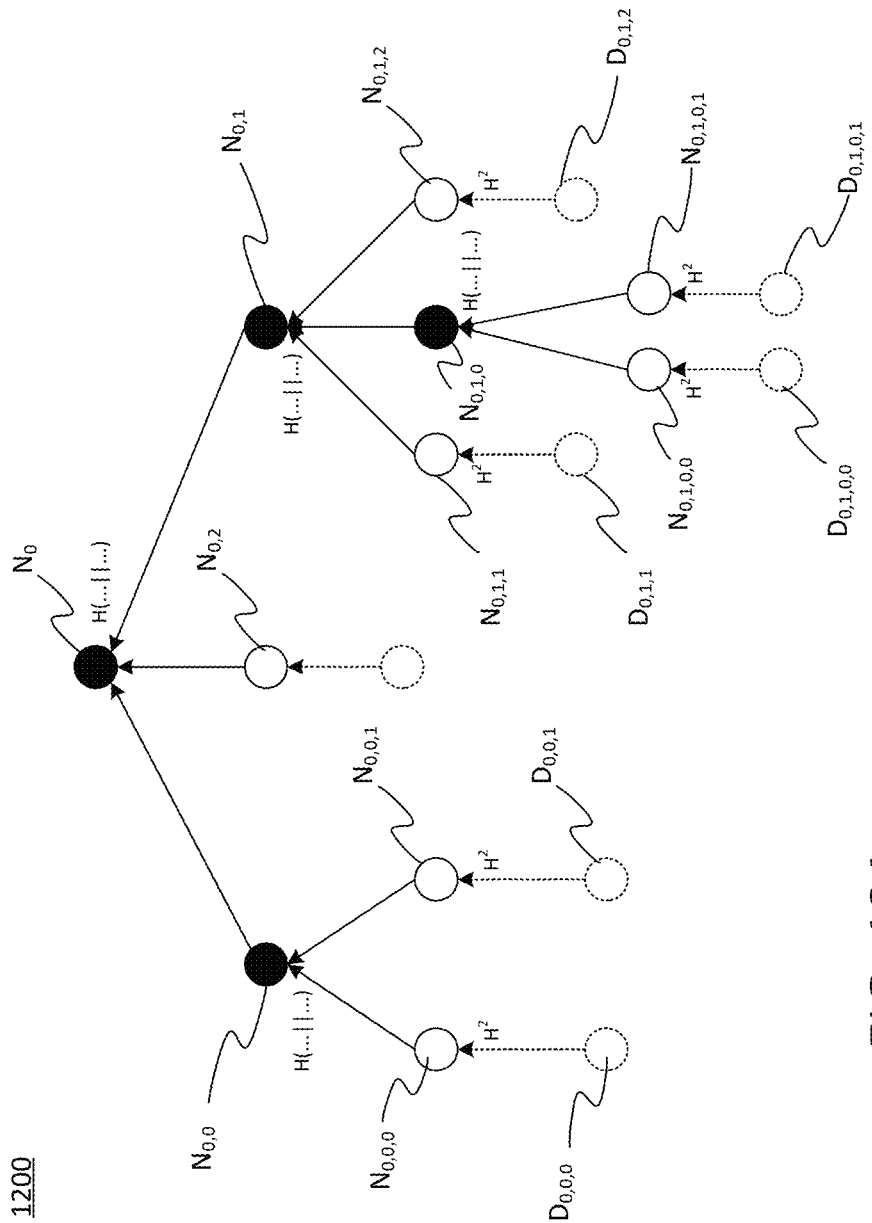
FIGS. 12A and 12B show a third example of a generalised hash tree.

FIG. 12A shows a schematic block diagram of a data structure in the form of a generalised hash tree (referred to synonymously herein as a generalised Merkle tree). The generalised hash tree is denoted by reference numeral 1200 and is shown to comprise a plurality of nodes and edges structured in a manner that utilises the additional flexibility afforded by the generalised hash tree schema. It will be appreciated that this is merely one illustrative example and a generalised hash tree can take any form that meets the requirements set out above.

Each node in the generalised hash tree 1200 is represented by a circle and has a level which is defined by the number of edges that connect it to a common root node $N_0$. As is the case for all generalised hash trees, there is a single common root node $N_0$ to which all other nodes are directly or indirectly connected. The root node $N_0$ is the only node of the generalised hash tree having a level of zero.

The example of FIG. 12A shows three nodes at level 1. That is, three nodes which are directly connected to the root node $N_0$ by a single directional edge from that node to the root node $N_0$. Of those three level 1 nodes, two are shown to be non-leaf nodes and the third is shown to be a leaf node (non-leaf nodes being any node to which at least one other node is directly connected by a directional edge, which in turn is referred to a child node of that leaf node; non-leaf nodes being any node without any child node in this sense).

A node indirectly connected to a parent node (i.e. connected to the parent node via one or more other nodes and thus by more than one directional edge) may be referred to as a grandchild node of the parent node. Each such parent node may be referred to as an ancestor of its children or grandchildren.

In the following description, the commas from each index tuple are omitted when unnecessary for disambiguation. So, for example, the notation $N_{001}$ is equivalent to $N_{0,0,1}$ elsewhere in this description.

In accordance with the indexing system described above, the two non-leaf nodes at level 1 are denoted by $N_{00}$ and $N_{01}$ and the non-leaf node at level 1 is denoted by $N_{02}$.

Node $N_{00}$, in turn, has two child nodes denoted by $N_{000}$ and $N_{001}$. In the present example, both of those child nodes $N_{000}$ and $N_{001}$ happen to be leaf nodes having no child nodes of their own. These are at level 2 in the generalised hash tree, being connected to the root node $N_0$ via the level 1 node $N_{00}$ (the "parent" node of both node $N_{000}$ and $N_{001}$), each via a total of two directional edges (the edge from that node to the parent node $N_{00}$ and the directional edge from the parent node $N_{00}$ to the root node $N_0$.

Node $N_{01}$ is shown to have three child nodes at level 2, denoted by $N_{010}$, $N_{011}$ and $N_{012}$. One of those child nodes is itself a non-leaf node, and in accordance with the above indexing scheme has the lowest sibling index of zero (i.e. the non-leaf child node is node $N_{010}$). That node, in turn, is shown to have two child nodes at level 3 in the hash tree 1200, denoted by $N_{0100}$ and $N_{0101}$, both of which happen to be leaf nodes in the present example. Each of those level 3 child nodes is connected to the root node $N_0$ indirectly via their parent node $N_{010}$ and its own parent node $N_{01}$, via a total of three directional edges.

The remaining child nodes of node $N_{01}$, i.e. nodes $N_{011}$ and $N_{012}$, are leaf nodes with no child nodes of their own.

Each leaf node is represented as a white circle and each non-leaf node, including the root node $N_0$, is represented as a black circle. The hash value of each leaf node is a double hash of a data block, such as a document, file etc. In general, a data block can take any form and simply refers to the pre-image which is double hashed in order to obtain the hash value of a leaf node. Each directional edge is denoted by a solid arrow from a child node to a parent node.

The notation $D_i$ is used to denote the data block which is double hashed in order to obtain the hash value of node $N_1$ where i denotes an index tuple of that non-leaf node. As per the above schema, the length of the index tuple increases with the level of the node. So, for example, the data block hashed to compute the hash value of node $N_{0100}$ is denoted by $D_{0100}$ and the data block hashed to obtain the hash value of leaf node $N_{001}$ is denoted by $D_{001}$ etc. Each such data block is represented in FIG. 12A by a circle having a dotted outline (note: this is not a node of the generalised hash tree according to the definitions used herein), and a dotted arrow is used to represent the relationship between a data block and the corresponding leaf node (note: this is not an edge of the data structure according to the definitions used herein). The double hashing relationship between data blocks and non-leaf nodes is denoted by the operator $H^2$.

As per the above schema, the hash value of each non-leaf node is a single hash of a pre-image, that pre-image being in the form of a concatenated string formed by concatenating the hash values of all of its child nodes. So, by way of example, the hash value of node $N_{00}$ is a hash of a concatenation of the hash values of its child nodes, i.e. node $N_{000}$ and $N_{001}$. This is denoted in FIG. 12A by H( . . . ∥ . . . ), noting that the concatenation is over all child nodes, of which there can be any number.

The generalised hash tree schema is flexible enough to admit parent nodes with a single child node—in that case, the hash value of the parent nodes is a hash of the hash value of the single child node.

In the example of FIG. 12A, both of the child nodes of node $N_{00}$ happen to be leaf nodes. However, the generalised hash tree schema also admits non-leaf nodes whose child nodes are a mixture of leaf and non-leaf nodes. Node $N_{01}$ falls into this category and its hash value is a hash of a concatenation of the hash value of its non-leaf child node $N_{010}$ with the hash values of its leaf child nodes $N_{011}$ and $N_{012}$.

The hash value of the non-leaf child node $N_{010}$, is, in turn, a hash of a concatenation of the hash values of its child nodes $N_{0100}$ and $N_{0101}$ (both of which happen to be leaf nodes in this example, and which are thus derived as a double hash of corresponding data blocks $D_{0100}$ and $D_{0101}$).

The test value of a given leaf or non-leaf node $N_i$ may be denoted $H_i$ herein. Note, however, that elsewhere in this disclosure, the notation $E_i$ may be used to represent the hash value itself. The meaning should be clear in context.

The nodes $N_{0100}$ and $N_{0101}$ are grandchildren of the nodes $N_{01}$ and $N_{01}$. The nodes $N_{000}$ and $N_{001}$ are grandchildren of the root node $N_0$ only.

Figure 12B:
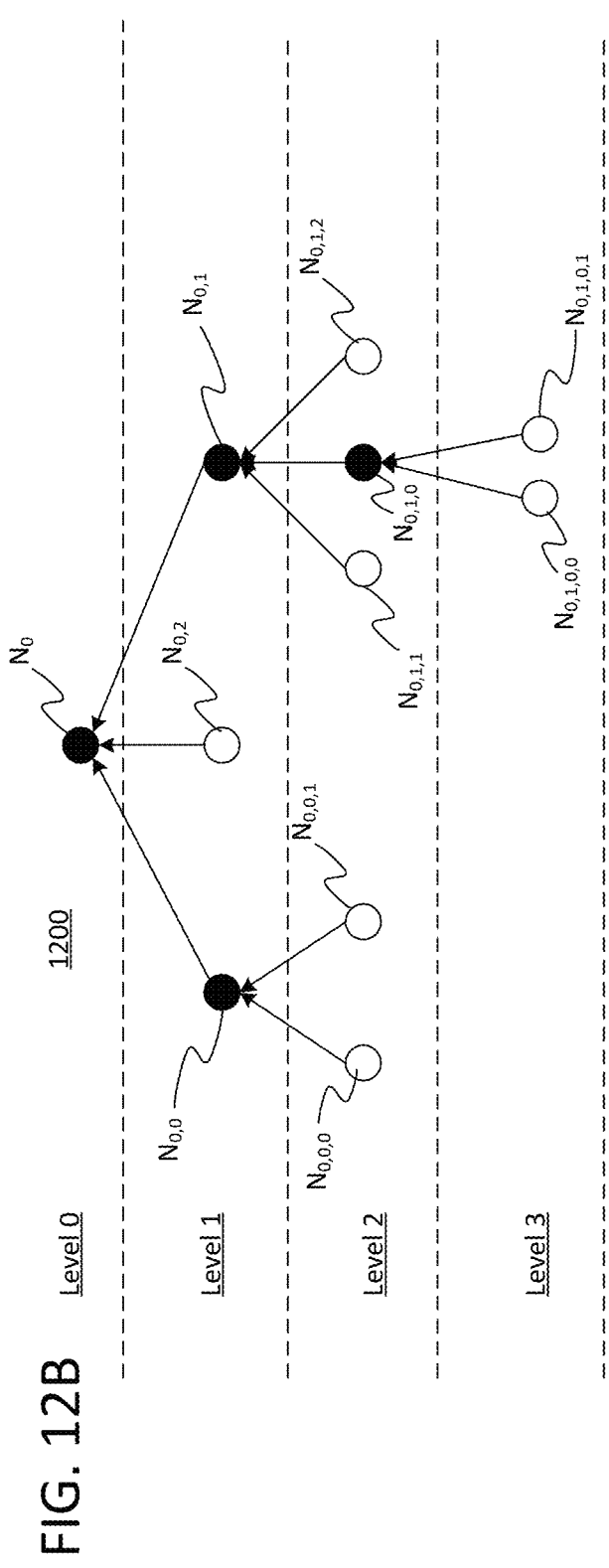
Figure 13:
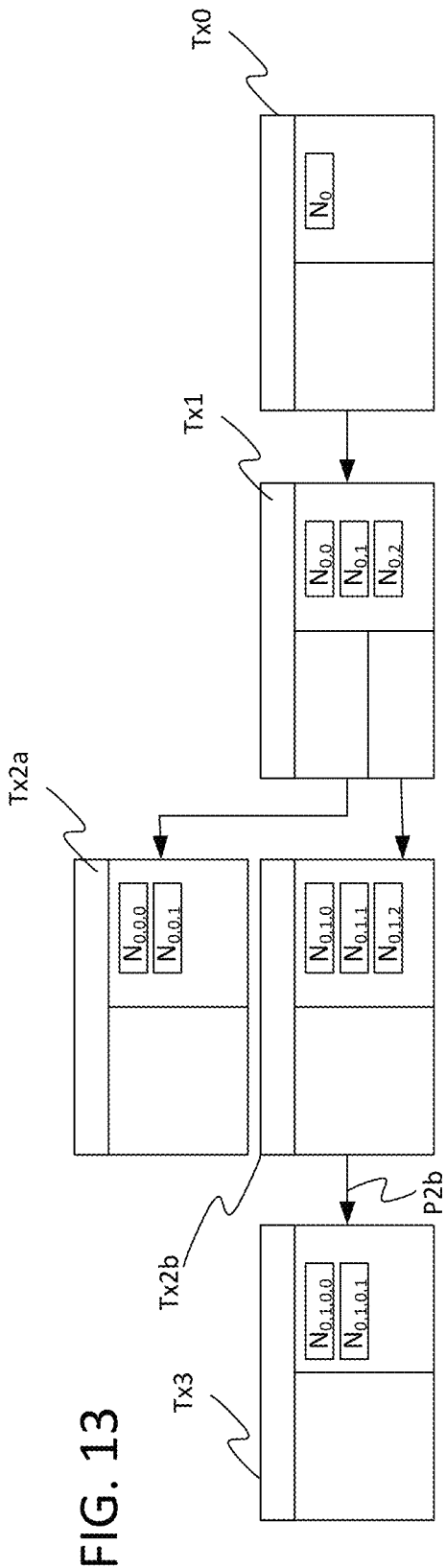
FIG. 13 shows how the generalised hash tree of FIGS. 12A and 12B may be encoded in a set of blockchain transactions.

FIGS. 12B and 13 show how the generalised hash tree 1200 of FIG. 12A may be embodied in a sequence of blockchain transactions.

FIG. 12B shows the same generalised hash tree 1200 marked to show the levels of its constituent nodes. The data blocks are omitted from FIG. 12B (and in any event, as noted, these do not form part of the generalised hash tree 1200, and the data blocks themselves are not stored on the blockchain in this example).

FIG. 13 shows a set of blockchain transactions which may be used to encode and store the generalised hash tree 1200 in a block chain. In this example encoding, a transaction Tx0 (the root transaction) is used to represent the root node $N_0$.

In addition to the root transaction Tx0, one transaction is used to represent each set of sibling nodes, i.e. all nodes having the same parent node are grouped together in one transaction in this example.

Hence, in this example, the three child nodes of the root node $N_0$, namely $N_{00}$, $N_{01}$ and $N_{02}$ are encoded in a single transaction Tx1 referred to as a level-1 transaction (reflecting the fact that those nodes being at level 1 in the tree).

There are two level-2 transactions denoted by reference signs Tx2a and Tx2b respectively. The first level-2 transaction Tx2a encodes the child nodes of the level one node $N_{00}$, i.e. nodes $N_{000}$ and $N_{001}$. Likewise, the second level-2 transaction Tx2b encodes the three child nodes of node $N_{01}$, i.e. nodes $N_{011}$, $N_{010}$ and $N_{012}$.

A single level-3 transaction Tx3 encodes the children of node $N_{010}$, i.e. nodes $N_{0100}$ and $N_{0101}$.

In each of the transactions Tx0 to Tx3, the hash value or values of the node or nodes encoded by that transaction are contained in one or more outputs of that transaction. That is to say, each node hash value is directly encoded in an output of that transaction, and in the case of a transaction representing multiple nodes, the hash values of those nodes may be explicitly contained in the same output or in different outputs of that transaction.

In one implementation, the hash values are contained in un-spendable outputs of the transactions Tx0 to Tx3, for example using OP_DROP or OP_RETURN.

As another example, the hash values may be contained as dummy operands of a check multi-signature operand (CHECKMULTISIG).

Each of the transactions Tx0 to Tx3 has at least one spendable output (which may or may not be the output in which any node hash value is contained). The directional edges of the generalised hash tree 1200 are encoded as spending relationships between the transactions.

Starting with the level-3 transaction Tx3, this transaction has a spendable output which is spent by the second level-2 transaction Tx2b. That is to say, an input of the second level-2 transaction Tx2b contains a pointer to that output of the level-3 transaction Tx3 denoted by reference sign P2b. This pointer P2b not only encodes the spending relationship between the second level-2 transaction Tx2b and the level-3 transaction Tx3, but also encodes the two directional edges from the non-leaf node $N_{010}$ at level two (encoded in transaction Tx2b) and its two child nodes $N_{0100}$ and $N_{0101}$ (both encoded in transaction Tx3).

The level one transaction Tx1 has at least two inputs, one of which spends an output of the first level one transaction Tx2a and the other of which spends a spendable output of the second level two transaction Tx2b. This captures the relationship between the level one nodes encoded in the level one transaction Tx1 and the level two nodes encoded in the level two transaction Tx2a and Tx2b. Tx2a encodes all of the child nodes of the level one node $N_{00}$, and the second level two transaction encodes all of the child nodes of the level one node $N_{01}$.

Finally, the root transaction Tx0 encodes the hash value of the root node, and the root transaction Tx0 has at least one input which spends a spendable output of the level one transaction Tx1.

Depending on the implementation, to some extent the mathematical properties of cryptographic hash functions may be harnessed to encode structure of the hash tree. For example, for a transaction containing multiple summary hashes, it is always possible to resolve each summary hash to a subset of a known set of nodes one level below because there will only exist a single subset of nodes whose concatenated hash equals the summary hash. Hence, even when a transaction contains multiple summary hashes, it is not essential to explicitly map those summary hashes to respective subsets of child nodes at the next level down because that information is already captured in their mathematical properties, and can therefore be inferred from the data unambiguously. Relying on the mathematical properties of the hash values may be more memory efficient because it reduces the amount of redundant data in the transactions.

However, as an alternative, a degree of redundant data may be introduced, which may be somewhat less memory-efficient but, on the other hand, may allow the hash tree to be reconstructed/interpreted using less computing resource (i.e. more computationally-efficient). For example, the input script could more modified such that the nodes that go into each summary hash are separated by an appropriate (arbitrary) marker (e.g. OP_0 or anything other arbitrary marker such as a <data> push) and ensuring the order (i.e. left-to-right as they are drawn) of the separated sets of nodes corresponds to the order of the summary hashes.

For example, for summary hashes $H_{00}$ and $H_{01}$, the input unlocking script of Tx, might read as $H(D_{001})$OP_0 $H(D_{011})H(D_{012})$ or $H(D_{001})$<separation data>$H(D_{011})$ $H(D_{012})$ etc.

This conveys the fact that $D_{001}$ is the missing input to the summary hash $H_{00}$ because $H_{00}$ is the first summary hash in the output script of Tx$_*$. I.e. the consistent ordering of data between the input and output of the transaction is useful for interpreting the transaction data in a computationally efficient manner.

5. On-Chain vs. Off-Chain Representation

The set of transactions Tx0-Tx3 of FIG. 13 is an "on-chain" encoding, in that the transactions may be submitted to a node of the blockchain transaction and mined into one or more blocks 151 at some point thereafter.

In the present example, indices calculated according to the above indexing scheme are not explicitly encoded in the blockchain transaction Tx0-Tx3, rather the hierarchical relationships between the nodes of the data structure 1200 are encoded as spending relationships between those transactions (which, in turn, are captured as pointers between those transactions).

The indexing scheme may be implemented off-chain as part of an initial off-chain representation of the data structure 1200, either prior to committing the data structure 1200 to the blockchain, or after it has been committed in order to re-construct it off-chain.

Figure 14:
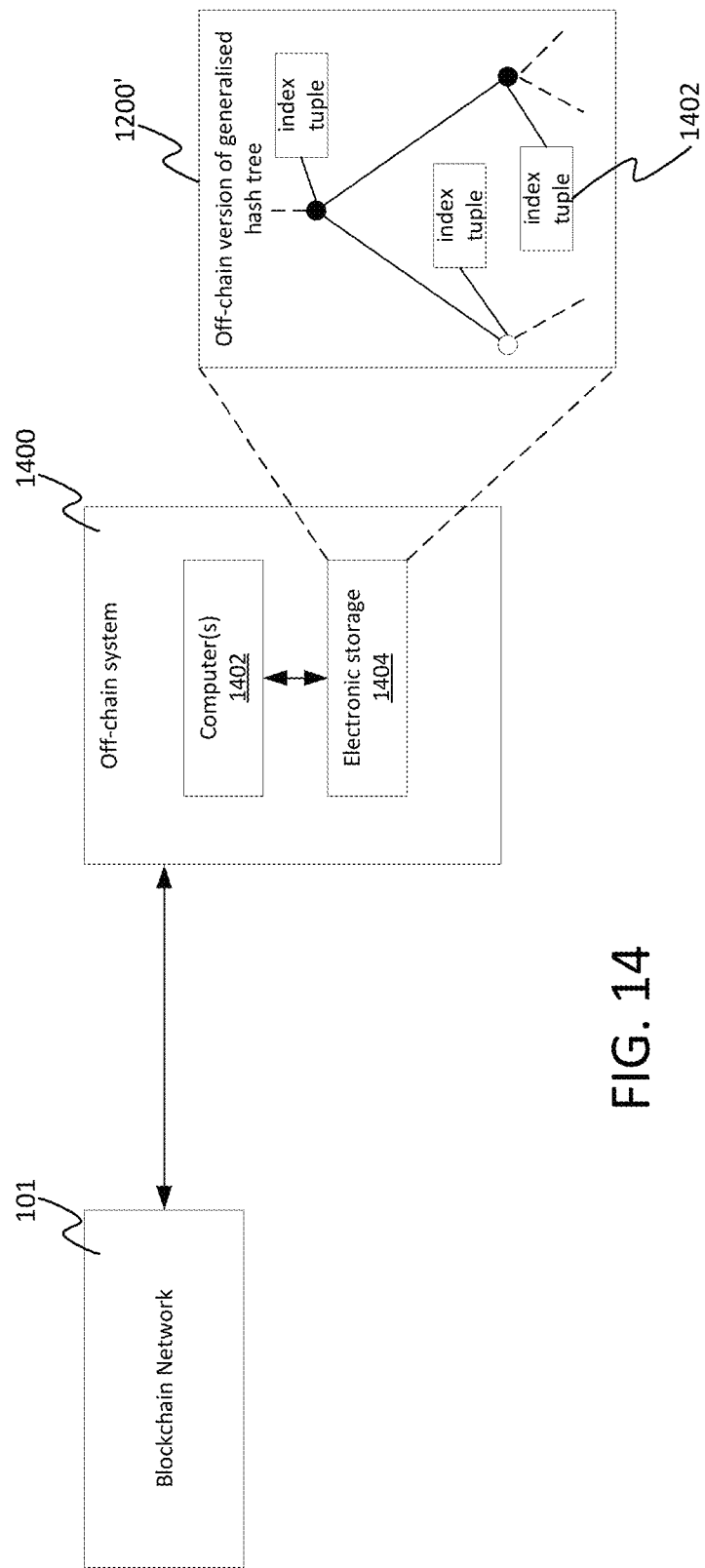
FIG. 14 shows an example of an off-chain system in which a generalised hash tree may be temporarily or permanently stored off-chain.

FIG. 14 shows a highly schematic block diagram of an off-chain system 1400, shown to comprise one or more computers 1402 having access to electronic storage 1404 of the off-chain system 1400 (off-chain storage). Each computer comprises one or more computer processors such as a general-purpose processor (CPU, GPU/accelerator processor etc.) and or a programmable or non-programmable special-purpose processor such as an FPGA, ASIC etc. for carrying out the described functions of the off-chain system 1400. The off-chain system 1404 is operable to communicate with at least one node of the blockchain network 101, in order to do one or both of: submitting one of more of the transactions Tx0-Tx3 to the blockchain network 101 for recording in the blockchain 150 for the purpose of committing the generalised hash tree data structure 1200 to the blockchain 150, and retrieving one or more the transactions TX0-Tx3 for the purpose of re-constructing the generalised hash tree data structure 1200 therefrom in the off-chain storage 1404.

In both cases, a version of the generalised hash tree 1200 is maintained at least temporarily in the off-chain storage 1404. In order to implement the operations described above—either to construct the node tree according to the node equations or to verify a received data tree using a Merkle proof—each node of the version of the generalised hash tree 1200 in the off-chain storage 1404 may be assigned an index tuple calculated in accordance with the above indexing scheme (Rules 6 to 8 above).

Figure 15:
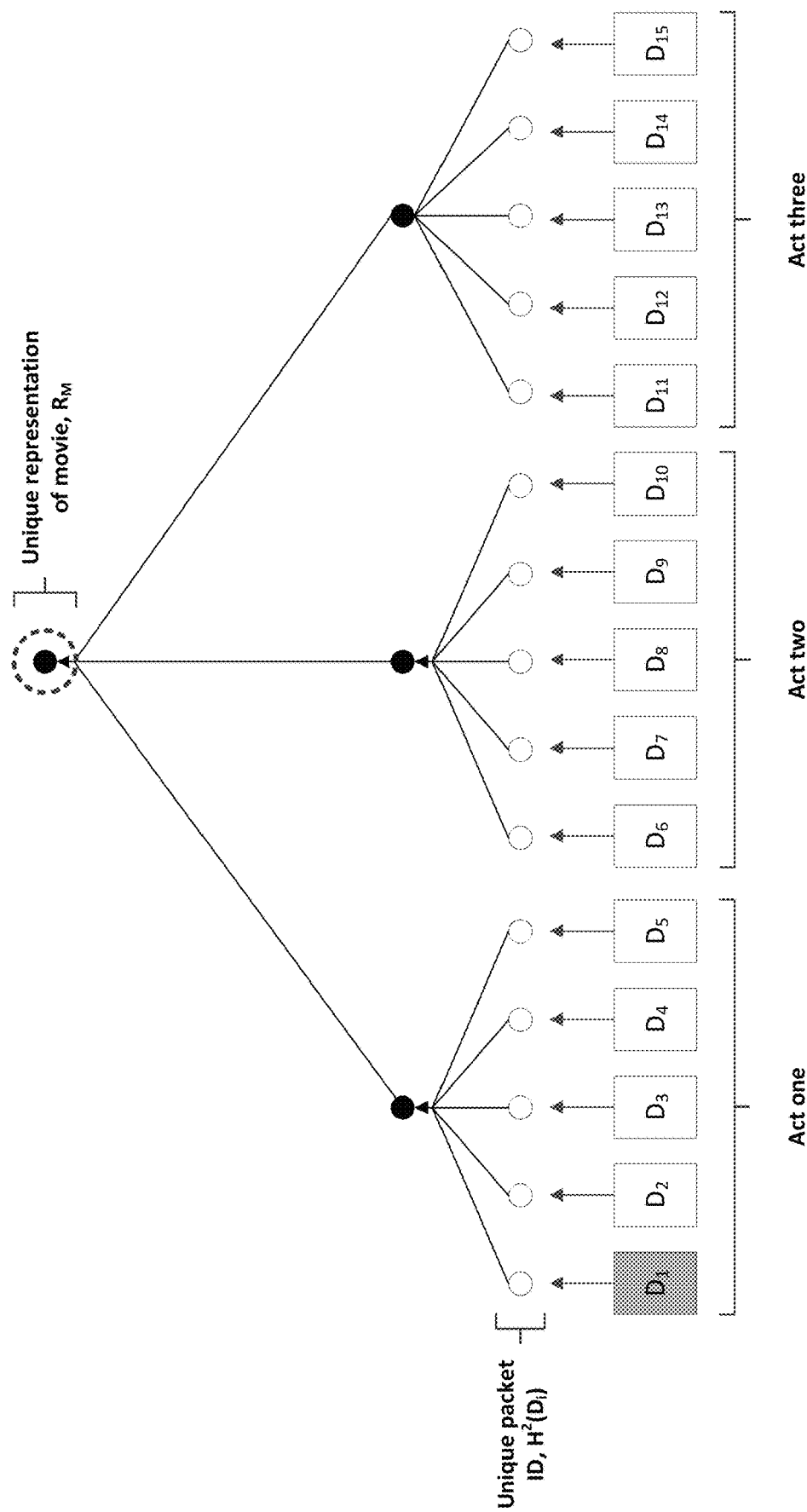
FIG. 15 shows a fourth example of a generalised hash tree representing a piece of digital content having discrete segments.

In FIG. 15, the version of the generalised hash tree 1200 stored in the off-chain storage 1400 (off-chain version) is denoted by reference sign 1200'. As indicated, each node thereof is associated with an explicitly calculated index tuple 1402.

Alternatively or additionally, each index tuple may be explicitly encoded in the blockchain transactions TX0-TX3 themselves. This is by no means essential, but assist in interpreting the transaction data. For example, if all of the indexes are encoded explicitly then a processing entity may be able to work out how all the data fits together in the tree without knowing the 'rules' beforehand.

Collaborative Attestation Protocol

Further details of the collaborative attestation protocol will now be described.

Introduction

The intellectual property (IP) industry plays a significant role in determining the intangible assets that constitute approximately one third of the value of consumer products.

It is estimated that in 2017 alone, there were 3.2 million and 12.4 million patent and trademark applications respectively worldwide, consolidating eight consecutive years of increase. This means that IP can be an extremely valuable asset for an individual or organisation and should be well-managed as such.

The primary considerations to be made when creating an IP-management system fall under the broad categories of
1. Assignment of rights to inventors and authors;
2. Disclosure of inventions;
3. Licensing of intellectual property.

Assignment of Authorship

Traditionally, the assignment of authorship of novel creative works can be a complex procedure. In general, the right to be named an inventor is automatically vested in the original conceiver of a novel idea. However, the way this information is logged, and how this translates to eventual ownership of IP, can be much more ambiguous. For instance, it is often the case in large-scale enterprises that the effective assignment of rights and authorship for new technologies and inventions occurs in-house and according to the terms set out in contracts of employment i.e. 'works for hire'. Particularly in businesses with a high IP output, this can lead to internal disputes over named inventorship and the time-ordering of the conception of novel works by different contributors, even in cases where the intellectual property rights of a 'work for hire' may reside solely with the employer.

The assignment of inventorship to IP can also involve third-party notaries, who authenticate and certify signatures and authority, allowing inventors and creators to claim rights and authorship over intellectual property. Despite fulfilling an important function in the industry, these notaries operate via cumbersome and expensive procedures.

An historical solution would be for inventors to employ a thorough 'invention notebook' or equivalent documentation. However, if implemented poorly these can exacerbate conflict and are typically mutable and corruptible if compromised.

It is desirable to develop a more efficient, cost-effective and characteristically incontrovertible system for assigning authorship and ownership rights to intellectual property—particularly in cases where the art to be protected is a composite work with multiple contributing authors.

Disclosure of Inventions

The point at which an invention or other form of intellectual property is publicly disclosed has a bearing upon whether it can be protected under IP law. In most legal jurisdictions, where competing patent applications are concerned, the current paradigm is that the 'first to file' application will claim priority for successful granting of a patent.

This means that inventors are incentivised to document their invention in sufficient detail and file a patent application at the earliest opportunity. This process will naturally incur a delay between the initial conception of a novel idea and its filing as a patent application.

The interim period between conception and filing introduces a risk for the inventor, as a competitor may be able to conceive of and file and application for an equivalent invention in this time. It is therefore advantageous for an inventor to have a mechanism for providing a proof-of-existence of their work before the eventual filing date.

Alternative blockchain-based solutions for IP-management primarily seek to solve the isolated issue of providing an immutable proof-of-existence. However, these solutions generally fail to do so in a way that also establishes and reflects the hierarchy of ownership and authorship of the IP itself.

Embodiments herein provide a new blockchain-based method for managing intellectual property that does address these issues simultaneously by providing intelligent structure to protected works.

Intellectual Property on the Blockchain

Embodiments herein provide a method for using a public blockchain as both an IP registry and time-stamping ledger of the events in inventive processes, which may be used for a variety of protected works. By leveraging the properties of the blockchain, technical solutions are provided to the issues raised above.

Articles of intellectual property are encrypted, hashed and stored on the blockchain as a means of proving existence. The storage mechanism also uses a hash tree implementation that reflects its authorship and assigns rights to the inventors.

Preliminaries

The collaborative attestation protocol makes use of Generalised hash trees, the principles of which are set out above.

In addition, the following preliminaries are pertinent to the described embodiments.

Elliptic Curve Digital Signatures

A digital signature is mathematical scheme that, for a message being sent, provides:

Authentication—message was signed by a specific party
Non-repudiation—signing party cannot deny having signed the message
Integrity—message was not changed during transit.

The Elliptic Curve Digital Signature Algorithm (ECDSA) is a cryptographic digital signature scheme used by Bitcoin to ensure that funds can only be spent by their rightful owners.

Parameters required for ECDSA signatures include:
E—elliptic curve function
G—a base point on the elliptic curve with order n, and where n G=0
n—a large prime number Key Pair Generation Algorithm Private key x from which public key P is generated
Choose a random number x such that 0<x<n $$P = x \cdot G$$

Signature Algorithm

Given a message m, random number k and private key x, produce signature with the pair (r, s)
k—choose a random number 0<k<n
Calculate r=k G
Calculate s=$k^{-1}$ (m+xr) mod n
where $k^{-1}$ is the multiplicative inverse of k mod n such that $k^{-1}k \equiv 1$ mod n Verification Algorithm Given signature (r, s) message m and public key y, verify the signature
$s^{-1}$ is the multiplicative inverse of s mod q such that $s^{-1}s \equiv 1$ mod n
Calculate v=$s^{-1} \cdot m \cdot G + s^{-1} \cdot r \cdot y$
Signature is valid if v=r Storage of Data on the Blockchain As the adoption of blockchain technology grows, along with the scaling infrastructure to support this, there is an increasing interest in inserting large volumes of data on the Blockchain. It is indeed possible to store data in the blockchain through usage of the various fields of a blockchain transaction. The storage of data in the Blockchain can be done broadly in at least one of two ways; either using the unspendable OP_RETURN opcode or using an OP_DROP statement.

Use of OP_RETURN

Transaction outputs marked with an OP_RETURN opcode are known as provably unspendable outputs because OP_RETURN will cause a script execution to fail. It is therefore possible to store any data after such an opcode in a locking script of the following type:

OP_RETURN <D>

It is never required that a miner or validator execute any script that follows an OP_RETURN opcode, which means this method of storing data has the advantage that it does not need to meet any formatting requirements that would normally apply to data stored in a portion of script.

Use of OP_DROP

An alternative method that can be used to store data in a blockchain transaction is using the OP_DROP opcode. This can be used in a locking or unlocking script of the form

OP_PUSHDATA D OP_DROP which is normally expressed more simply by replacing the OP_PUSHDATA opcode with angle brackets surrounding the data element being pushed to the stack as

<D>OP_DROP

Note however that data stored in such a script is subject to script-level checks that are incorporated by script execution and transaction validation.

Use of Multi-Signature Scripts

It is possible in Bitcoin to construct a transaction locking script that can be unlocked by providing any m-of-n signatures corresponding to m-of-n specific public keys. The locking script condition for such a multisignature transaction is written as

[CheckMultisig $m$-of-$n$]=$OP\_m <P_1> \ldots <P_n> OP\_n$ OP_CHECKMULTISIG.

This multisignature locking script can be used to embed data, by replacing a subset of the public keys $P_1, \ldots, P_n$ with other data—referred to as "dummy operand(s)" herein. A multisignature locking script can, for example, be used to embed n−1 data elements (as dummy operands), with only one valid public key P (functional operand). This is written schematically as

[CheckMultisig 1-of-$n$]=$OP\_1 <P><D_1> \ldots <D_{n-1}> OP\_n$ OP_CHECKMULTISIG.

Locking scripts of this form may be used in either of the Blockchain-based implementations of a copyright assignment hash tree (or, more generally, a hash tree representing hierarchical contributions to a final work, such as the generalised hash tree 1820) as a means of providing double-hashes and discretionary signatures of author contributions within transaction locking scripts.

Collaborative Attestation Protocol

A generalised hash tree is used to implement a collaborative attestation protocol, following the same or similar principles to the example set out above with reference to FIGS. 19A and 19B. The protocol could apply generally to the documentation and attestation of parts of collaborative work or process. By way of example, a specific application of creating a 'copyright assignment' hash tree that can be stored on the blockchain is considered. It will be appreciated that the description applied equally to any form of hash tree representing a collaborative work or process. The end goal is to be able to reflect the hierarchy involved in the assignment of rights to intellectual property in an immutably-stored hash tree representing a copyright or other form of work(s).

Aims

An aim of the described embodiments is to establish a mapping between a copyright work and a generalised hash tree structure, in such a way that a hierarchy of rights is also reflected in the hash tree itself. It is then a matter of implementation to store the hash tree immutably on the Blockchain.

To achieve this, the following properties are set out for the described copyright assignment hash tree:
1. It has all the properties of a generalised hash tree:
   i. Data can exist at any level m.
   ii. There may be any number of data contributions inserted at a level m.
   iii. The data leaves form a single, anti-arboreal directed tree structure.
   iv. Merkle proofs can be performed on any piece of inserted data.
2. It reflects a hierarchy of authority, ownership or organisational structure.
3. It is able track the formation of a copyright work, including all individual components.

The conditions (2) and (3) are subtly different, because (2) ensures that it is possible to follow the authority chain of rights to copyrighted work, while (3) ensures that it is possible to follow the formation of the work itself.

Each individual contribution to the final copyright work is recorded such that it can be viewed as a separate component of the final work. This is achieved by including any individual contribution as a leaf node in the tree.

It is also possible to follow how component parts of a work fit together from the tree structure. For instance, if two sections of a white paper are written and included as leaf nodes, the tree provides a subsequent record of how these sections are later combined to form the final document.

This is achieved in two ways. Non-leaf/intermediary nodes are used to directly represent a history of the components of a copyright work. Leaf nodes appearing in higher levels to are used to represent editorial changes to a final work.

EXAMPLE

Consider two sections $D_{1,1}$ and $D_{1,2}$ of a white paper, written by two separate but equally-ranking authors Alice and Bob (e.g. researchers), and included at a level m=5, as $H^2(D_{0,0})$ and $H^2(D_{0,1})$ respectively.

Their parent node, at m=4, will represent a simple history as an intermediary node whose value is H ($H^2(D_{0,0})$ $H^2(D_{0,1})$), where the operator II denotes concatenation.

However, editorial changes, from their line manager Carol, are also included at the same level m=4 as a leaf node whose value is $H^2(D_0)$. Here $D_0$ is representative of the updated state of the combined work, encoding any changes $E_{0,0}$, $E_{0,1}$ made by Carol to Alice and Bob's content, as well as any original contribution $O_0$ from Carol to the new state of the copyright work. This is represented in FIG. 20.

Figure 20:
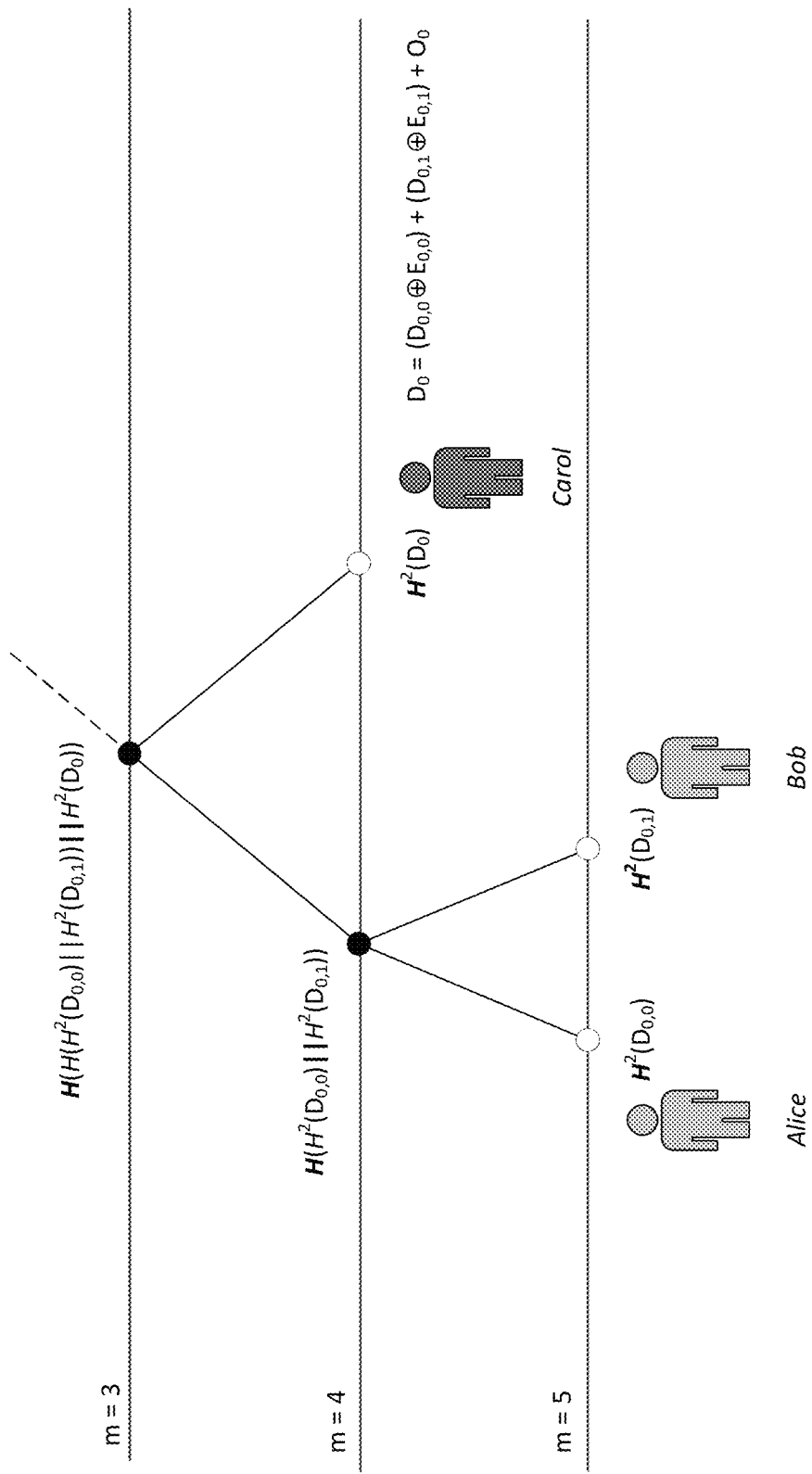
FIG. 20 shows an example branch of a contributor hierarchy.

FIG. 20 shows a representation of how data is added to a hash tree such that its relationship tracks both an organisational hierarchy and the formation of a final document or copyright work.

A particular example form of the copyright assignment tree will now be described, with a focus on the meaning of the data to be stored as nodes in the hash tree.

Hierarchy of Authority (HoA)

It is often the case that a non-trivial hierarchy will be involved in the production of a copyright work. To name but a few of the possible actors involved, there may be inventors who generate original content, editors who alter original content and may provide some of their own, advisors who may need to approve specific parts of a document and owners who will typically have ultimate rights to a work. All such parties are examples of "contributors" as that term is used herein. In general, a contributor can be human operating suitable computer equipment (such as Alice and Bob) or a contributor could be a computer, application etc. in the case of computer-generated contributions.

Ideally, all the contributors to a final work should be represented in an indicative hierarchy of authority, which will often be complex. For instance, there may be multiple editors at one level of the hierarchy, whereby there is a need to distinguish between editors who merely alter the precedent work and those who also add their own original content. The generalised hash tree structure can accommodate these needs.

In general, contributors are separated into three distinct classes of actor: Junior authors—these are contributors who may provide original content only. These may typically be the inventors. In FIG. 18B, these are the members of the first and second junior author groups C-A, C-B.

Senior authors—these are contributors who may provide original content and/or editorial content that builds upon the work of a junior author. These may typically be editors or advisors. In the example of FIG. 18B, this encompasses both the level-3 and level-2 contributors C-C0, C-D0, C-E0, C-F0, C-F1.

Executive author(s)—these are contributors who may provide original content and/or editorial content, which builds upon the work of a junior author(s), senior author(s) or both. A root author will also typically have the final approval rights over a copyright work. These may be executives or owners, such as the editor-in-chief C-G0 in FIG. 18B.

Note that, while it is plausible that the same actor may be involved as more than one type of contributor in the organisational hierarchy of authority, the described implementation ignores such a scenario for simplicity. However, the generalised hash tree has a sufficiently flexible structure to accommodate these cases. For instance, a junior author may also be involved in an editorial role for subsequent versions of his original work. In this case, it is envisaged that the same actor will appear at multiple levels in both the organisational HoA and the hash tree that represents it.

The Blockchain-based implementation of a generalised hash tree in FIG. 18B would, for example, be suitable to capture the hierarchy of rights for a newspaper. The organisational hierarchy of the newspaper would be that shown in FIG. 18A.

In this use case, the junior authors C-A, C-B are journalists, all of whom contribute raw original content D-A0, . . . ,D-B2. The senior authors C-0, . . . , C-F-1 comprise multiple editorial layers, whereby some editors (the editors C-C0, C-D0 at level 3) may have simple editorial power over the journalists, but higher-ranking senior editors (the editors C-E0, C-F0, C-F1 at level 2) may provide additional original content. Finally, the single executive author C-G0 represents the editor-in-chief (EIC), who has the final authority to approve a newspaper document for publishing—the final work D. Note that all authors may have data associated with them.

As described above, each author in FIG. 18A has a unique public key, with which they can create digital signatures and transact using a Blockchain. In the following description, the mathematical notation set out in Table 2 is used to represent the public keys shown in FIG. 18, which aligns with the indexing scheme for generalised hash trees set out above.

TABLE 2

The classes and public keys belonging to each actor in the hierarchy of authority (HoA) of a newspaper (contributor hierarchy).

| Title | Class of Actor | Corresponding Reference Signs | Public key-mathematical notation | Corresponding Reference Signs |
|---|---|---|---|---|
| Editor-in-Chief | Executive | C-G0 | $P_0$ | P-G0 |
| Sports Editors 1, 2 | Senior | C-E0, C-C0 | $P_{0,0}, P_{0,0,0}$ | P-E0, P-C0 |
| Finance Editors 1, 2, 3 | Senior | C-F0, C-F1, C-D0 | $P_{0,1}, P_{0,2}, P_{0,1,0}$ | P-F0, P-F1, P-D0 |
| Sports Journalists 1, 2, 3, 4, 5 | Junior | C-A0, ..., C-A4 | $P_{0,0,0,0}, P_{0,0,0,1}, P_{0,0,0,2}, P_{0,0,0,3}, P_{0,0,0,4}$ | P-A0, ..., P-A4 |
| Finance Journalists 1, 2, 3 | Junior | C-B0, ..., C-B2 | $P_{0,1,0,0}, P_{0,1,0,1}, P_{0,1,0,2}$ | P-B0, ..., P-B2 |

Note, the hierarchy is non-binary to illustrate the utility of the generalised hash tree invention. Note also that that many more complex organisational structures could be used in place of this example.

Copyright Assignment Hash Tree

Figure 21:
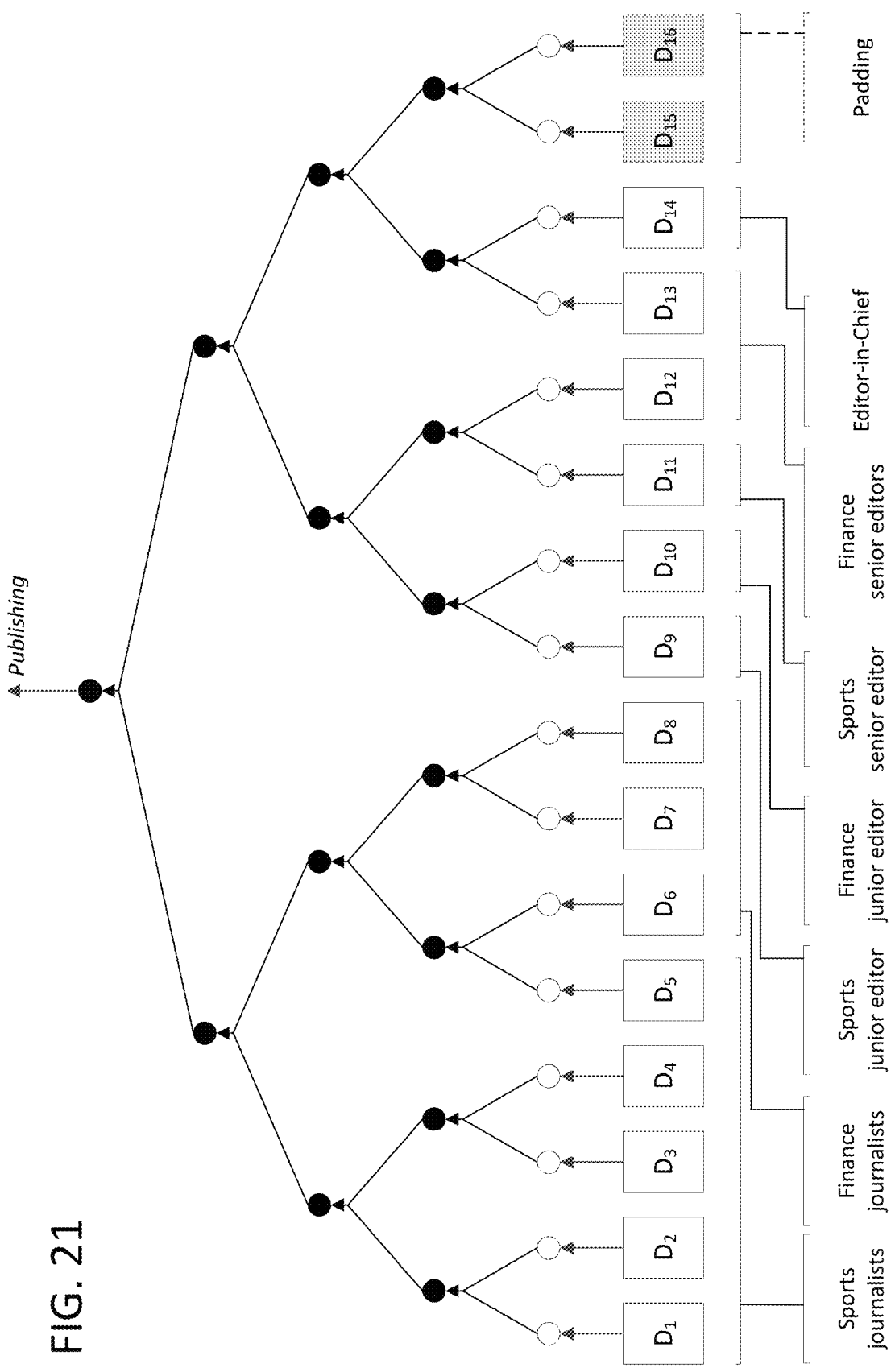
FIG. 21 shows a set of contributions recorded in a classical binary hash tree in a way that cannot fully capture the hierarchical relationships between those contributions.

Having established the organisational hierarchy to be reflected in the formation of a copyright work, a hash tree that can be used to achieve this goal. FIG. 21 considers how a classical binary Merkle tree might be used to represent the hierarchy of the newspaper organisation.

FIG. 21 shows typical binary Merkle tree used to store the components (contributions) of a newspaper document.

Several issues become apparent with this hash tree structure. The fact that all data blocks are inserted at the same layer at the bottom of the tree means that there is no hierarchy of authority, rights or ownership that is encoded in the tree; at best the blocks can be ordered according to authority from left to right at this bottom layer. This cannot capture the full-hierarchy in the structure of the tree alone—in general, it is not possible to identify the actual level of a contributor within the hierarchy solely from their position in the sequence; all that can be inferred, moving from left to right, is that the level of authority is generally increasing However, by invoking the general hash tree construction, it is possible to fully-encode the hierarchy within the structure of the tree. This also provides a much more intuitive representation of the newspaper as a hash tree can be created. This is the already-described generalised hash tree 1820 of FIG. 18B, which reflects reflecting the desired hierarchy of authority.

Figure 22:
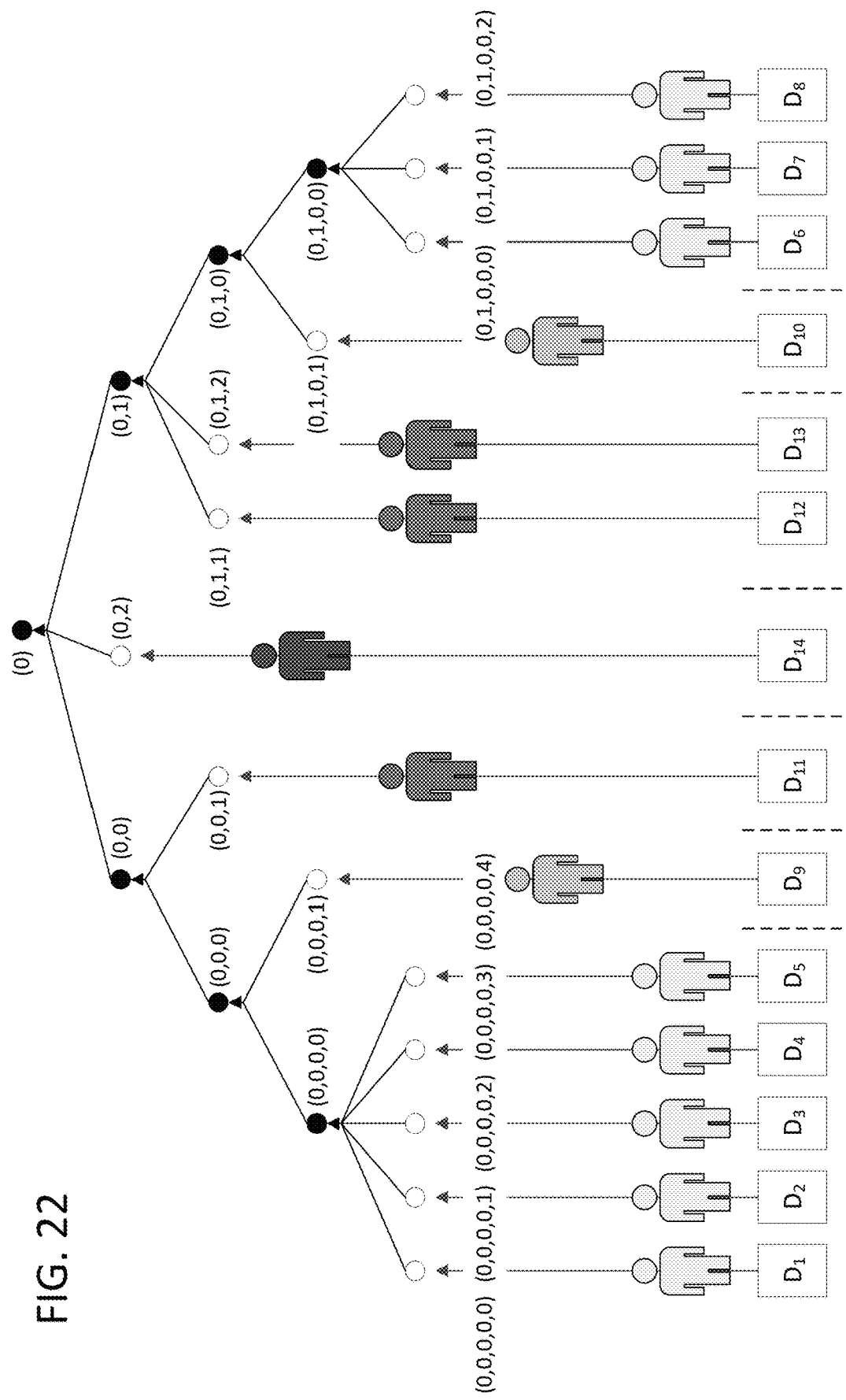

FIG. 22 shows how the generalised hash tree 1820 obeys the general hash tree structure with the node indices $\{0, i_0, i_1, \ldots, i_{m-2}, j\}$ labelled for each node. Recall that all indices are non-negative integers running from the value 0 upwards. That is, FIG. 22 shows the nodes of the hash tree 1820 representing a newspaper, labelled according to node indices.

The issues identified with the traditional Merkle tree approach have been rectified here, as a clear hierarchy of authority embedded within the hash tree, whereby leaf nodes can exist in the tree at any level.

As before, white circles denote leaf nodes and black circles denote non-leaf nodes, which helps to show that the organisational hierarchy of the newspaper has been reflected in the leaf nodes of the tree, which now appear at different levels, rather than all appearing at the bottom.

The HoA of the newspaper organisation persists within the generalised hash tree because each leaf node represents the contributions or effect of a distinct actor.

The above generalised hash tree uses the conventions as set out above, such that each node has a specific hash value associated with it, which can be calculated using the node equations. In particular, each leaf node (white) is the double-hash of some data block that is to be inserted, and each non-leaf node (black) is simply the hash of all its children concatenated.

This tree obeys the full indexing conventions, such that each node has a unique index notation of the form $N_0$, $i_0, \ldots, i_{m-2}, j$.

Roles of Authors

It has been identified that the various actors in a copyright assignment hierarchy can be placed into one of three categories of author; junior, senior and executive. Each category of author plays a slightly different role in the formation of a copyright work, and as such each will be responsible for providing different data to the hash tree.

Junior Authors

Junior authors are contributors at the 'bottom' of the hierarchy of authority. More strictly, this is to say that there is no actor directly below a junior author in the organisational structure.

The original content generated by a junior author is denoted generally in mathematical notation by D (denoted in the Figures by reference signs of the form D-xx), and can be referred to as a file for the present purposes (more generally, the term data block). This file does not contain the content of other authors, which makes it possible to distinguish between the contributions made by different junior authors. For instance, an author with public key $P_{0,0,0}$ generates original content $D_{0,0,0,j}$, where j is determined by the position of the leaf node representing the junior author in question, with respect to the 'siblings' of that author.

A key characteristic of a junior author is that the content created by them is to be submitted to a direct superior. It is sensible that this process will be done off-block (off-chain). The possible data types that may be associated with a junior author are summarised in the following table:

TABLE 3

The data associated with a junior author.

| Data | Notation | Technology |
|---|---|---|
| The original content produced by a junior author. | $D_{0,0,0,0,0}$ | — |
| A double hash of the original content. | $H(H(D_{0,0,0,0,0})) = H^2(D_{0,0,0,0,0})$ | HASH160/SHA256 |

TABLE 3-continued

The data associated with a junior author.

| Data | Notation | Technology |
|---|---|---|
| A signature of the hash of the original content. | $\sigma(P_{0,0,0,0}, H(D_{0,0,0,0,0}))$ | e.g. ECDSA e.g. Rabin |

The double hash of the junior author's content can be used as the on-block representation of the content, which allows a senior author to provide a proof-of-receipt of the original content on-block, and crucially without revealing the content itself.

It is perfectly possible to just use single hashes and publish content data on-chain but using double-hashes is advantageous for copyright works because it is desirable to prove that something did exist at a point in time by putting its hash on-chain, without performing a full public disclosure e.g. prior to patent filing.

The signature of the hash of the original content is included as it is proof that, at the time of the submission of a transaction, the junior author has knowledge of the pre-image of the double hash.

Note that this signature is deemed discretionary because it is not to be used as part of the blockchain protocol, and simply shows that the junior author attests to having created their original work. An example of such a digital signature is ECDSA, but the present disclosure is not limited to it to this since it is a discretionary signature, and it can any signature algorithm can be used for discretionary signatures.

The mathematical notation $\sigma(P, m)$ to denote a discretionary signature (generally denoted in the Figures by reference signs of the form DS-xx) and Sig (P, m) to denote a non-discretionary signature on a message m by the owner of the public key P (referred to above as a transaction signature and generally denoted by reference signs of the form S-xx). A non-discretionary signature is a signature that is used to spend a UTXO and will be verified by miners as part of the blockchain protocol.

Where the blockchain protocol, i.e. the protocol according to which the P2P network 101 operates, specifies the use of ECDSA, then the transaction system must be ECDSA. However, more generally, each transaction signature is computed in accordance with whatever blockchain protocol is applied (which may or may not be ECDSA). As noted, the same or a different signature algorithm may be used to compute discretionary signatures in any event.

Senior Authors

Senior authors are authors in the 'middle' (intermediate) levels of the hierarchy of authority. The key characteristics of a senior author are that they have at least one actor directly below them and at least one actor directly above them in the organisational structure's HoA.

As mentioned previously, senior authors can have multiple functions such as editing, advising or managerial responsibilities. In each case a senior author is expected to receive content from its subordinate(s) and process it in some way. The senior author can then either (a) edit the content received, (b) add new original content of its own to the work or (c) do both.

However, the senior author will typically have more responsibilities than a junior author. The updated state of the copyright work is reflected within their contribution and pass this up the chain, as well as providing both a double-hash of their total contribution and signature of its single-hash.

The contribution of a senior author can be understood using the below table of data associated with them. Here, n denotes the number of direct subordinates of a senior author, and E is the number of non-leaf hashes directly below the author in the hash tree.

TABLE 4

The data associated with a senior author.

| Data | Notation | Technology |
|---|---|---|
| The content received from subordinates. | $D_{0,0,0,0}, \ldots, D_{0,0,0,n-1}$ | — |
| The editorial documents for received content. | $E_{0,0,0,0}, \ldots, E_{0,1,1,n-1}$ | — |
| The original content of the senior author. | $O_{0,0,1}$ | — |
| The contribution of the senior author. | $D_{0,0,1} := O_{0,0,1} + \Sigma_{j=\in}^{\in+(n-1)}(D_{0,0,1,j} \oplus E_{0,0,1,j})$ | — |
| A double hash of the contribution. | $H(H(D_{0,0,1})) = H^2(D_{0,0,1})$ | HASH160/ SHA256 |
| A signature of the hash of the contribution. | $\sigma(P_{0,0}, H(D_{0,0,1}))$ | e.g. ECDSA e.g. Rabin |
| Summary hash of hash tree branch. | $H_{0,0,0} := H(G^2_{0,0,0}) = H(H(G^3_{0,0,0,0}) \| \ldots \| H^2(D_{0,0,0,1}))$ | HASH 160/ SHA256 |

A senior author with n direct subordinates will take the content received from each of them $D_{0,0,0,\in}, D_{0,1,1,\in+(n-1)}$ and produce a corresponding editorial document, represented as $E_{0,0,0,\in}, E_{0,1,1,\in+(n-1)}$. The number E of non-leaf siblings is used to correctly offset the data used in the summation to ensure that the hash tree is consistent with the HoA.

An editorial document E can be formed that represents the changes made to some received content D, and if a senior author does not have editorial rights or does not wish to make changes, these editorial documents may be null fields.

The senior author may also add its own original content, denoted by O. Where the editorial documents are based upon the work of subordinates, this original content is entirely the isolated work of the senior author and can be used by them to prove their own personal additions to a copyright work.

The total contribution of a senior author takes both its editorial documents and its original content into account, which are combined to reflect the updated state of the copyright work that is to be passed on to their superior.

A dummy operator $\oplus$ and its inverse operator $\ominus$ are defined, such that the changing state or version of a copyright work may be represented as Version N$\oplus$D Editorial Document=Version N+1,
Version N+1$\ominus$ Editorial Document=Version N.

The updated version of a copyright work, submitted by an intermediary author is represented as $$D_{0,0,1} := O_{0,0,1} + \Sigma_{j=\in}^{\in+(n-1)}(D_{0,0,1,j} \oplus E_{0,0,1,j})$$

where a summation over the pairs of received content and corresponding editorial documents accounts for all n of the senior author's subordinates. This updated version of the document is the 'contribution' of the senior author referred to above (e.g. the contributions D-C0, D-D0, D-E0, D-F0, D-F1 in FIG. 18A at levels 3 and fall into this category).

As with junior authors, a double-hash of the senior author's contribution is used to represent the new state of the document on-block (on-chain), in conjunction with a signature of the single-hash, such that the next superior in the hierarchy can perform a proof-of-receipt of the new document version and make their changes as desired.

The senior author is expected to pass its contribution up to its superior in the hierarchy of authority. It may not always be necessary, but it is reasonable to expect a senior author to also pass upwards the original content of each of its subordinates, so that the next author in the hierarchy is able to independently verify that the copyright work has been transmitted up the hierarchy correctly.

The final piece of data that an intermediary author should provide is a summary hash, which provides the full history of a branch up to the point at which an intermediary author includes their involvement in the production of a copyright work. The summary hash can be understood by referring back to the general hash tree 1820.

Summary Hashes

Recall that the contributions of all authors are represented as leaf nodes in the hash tree. This means that whenever an author adds content to a document, they also need to reflect the history of that document. This history corresponds to the internal node(s) of the hash tree that are siblings of the senior author. Note that junior authors are not expected to have a document history by definition.

Put simply, wherever there is a senior author represented as a leaf node (white circle) in the hash tree, it will also have at least one non-leaf node (black circle) as a sibling. This means that a senior author should provide the hash value corresponding to each of its non-leaf node siblings in the generalised hash tree.

For example, consider the nodes $N_{0,0,0,0}$ and $N_{0,0,0,1}$ in the generalised hash tree 1820. Here, $N_{0,0,0,1}$ represents a senior author as a leaf node in the tree. This author has one sibling node, namely $N_{0,0,0,0}$, whose hash value is given as $$N_{0,0,0,0} := H(G_{0,0,0,0}) = H(H^2(D_{0,0,0,0}) \| \cdots \| H^2(D_{0,0,0,0,4})).$$

It follows that the senior author should include this hash value $N_{0,0,0,0}$ in a transaction representing his involvement in the formation of the copyright work document.

The use of summary hashes associated with senior authors ensures that a senior author provides all of the information necessary to follow the hash tree upwards, which is essential for providing Merkle proofs of existence.

Note that a single senior author may have many non-leaf sibling nodes, and so may need to provide multiple summary hashes corresponding to multiple connecting branches of the hash tree.

Executive Authors

The executive (root) author is the author at the top of the hierarchy of authority, meaning they have no direct superiors (e.g. the EIC C-G0). The key characteristics of the executive author are that they receive content from their subordinates, have the authority to edit existing content, may add original content and have final authority to approve a copyright work before publishing or otherwise.

It is also a strong possibility that the root author will be responsible for transmitting the final version of the copyright work to a copyright authority or similar legal authority for handling intellectual property e.g. a patent attorney or notary.

The executive author will have access to at least the contributions of its direct subordinates, but in reality it is expected that the executive author can access the original content of all junior and senior authors for the entire hierarchy of authority. The data associated with the executive author is like that of the senior authors, but the executive author will provide and sign the final version of the copyright work, rather than on unfinished versions:

TABLE 5

The data associated with an executive author.

| Data | Notation | Technology |
|---|---|---|
| The contribution of the executive author. | $D_{0,2} := O_{0,2} + \Sigma_{j=e}^{e+(n-1)}(D_{0,2,j} \oplus E_{0,2,j})$ | — |
| A double hash of the contribution. | $H(H(D_{0,2})) = H^2(D_{0,2})$ | HASH160/ SHA256 |
| A signature of the hash of the contribution. | $\sigma(P_0, H(D_{0,2}))$ | e.g. ECDSA e.g. Rabin |
| Summary hash(es) of hash tree branch(es). | $H_{0,0} := H(G_{0,0})$ $H_{0,1} := H(G_{0,1})$ | HASH 160/ SHA256 |

In the majority of cases, the executive author is responsible for joining to connecting branches, in the same way a newspaper's EIC C-G0 is responsible for collating and signing off both the sport and finance sections. For this reason, it is expected that the executive author will have to provide multiple summary hashes, as shown in the above table.

It should be noted also that the contribution of the executive author is the final version of the document, both denoted by $D_0$ in mathematical notation (reference sign D in FIGS. 18B-19B). However, this is not the root of the hash tree. The root of the hash tree itself is still to be obtained by concatenating the double-hash of this final document concatenated with all the summary hashes at the m=1 level.

For instance, in the copyright assignment hash tree FIG. 12 the root hash $H_0$ of the tree, which is just the hash value of the node $N_0$, is given exactly by $$H_0 = N_0 = H(H(G_{0,0}) \| H(G_{0,1}) \| H^2(D_{0,2})),$$

where the final version of the document $D_0$ has been written according to the indexing rules of the hash tree itself as $D_{0,2}$.

Finally, it should be noted that, as with senior authors, it is possible to have more than one executive author for a given hierarchy of authority e.g. a board of directors rather than an EIC. In this case, it is sensible that all executive authors are consistent in providing the same final version of the copyright work $D_0$.

Techniques

The next section expands on the description of the method for implementing the generalised hash tree structure 1820 described above with reference to FIGS. 19A and 19B. The concepts and techniques utilised in this implementation will now be detailed further.

Double-Hashing

As explained previously, double-hashing the original content data $H^2(D)$ for each contributing author can be advantageous. This is because the recipient of the data, i.e. the direct superior of the author, can prove that they have received D by providing its single-hash $H(D)$, which is the preimage of $H^2(D)$, without exposing D itself.

This is particularly desirable when disclosing components of an eventual copyright work on the Blockchain, because the value of $H^2(D)$ can be put in a transaction to later prove existence of D, and the superior can demonstrate that the document has been passed upward to them by including the value $H(D)$ in a transaction. In neither transaction is the sensitive copyright material revealed.

The hash value H(D) revealed by a superior (generally denoted by reference signs of the form H-xx in the Figures) is referred to as a proof of receipt herein.

As described below, the double-hash value $H^2(D)$ of a component D of a copyright work can be used as an effective unique identifier for that component. This provides a high granularity in how components of copyrighted work can be distributed and licensed, which is shown in a use case below (streaming digital content).

Hash Puzzle Locking Scripts

A hash puzzle can be written in Script as a locking script

[Hash puzzle $H(X)$]=OP_HASH160 $H(X)$ OP_EQUALVERIFY, which can only be solved and unlocked if provided with the input X. To enforce a proof of receipt, a modification of the hash puzzle forces the solver to reveal the immediate preimage of a double-hash. A proof of receipt can be written in Script as

[Prove receipt $D_1, \ldots, D_n$]=[Hash puzzle $H^2(D_1)$] ... [Hash puzzle $H^2(D_n)$]=OP_HASH160 $H^2(D_1)$OP_EQUALVERIFY ... OP_HASH160 $H^2(D_n)$OP_EQUALVERIFY, which can only be solved by providing all the data $D_1, \ldots, D_n$. This locking script condition can be used when implementing and recording a copyright assignment hash tree on the blockchain.

As will be appreciated, OP_HASH160 is just one example of a suitable hash function. In general, any cryptographically secure hash function can be used (another example being OP_SHA256).

Use of Discretionary Signatures

As above, a discretionary signature is a signature that is not used by the blockchain consensus algorithm. In a UTXO model, it is not a signature that will be consumed as input to an OP_CHECKSIG operation in script.

A discretionary signature is denoted as $\sigma(P, m)$ and non-discretionary signatures, which are consumed by OP_CHECKSIG, by Sig(P, m) where P is the public key of the signer and m is the message (portion of a transaction) to be signed. For a non-discretionary signature, m is always a transaction, whereas for a discretionary signature m could be any message.

A discretionary signature can be used as a secondary measure for an author to consent to the use of their work. For instance, an author can attest to their contribution directly as $\sigma(P,H(D))$ in addition to giving a signature Sig(P,Tx) as a part of a transaction that consents to the use of the content by a superior.

Note that a discretionary signature could be of any digital signature type, while a non-discretionary signature must necessarily by an ECDSA signature, assuming that is mandated by the blockchain protocol. More general, a non-discretionary signature must be applied in accordance with whatever blockchain protocol applies, whereas a discretionary signature can be applied independently of the blockchain protocol (the only requirement being that it is included in a way that does not invalidate the transaction).

Communication Channels

There is a distinction between how different components of data are stored and transferred. A distinction is drawn between data that are transferred on-block, as part of transaction, or off-block via some other communication channel, preferably a secure one (A "side-channel").

This is important for storing a copyright assignment hash tree on the blockchain because of the following considerations:

Non-public disclosure—if the hash tree is generated before it is desirable to publicly detail the invention e.g. prior to patent filing, it is sensible to only store the hash values of the data rather than the raw data itself.

Proof of receipt—the raw data can be sent off-block, for example to a superior, and a hash puzzle on the double-hash of the data can be used on-block used to prove that the data has been received by the superior and only revealing the single hash of the data on-block (see 1).

Figure 23:
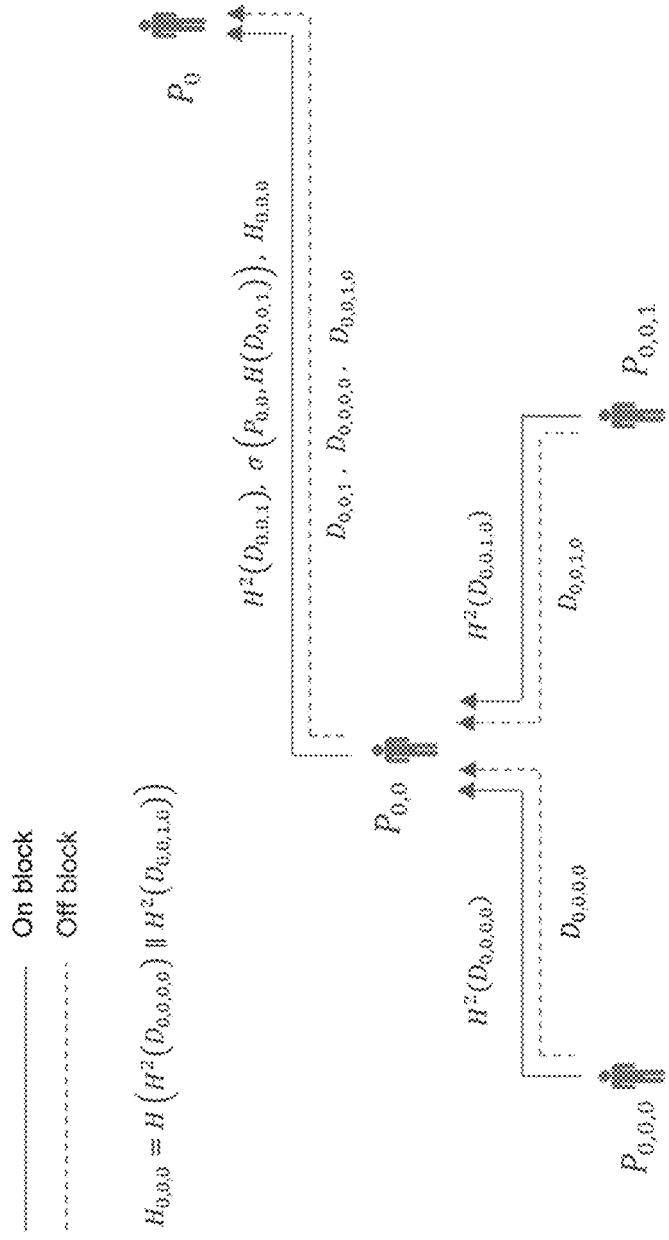
FIGS. 23 and 24 show further examples of hierarchical relationships between contributors, separating out on-chain data from data exchanged off-chain, FIG. 25 schematically depicts the relationship between a set of transactions and a hierarchy of contributions, FIG. 25 schematically depicts the relationship between a set of transactions and a hierarchy of contributors.
Figure 24:
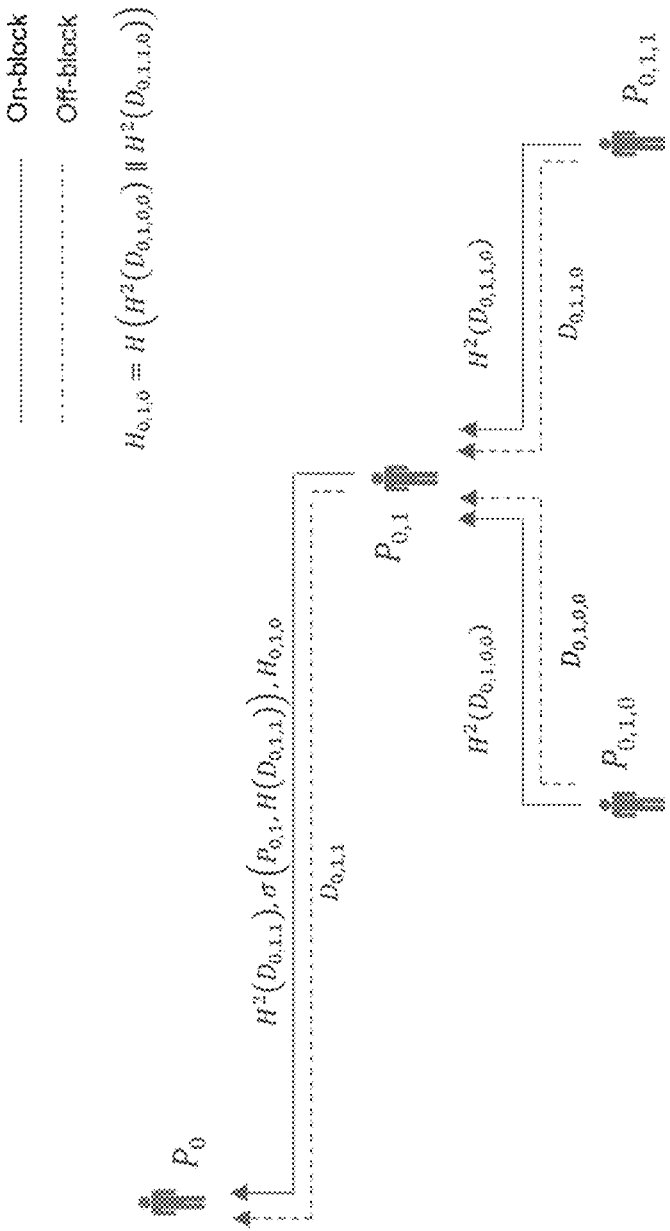

FIGS. 23 and 24 show how a process of sending data off-block and on-block can occur in parallel and within the desired hierarchy of rights of a corporate framework or other external hierarchy.

Here, raw data to be kept off-block are represented by D-values, the hashes and double hashes of which are stored on-block. The meaning of the other on-block data shown here is explained earlier.

FIG. 23 depicts the main data flows for a hierarchy of authority branch. Here, $P_0$ represents an executive author, $P_{0,0}$ is a senior author and $P_{0,0,0}$, $P_{0,0,1}$ are both junior authors.

FIG. 24 depicts the main data flows for a hierarchy of another authority branch. Here, $P_0$ represents an executive author, $P_{0,1}$ is a senior author and $P_{0,1,0}$, $P_{0,1,1}$ are both junior authors.

Implementation Using the Blockchain

To implement a copyright assignment hash tree on the Blockchain, nodes (hash values) are stored in transactions 152 in a way that reflects both the structure of the hash tree itself and the order of operations for creating a copyright work, as determined by a HoA.

The existing public key infrastructure that governs the ownership of digital assets within the blockchain 150 is used to represent the authority chain, and the structure of transactions is used to represent the connections (directional edges) between nodes of the hash tree. The properties of the blockchain 150 make it a means of embodying a generalised hash tree that allows the order of operations encoded in the hash tree to be immutably time-stamped on a public ledger.

In the described implementation, transactions 152 are used to represent the edges of the hash tree. This means that a transaction will directly represent the process of concatenating and hashing a set of siblings to generate a parent node.

Figure 25:
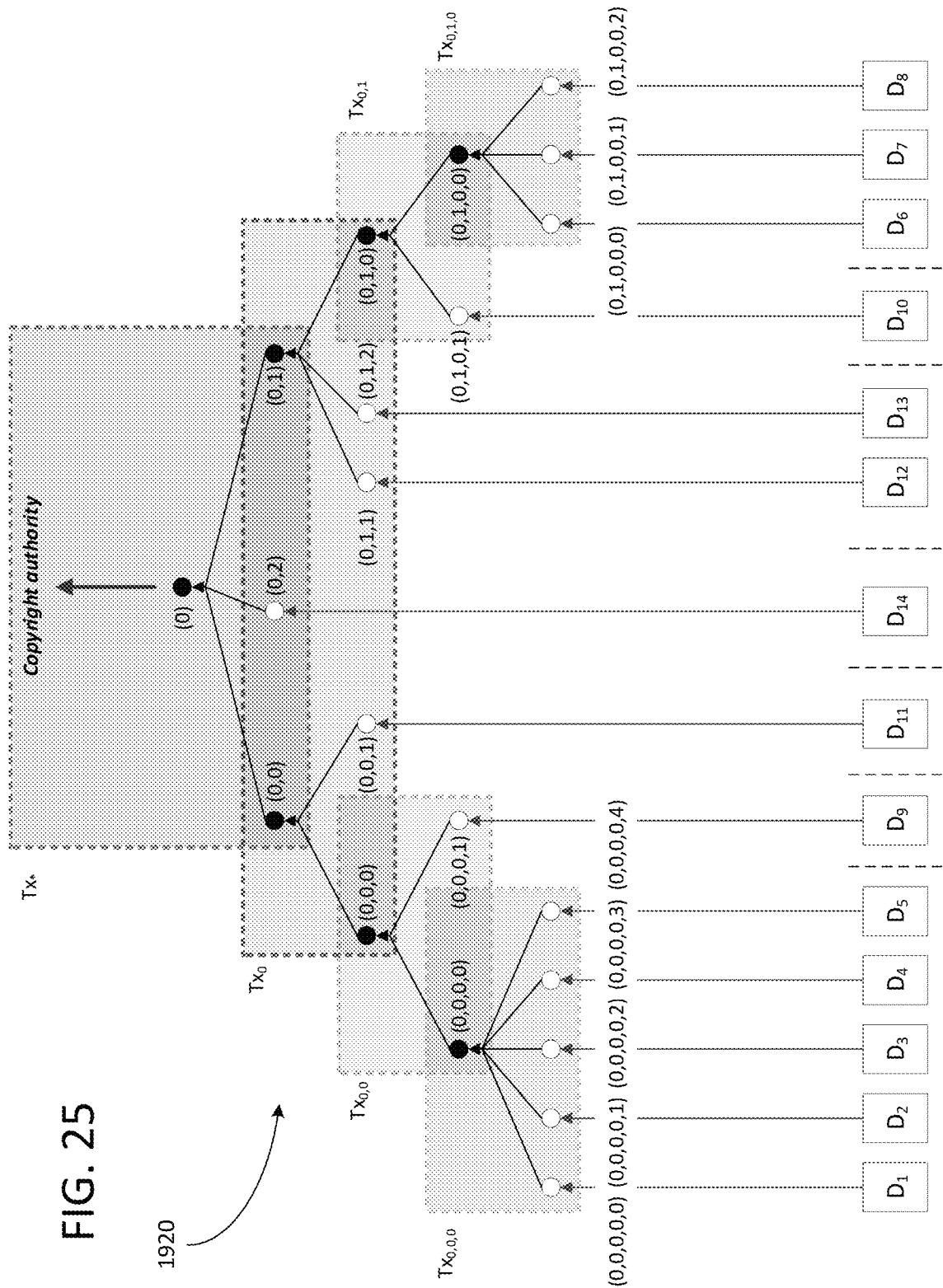

The mapping of the hash tree structure to a set of transactions $\{Tx_*, Tx_0, Tx_{0,0}, Tx_{0,0,0}, Tx_{0,1}, Tx_{0,1,0}\}$ is illustrated schematically in FIG. 25.

FIG. 25 shows a copyright assignment tree mapped to the set of blockchain transactions 1920 representing the edges between nodes. This is the same set of transactions depicted in FIGS. 19A and 19B, however FIG. 25 uses a mathematical notation to represent the transactions (also used below). This mathematical notation maps to the reference signs used in FIGS. 19A and 19B as follows:

$Tx_{0,0,0}$–TX-A
$Tx_{0,1,0}$–TX-B
$Tx_{0,0}$–TX-C
$Tx_{0,1}$–TX-D
$Tx_{0,0}$–TX-EF
$Tx_0$–TX-G
TX*–TX*

Note that each transaction contains hash tree nodes from two different tree levels. In any given transaction, the 'lower' edges are part of transaction inputs and 'higher' edges part of the outputs, as described above in the example of FIGS. 19A and 19B.

The mapping of hash tree nodes to Blockchain transactions uses the convention that transaction inputs contain non-discretionary signatures from authors and the outputs represent a proof of existence of the content they have authored. These outputs are also locked such that only the direct superior(s) of the author can unlock the UTXO and continue adding to the hash tree.

Figure 26:
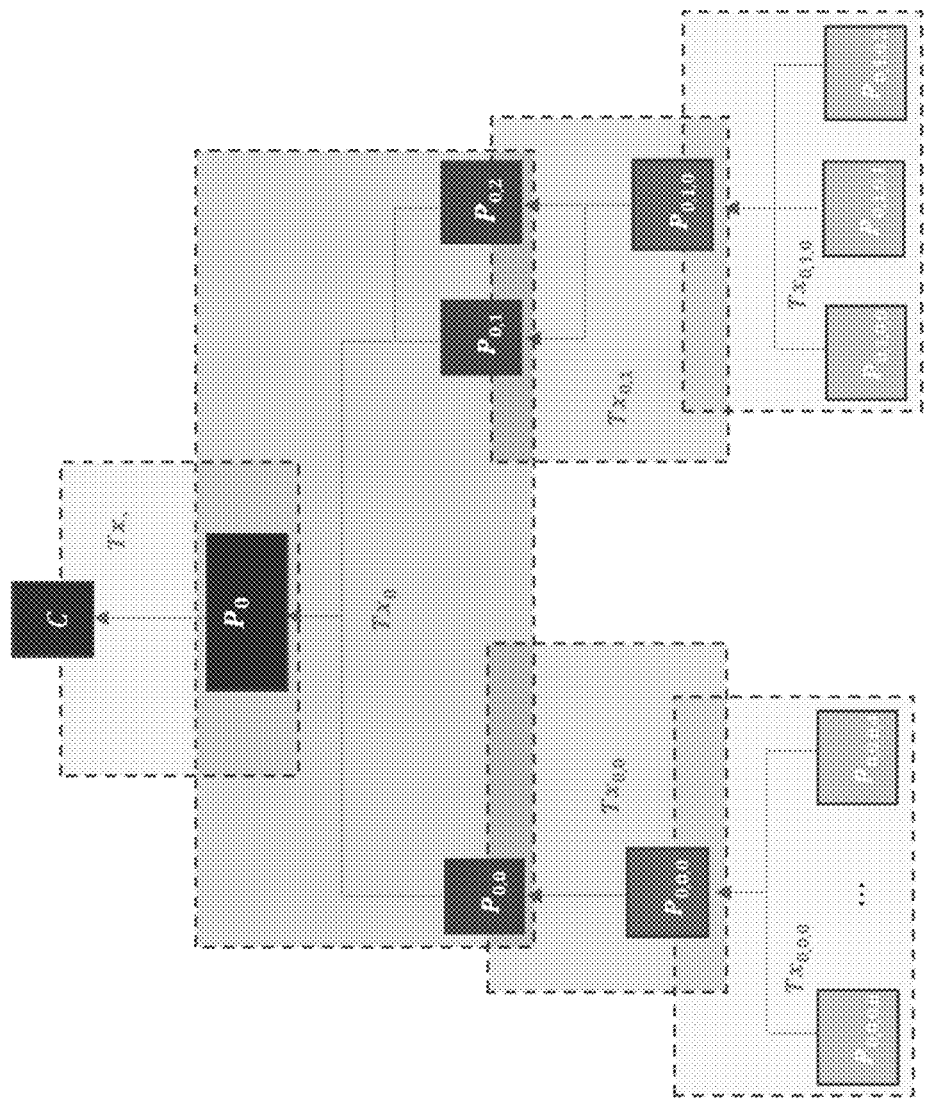
FIG. 26 shows a mapping between a contributor hierarchy and a corresponding chain of transactions.

The relationship between the transactions shown here and the newspaper HoA is visualised in FIG. 26.

FIG. 26 shows the mapping between the hierarchy of authority (HoA) and the corresponding chain of transactions.

Authors at any given level include their discretionary signature and a double-hash of their content in an output, thus effectively passing their original work up the hierarchy and consenting to its use by a superior.

The intention here is to be able to represent the organisational hierarchy of authority on the blockchain 150 as well as storing a representation of each component of the copyright work as a unique hash value.

For this implementation a transaction effectively provides the details of a branch of the hash tree. A branch as is defined as a collection of similar edges. If there is a parent node with four children, the collection of these four edges will be called a branch. Recall that these edges are considered similar because each is created by concatenating all four children and hashing the result.

For example, consider the transaction $Tx_{0,0,0}$. This transaction is the documentation of the branch where the senior author $P_{0,0,0}$ is represented by the destination (recipient) of an output and the junior authors $P_{0,0,0,0}, \ldots, P_{0,0,0,4}$ are represented by the input signatures. The signature from the recipient senior author $P_{0,0,0}$ will be required to spend the output of the transaction $Tx_{0,0,0}$.

This paradigm is common to all transactions except the final transaction $Tx_*$—the transaction between the executive author(s) and the copyright authority. This transaction differs in that the output can be unlocked by the copyright authority, such as an IP registry or patent attorney, which is external to the hierarchy of rights.

This final transaction includes a hashed representation of both the final version D of the copyright work and the root hash $H_0$ of the content assignment hash tree.

In the case of the copyrighted newspaper, there is only one root author $P_0$. The final version of the newspaper is given by the data $D_{0,2}$ because this is the data stored at the leaf node $N_{0,2}$ representing the root author (see 4.1.3 for detail).

It is stressed that the distinction needs to be made between the hash value $H_{0,2}=H^2(D_{0,2})$ of the node $N_{0,2}$, corresponding to the executive author, and the node $N_0$, corresponding to the root hash $H_0$.

Transactions and Data

Possible forms of the transactions 1920 embodying the hash tree 1820 will now be described. These transactions fully represent the copyright assignment hash tree 1820 for the newspaper hierarchy.

The hash tree is implemented using several of the techniques described herein. This is simply to demonstrate how these techniques lend themselves to the application of Intellectual Property stored on the blockchain, but it should be noted that this method is not limited to these techniques alone.

Junior Author to Senior Author

Consider the transaction $TxID_{0,0,0}$ from the five junior authors (sports journalists) to the senior author (sports editor), which is shown in FIG. 12.

This transaction, shown as Transaction 1 below, comprises five inputs, one to separately provide a signature from each junior author, and two outputs.

The first output is an un-spendable OP_RETURN output, which includes (i) the double-hash of each leaf author's contribution and (ii) a discretionary signature on the single-hash of each author's contribution. The double-hash allows the senior author, to whom the transaction is paid, to later provide a proof of receipt (in the form of a single hash, without revealing the underling contribution).

The second output is a spendable UTXO, comprising two locking script components. The first is a simple signature checking script, which is unlocked when provided with a signature from the public key $P_{0,0,0}$ belonging to the senior author.

The second part is a proof of receipt script, as shown in section 4.1.4, which is unlocked when provided with the hash of each junior author's contribution, which is passed to the relevant senior author off-block.

| $TxID_{Jun-Sen} = TxID_{0,0,0}$ | | | |
|---|---|---|---|
| Inputs | | Outputs | |
| Value | Script | Value | Script |
| $x_0$ BSV | $<Sig(P_{0,0,0,0}, Tx)>$ $<P_{0,0,0,0}>$ | $y_0$ BSV | OP_RETURN $<H^2(D_{0,0,0,0,0})>$ $<\sigma(P_{0,0,0,0}, H(D_{0,0,0,0,0}))>$ $<H^2(D_{0,0,0,0,1})>$ $<\sigma(P_{0,0,0,1}, H(D_{0,0,0,0,1}))>$ . . . $<H^2(D_{0,0,0,0,4})>$ $<\sigma(P_{0,0,0,0,4}, H(D_{0,0,0,0,4}))>$ |
| $x_1$ BSV | $<Sig(P_{0,0,0,1}, Tx)>$ $<P_{0,0,0,1}>$ | $y_1$ BSV | [CheckSig $P_{0,0,0}$] [Prove receipt $D_{0,0,0,0,0}, \ldots, D_{0,0,0,0,4}$] |
| . . . | | | |
| $x_4$ BSV | $<Sig(P_{0,0,0,4}, Tx)>$ $<P_{0,0,0,4}>$ | | |

Transaction 1: An example of a Junior-to-Senior transaction using OP_RETURN. This corresponds to $TxID_{0,0,0}$ from FIG. 26.

It is also possible to create this same transaction but using a multisignature UTXO instead. Here, the OP_RETURN output is replaced with the following locking script component.

[CheckMultisig 1-of-11, $P_{0,0,0}$]=

OP_1

$\langle H^2(D_{0,0,0,0,0})\rangle\langle\sigma(P_{0,0,0,0}, H(D_{0,0,0,0,0}))\rangle$ $\langle H^2(D_{0,0,0,0,1})\rangle\langle\sigma(P_{0,0,0,1}, H(D_{0,0,0,0,1}))\rangle$ $\vdots$ $\langle H^2(D_{0,0,0,0,4})\rangle\langle\sigma(P_{0,0,0,1}, H(D_{0,0,0,0,4}))\rangle$ $\langle P_{0,0,0}\rangle$

OP_11

OP_CHECKMULTISIG

This locking script is used to store the junior authors' contributions rather than an un-spendable OP_RETURN output. This locking script is solved by providing the senior author's signature using public key $P_{0,0,0}$, and thus functions the same way as the signature check in the previous diagram. This alternative form of the junior author to senior author transaction is shown below as Transaction 2.

| $TxID_{Jun-Sen} = TxID_{0,0,0}$ | | | |
|---|---|---|---|
| Inputs | | Outputs | |
| Value | Script | Value | Script |
| $x_0$ BSV | $<Sig(P_{0,0,0,0}, Tx)>$ $<P_{0,0,0,0}>$ | $y_0$ BSV | [CheckMultisig 1-of-11, $P_{0,0,0}$] [Prove receipt $D_{0,0,0,0,0}, \ldots, D_{0,0,0,0,4}$] |
| . | | | |
| . | | | |
| . | | | |
| $X_4$ BSV | $<Sig(P_{0,0,0,4}, Tx)>$ $<P_{0,0,0,4}>$ | | |

Transaction 2: An example of a Junior-to-Senior transaction using a multisignature locking script. This corresponds to $TxID_{0,0,0}$ from FIG. 16.

The use of OP_RETURN allows the hash values of the 'current' author to be added directly. Using multisignatures hides them within a script, which will be hashed, and so the committed hashes of the content data only become revealed in the next transaction directly above in the tree.

The following description continues to use the multisignature form for the remaining transactions in this implementation, but OP_RETURN is nonetheless a valid method. More generally, the data in question can be contain in the transaction in any way that does not invalidate the transaction (and preferably in a signed output(s)).

Senior Author to Senior Author

Consider the transaction $TxID_{0,0}$ from the senior author $P_{0,0,0}$ to the higher-ranking senior author $P_{0,0}$. Both actors are senior authors, and both are represented by leaf nodes—but at different levels—in the copyright assignment hash tree 1820.

This transaction is similar in principle to the junior to senior transaction just described. The main difference here is that this is one actor creating a transaction to one other actor, rather than the previous situation where five junior authors paid to one senior author.

This difference is reflected in the number of inputs, which is now just one, and the number of data elements stored in the output script. The transaction itself is shown as Transaction 3 below.

| $TxID_{Sen-Sen} = TxID_{0,0}$ | | | |
|---|---|---|---|
| Inputs | | Outputs | |
| Value | Script | Value | Script |
| $x_0$ BSV | $<H(D_{0,0,0,0,0})> \ldots$ $<H(D_{0,0,0,0,4})>$ OP_0 $<Sig(P_{0,0,0}, Tx)> <P_{0,0,0}>$ | $y_0$ BSV | [CheckMultisig 1-of-4, $P_{0,0}$] [Prove receipt $D_{0,0,0,1}$] |

Transaction 3: An example of a Senior-to-Senior transaction using a multisignature locking script. This corresponds to $TxID_{0,0}$ from figure prev 16.

The input script satisfies the locking encumbrances of the previous $TxID_{0,0,0}$ that was sent to the lower-ranking senior author $P_{0,0,0}$. This comprises the five hashed data elements required to satisfy the proof of receipt spending condition and the author's signature $Sig(P_{0,0,0}, Tx)$ required to satisfy the multisignature locking condition.

The output script comprises the same types of locking conditions; one multisignature script and one proof of receipt script. The main difference here is that the multisignature script only includes the double-hash of this lone contribution and the lower-ranking senior author's discretionary signature. However, this locking script also includes the summary hash $H_{0,0,0,0}$, which is the hash of the concatenation of all the junior editors' earlier contributions. This script is written as:

[CheckMultisig 1-of-4, $P_{0,0}$]=

OP_1

$<H^2(D_{0,0,0,0})><\sigma(P_{0,0,0}, H(D_{0,0,0,1}))>$ $<H_{0,0,0,0}>$ $<P_{0,0}>$

OP_4

OP_CHECKMULTISIG

This script can be unlocked when provided with a signature from the higher-ranking senior editor, who is the owner of $P_{0,0}$. Note also that the proof of receipt will only ask the higher-ranking senior author to provide the hash of the lower-ranking author's contribution $H(D_{0,0,0,1})$.

Senior Author to Executive Author

Consider the transaction $TxID_0$ sent from the senior sports editor $P_{0,0}$ and both senior finance editors $P_{0,1}, P_{0,2}$ paid to the editor-in-chief (EIC) $P_0$. Recall that the senior editors are all senior authors and the EIC is the sole executive author. Once more, all these actors are represented by leaf nodes in the copyright assignment hash tree.

This transaction is shown as Transaction 4 below and has three inputs, since there are three senior authors at the same level in the hash tree, and one output since there is only one executive author, the EIC.

The input scripts are of the same form as the senior to senior transaction shown previously. However, because both finance editors have the same junior finance editor, they both also provide the hash $<H(D^3_{0,2,1,2} D_{0,1,0,1})>$ of the junior editor's contribution as inputs.

| $TxID_{Sen-Exe} = TxID_0$ | | | |
|---|---|---|---|
| Inputs | | Outputs | |
| Value | Script | Value | Script |
| $x_0$ BSV | $<H(D_{0,0,0,1})>$ OP_0 $<Sig(P_{0,0}, Tx)> <P_{0,0}>$ | $y_0$ BSV | [CheckMultisig 1-of-9, $P_0$] [Prove receipt $D_{0,0,1}, D_{0,1,1}, D_{0,1,2}$] |
| $x_1$ BSV | $<H(D_{0,1,0,1})>$ OP_0 $<Sig(P_{0,1}, Tx)> <P_{0,1}>$ | | |
| $x_2$ BSV | $<H(D_{0,1,0,1})>$ OP_0 $<Sig(P_{0,2}, Tx)> <P_{0,2}>$ | | |

Transaction 4: An example of a Senior-to-Executive transaction using a multisignature locking script. This corresponds to $TxID_0$ from FIG. 16.

The output script used here requires a proof of receipt of the senior authors' contributions to be provided by the EIC, as well as the EIC's signature using $P_0$. The multisignature script, shown below, also includes both summary hashes $H_{0,0,0}$ and $H_{0,1,0}$ for this level of the tree.

```
[CheckMultisig 1-of-9, P_0] =
OP_1
<H²(D_{0,0,1})> <σ (P_{0,0}, H(D_{0,0,1}))>
<H²(D_{0,1,1})> <σ (P_{0,1}, H(D_{0,1,1}))>
<H²(D_{0,1,2})> <σ (P_{0,2}, H(D_{0,1,2}))>
<H_{0,0,0}>
<H_{0,1,0}>
<P_0>
OP_9
OP_CHECKMULTISIG
```

Executive Author to Copyright Authority

Consider the transaction $TxID_*$ sent from the EIC $P_0$ to a copyright authority (CA) $P_*$. This transaction is created by the executive author, and has special properties, in that it contains:

(i) A unique representation $H^2(D)$ of the final version or state of the copyright work D.

(ii) The root hash $H_0=N_0$ for the copyright assignment tree.

This transaction, shown as Transaction 5 below, also includes an input signature from the executive author(s) to signify that the highest authority in the hierarchy of rights consents to disclosing this to a third-party CA by sending the final state D off-block.

$TxID_{Root-Authority} = TxID*$

| Inputs | | Outputs | |
|---|---|---|---|
| Value | Script | Value | Script |
| $x_0$ BSV | <H(D_{0, 0, 1})> <H(D_{0, 1, 1})> <H(D_{0, 1, 2})> OP_0 <Sig(P_0,Tx)> <P_0> | $y_0$ BSV | [CheckMultisig 1-of-5, P*] [Prove receipt $H_0$] |

Transaction 5: An example of an Executive-to-Copyright Authority transaction. This corresponds to $TxID_0$ from FIG. 16.

The transaction comprises one input and one output. The input includes the single-hash of the senior authors' contributions to the copyright work as a proof of receipt, as well as the requisite signature from the EIC's public key $P_0$.

The output of this transaction has two locking components, one is a simple hash puzzle which requires the Copyright Authority to provide the value of $H_0$ (denoted by reference sign H-RH in FIG. 19B), which acts as both a simple declaration of the root of the hash tree and a proof that the Copyright Authority has received the correct, expected version of the final copyright work and its corresponding hash tree representation. This is written as

[Hash puzzle $H(H_0)$]=OP_HASH160 $H^2(H_0)$
OP_EQUALVERIFY

It is emphasised that OP_HASH160 is used as an illustrative example and is merely one of a number of hash functions that may be used to construct a viable hash puzzle. The term hash puzzle does not imply any specific hash function and any hash function with the requisite cryptographic properties can be used to construct a hash puzzle.

The second component is a multisignature script, which comprises the EIC's contribution, a signature of that contribution, both of the relevant summary hashes, and can be written as

```
[CheckMultisig 1-of-5, P_*] =
OP_1
<H²(D_{0,2})> <σ_0 (P_0, H(D_{0,2}))>
<H_{0,0}>
<H_{0,1}>
<P_*>
OP_5
```

When the Copyright Authority satisfies these locking conditions in a subsequent transaction, the process of implementing the copyright assignment tree on the blockchain is complete.

Summary

In summary, the above-described embodiments provide:

A generalised hash tree that can store a copyright work whilst also reflecting a hierarchy of authority to represent the ownership of rights;

A blockchain-based implementation for storing a generalised hash tree on a public blockchain.

These two aspects are used in conjunction to address the issues of assignment of rights to IP and subsequent disclosure as identified in the introduction to this paper.

The system set out above draws on the properties of the blockchain and related cryptographic primitives to produce a variety of valuable functionalities that support content management systems. This is in particular as it relates to documenting ownership and chronology in collaborative creation of content. Through the system outlined in the WP the following is enabled:

Unique Content Identifiers $H^2(D)$:

Produce a unique identifier for any piece of content. This unique identifier is the $H^2(Content)$. This identifier of the content can be utilised in external systems that need to retrieve or refer to the content of interest. (Consider as an example the ISBN identifier that offers similar functionality for books).

'Proof of Work' and 'Proof of When':

In this context this refers to an actor's ability to prove that they created specific content by referring to an existing transaction on the blockchain that contains the pair $[H^2(Content), \sigma(H(Content))]$ This transaction, being on the (immutable) blockchain in a specific block, shows that the content itself was provably created at least before a 'specific time'. The signature of the preimage of the double-hash shows that owner of the private key had knowledge of the content at or before that point in time.

Proof of Inclusion:

The underpinning of the system by a conceptual mapping to a hash tree, and the storage of applicable hashes in blockchain transactions, grant stakeholders the ability to prove the inclusion of specific content (represented by $H^2(Content)$) in the final version of content. This is where the final version is a function of multiple contributing content, and where the different content may be produced by two or more participants.

The storage of this hash tree data on the blockchain, enforced by the appropriate participants providing digital signatures to approve content, data, and processes, make the proof of inclusion particularly potent, giving the transparency and immutability of the blockchain, and the properties of digital signatures as it relates to refutation.

Proof of Transfer:

By signing his input of the transaction-as-edge, this serves as the entity (child) giving its parent entity permission to edit or utilise the content produced by the child. This signature of transaction input also serves as a representation that the child entity agrees that the content (represented by its identifier H²(Content)) being passed on is correct.

Proof of Receipt:

Where an entity spends the output of a transaction-as-edge, (this includes the entity providing his/her signature and well as the hash of the child's output) this certifies that the entity has received the raw content from its child node and that the raw content is consistent (matches perfectly) with what the child node says the raw content should be.

Proof of Chronology:

By having the transaction-as-edges represent the transfer of content from child nodes to parent nodes. This enforces a chronological documentation of the participant contributions given that any stakeholder can track the progressive composition of the final (root node) output starting from the leaf nodes through the hierarchy. Bearing in mind that the parent nodes spend the outputs of transactions from the child nodes—showing the sequence of contributions.

Disclosure of IP:

The disclosure of IP is achieved using a public blockchain 150. Since the public blockchain 150 acts as a secure timestamp-server for recording events, the publishing of the hash values in the copyright assignment hash tree acts as a non-enabling representation of an invention at a given timestamp.

The immutable property of public proof-of-work (PoW) blockchains, combined with the non-invertibility of hash functions, means that placing a hash value of a copyright work (or a component thereof) is a secure method of timestamping the moment of conception and subsequent development of a novel work. At a later time, the full work can be disclosed publicly elsewhere (e.g. by filing a patent) and its hash can be verified against the timestamped on-chain value.

This method therefore allows the resolution of disputes regarding priority or entitlement over an inventive concept and can be used in a number of ways in legal proceedings surrounding IP dispute.

Additionally, if a third-party service were to implement these methods on a large scale, a public Blockchain could be used as a general-purpose IP registry, which can include timestamped events in legal proceedings, such as the time of filing and the time of granting of IP protection.

6. Use Case: Streaming a Movie

The use of a generalised hash tree structure to represent the creation of a copyright work, combined with a blockchain to immutably timestamp the order of operations, may be applied to scenarios involving the creation of many different types of work.

One such example would be the creation of a movie, which will typically involve many parties such as a director, producers, screen-writers, actors, set-designers, and editors.

The described example considers a movie but the description applied equally to any other form of digital content comprised of discrete segments.

Generalised Hash Tree for a Movie

A highly-complex hash tree could be made to represent the creative process in its entirety, detailing how each element of the final movie has been created.

However, for this example a simplified scenario is considered. It is assumed the film-making process is split into the creation of three acts of equal length. Each act is in turn split into five chunks of equal length, such that the entire movie comprises 15 chunks of video data in total $D_1, \ldots, D_{15}$, each of which has an associated double-hash value $H^2(D_i)$. The movie can then be represented using a simple generic hash tree as shown in FIG. 15.

FIG. 15 shows a generalised hash tree structure applied to a movie, split into 15 data segments.

As discussed in section 6.3 below, the double-hash value associated with each chunk of the film can be used as a unique packet ID, and each packet can be quickly verified as part of this hash tree by using its Merkle root $R_M$ as a unique identifier for the entire film. In this sense, the root $R_M$ acts in a similar way to an ISBN or barcode as a unique identifier for the product.

However, the root $R_M$ is far more valuable as a unique product identifier than a traditional barcode, because it also enables the individual components of the film to be verified easily, provided there is a trusted source for $R_M$ itself.

Moreover, it is possible to associate each segment of the film $D_1, \ldots, D_{15}$ with the root of another, separate generalised hash sub-tree. This is how the individual components of each segment can be tracked on the blockchain using the copyright assignment implementation described in section 4.

Figure 16:
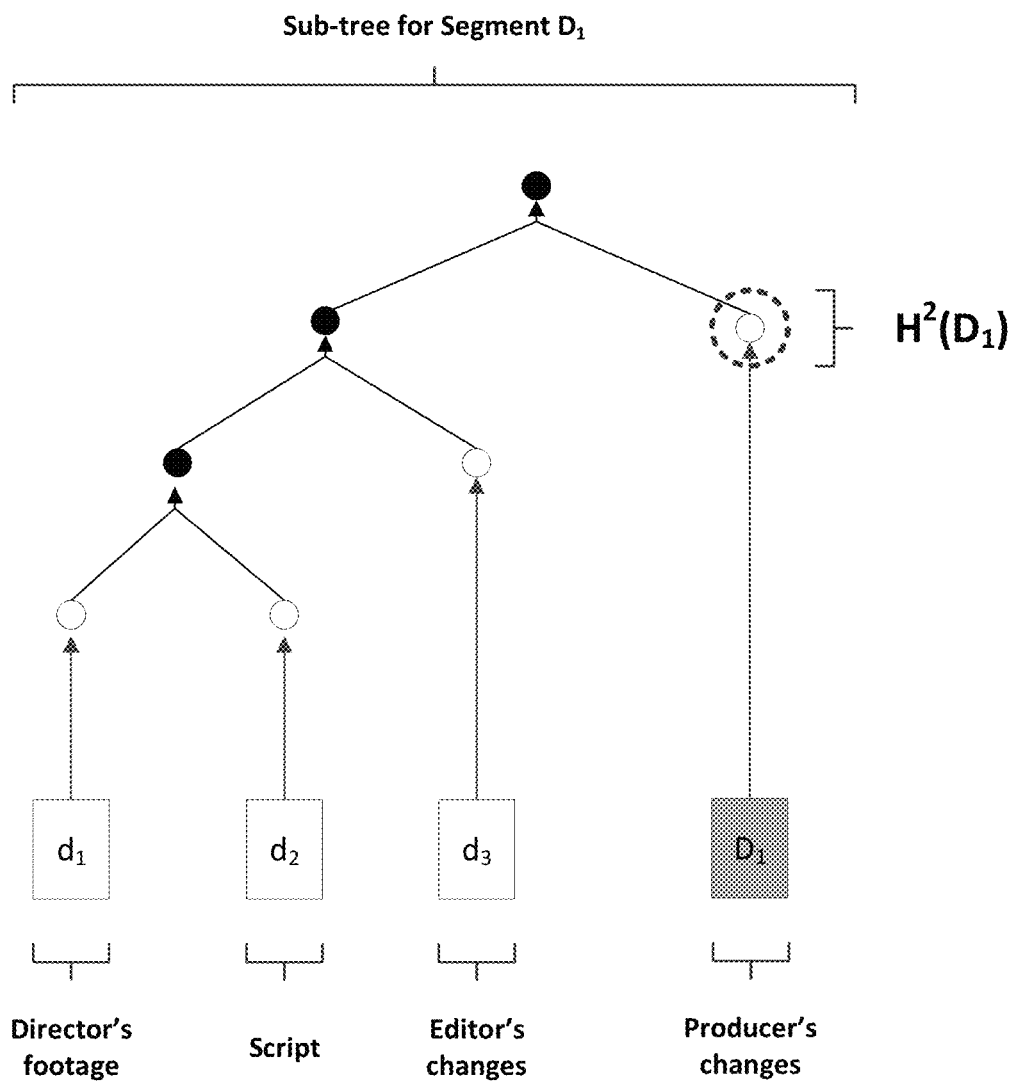
FIG. 16 shows a sub-tree for a given segment.

An example of such a generalised hash sub-tree for the first movie segment $D_1$ is shown in FIG. 16. In both FIGS. 15 and 16 the data segment for $D_1$ is shown in green for consistency, however, the two trees themselves are separate instances of a copyright assignment hash tree.

FIG. 16 shows A generalised hash sub tree for the first movie segment $D_1$. The data that is combined to eventually produce the segment $D_1$ are shown in lower case.

Streaming the Movie

For a movie represented by a hash tree of the kind shown in FIG. 15, one example of a practical application is a scenario in which a consumer (Alice) can use the generalised hash tree as a powerful data integrity check when streaming the movie from a streaming service provider (Bob).

When Alice wishes to stream the film, she could first retrieve the Merkle root $R_M$, which is used as the public unique identifier for the movie file. In addition to this, she should also retrieve the unique packet IDs $H^2(D_1), \ldots, H^2(D_{15})$ and the relevant Merkle paths $\Gamma_1, \ldots, \Gamma_{15}$ for each of the 15 movie segments. It is assumed that all of this information is publicly available on the blockchain 150 (see section 4) and have been certified by a standards body, such as the British Board of Film Classification (BBFC) in the UK [14]. The data Alice wants to stream, and the data Alice has ahead of time, are shown in the table 6 below.

TABLE 2

The data Alice requires to safely stream the movie from a network peer.

| Segments Requested (while streaming) | Data Obtained (beforehand) | |
| --- | --- | --- |
| $D_1$ | $H^2(D_1)$ | $\Gamma_1$ |
| $D_2$ | $H^2(D_2)$ | $\Gamma_2$ |
| ... | ... | ... |
| $D_{15}$ | $H^2(D_{15})$ | $\Gamma_{15}$ |

This means that Alice now has enough information to verify whether the data packets she is sent by the Bob, as the streaming service provider, are legitimate without needing to watch them herself. If Alice receives a packet that does not double-hash to the or any packet ID she can disregard the data as incorrect and terminate her viewing.

If combined with a pay-per-second payment framework, this would provide Alice with an extremely low-risk way to stream content on a peer-to-peer basis.

With an appropriate granularity in segment size, Alice is also protected from accidentally viewing indecent or unexpected content because she can enforce that the unique packet ID is always checked before watching and segment. This could be made as strict as a frame-by-frame pre-checking of packet IDs.

Updating the Version of a Movie

The ability to have a fixed, unique product identity—the root of a Merkle tree—is particularly useful for application to the creation of movies, which will often have multiple different versions. For instance, a movie will often have to be slightly modified for each country it is screened in to comply with local regulations.

These small modifications may be hard to distinguish for a human user such as Alice, but they will always be easy to detect in the hash digest of the movie data, due to the high-entropy properties of cryptographic hash functions.

Consider the same movie as above, which has 15 segments with unique packet IDs all connected inextricably to the unique product identity for the movie that is the Merkle tree root $R_M$.

It is feasible that the director revisits this movie several years later to make some minor editorial changes for a special 'director's cut' edition of the movie. The effect of the director's new changes to the movie are shown in FIG. 17.

Figure 17:
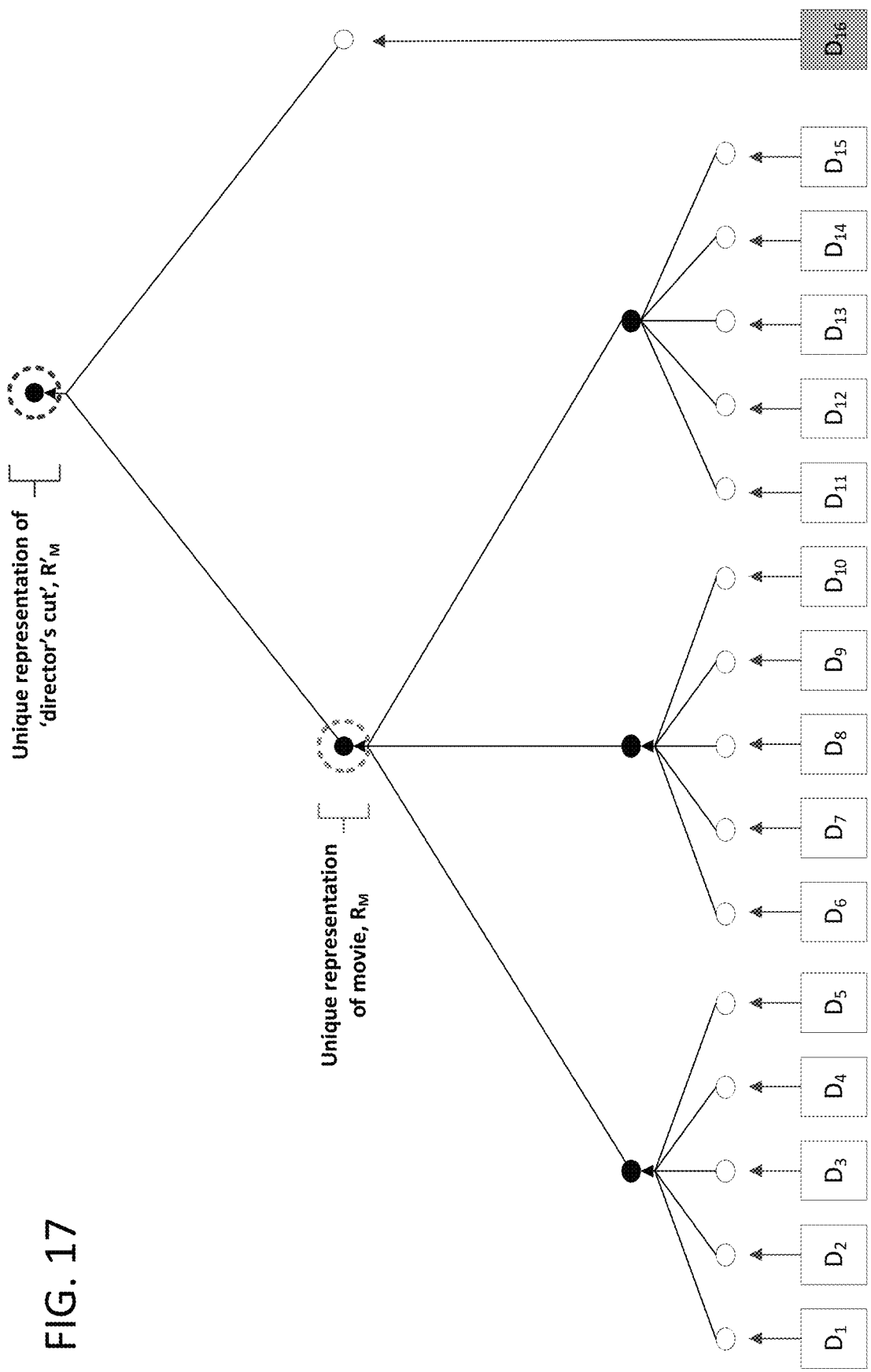
FIG. 17 shows a modified generalised hash tree representing a re-edited piece of digital content.

FIG. 17 shows a modified generalised hash tree representing the new 'director's cut' version of the movie. The director's changes to the original are shown (red) in the data segment $D_{16}$.

The new generalised hash tree must necessarily have a new root $R_M' \neq R_M$, which means the 'director's cut' version is easily distinguishable from the original version by employing the convention of using the root of the hash tree as the unique product identifier for the entire film.

This new identifier allows Alice to verify whether she is watching the expected version of the movie before she watches a single frame. If Alice is receiving data packets for the director's cut but is trying to verify them against the original film's product ID, then even the first segment will fail and she knows to ask Bob instead for the original version.

This check can also be used as a tool for users of peer-to-peer streaming services to ensure that they do not inadvertently stream a version of a movie that has been banned in their home country.

It will be appreciated that the above embodiments have been described by way of example only.

More generally there may be provided a method, apparatus or program in accordance with any one or more of the following Statements.

Statement 1. A first aspect herein provides computer-implemented method of recording, in one or more blockchain transactions, contributions to a work by contributors having respective levels in a defined hierarchy, in which one or more lower-level contributors provide, to a higher-level contributor, one or more lower-level contributions respectively, and the higher-level contributor provides a higher-level contribution responsive to the one or more lower-level contributions, the method comprising:

at computer equipment of the higher-level contributor, creating or modifying a higher-level contributor transaction to evidence the higher-level contribution, the created or modified higher-level contributor transaction comprising:

one or more inputs comprising:

one or more pointers to one or more spendable outputs of one or more lower-level contributor transactions, the one or more lower-level contributor transactions containing one or more lower-level contribution commitments evidencing the one or more lower-level contributions respectively, and one or more transaction signatures of the higher-level contributor satisfying one or more signature challenges of the one or more spendable outputs, wherein the higher-level contributor transaction contains a higher-level contribution commitment computed from the higher-level contribution, wherein the one or more pointers and the contribution commitments represent the relationship between the higher-level contributor and the one or more lower-level contributors within the defined hierarchy, and the one or more transaction signatures prove that relationship.

The wording "one or more lower-level contributor transactions containing first and second lower-level contribution hashes" includes the case when the first and second lower-level contribution hashes are contained in the same lower-level contributor transaction and the case where they are contained in different lower-level contributor transactions.

In the above-described examples, the contribution commitment(s) takes the form of a contribution hash (e.g. a single or double hash of the contribution it evidences). More generally, a contribution commitment may or may not be hash-based, e.g. a contribution commitment could comprise raw data of the contribution (e.g. it could be all or part of the contribution itself) or some other processed form of data of the contribution suitable for evidencing the contribution.

Example embodiments are set out below.

Statement 2. The method of Statement 1, wherein the one or more lower-level contributors comprise first and second lower-level contributors, the one or more lower-level contributions comprising first and second lower-level contributions of the first and second lower-level contributors respectively, the one or more lower-level contribution commitments comprising first and second lower-level contribution commitments evidencing the first and second lower-level contributions respectively.

Statement 3. The method of Statement 1 or 2, wherein the higher-level contributor transaction contains one or more proofs of receipt of the one or more lower-level contributions.

Statement 4. The method of Statements 2 and 3, wherein the one or more proofs of receipt comprise: a first proof of receipt of the first lower-level contribution, and a second proof of receipt of the second lower-level contribution.

Statement 5. The method of Statement 3 or 4, wherein the one or more proofs of receipt are contained in the one or more inputs and satisfy, respectively, first and second proof-of-receipt challenges of the one or more spendable outputs of the one or more lower-level contributor transactions.

Statement 6. The method of any preceding Statement, wherein the higher-level contributor transaction contains a proof-of-receipt challenge for the higher-level contribution.

Statement 7. The method of any preceding Statement, wherein the higher-level contributor transaction contains a transaction signature challenge for a receiving entity.

Statement 8. The method of Statement 7, wherein the receiving entity is an even higher-level contributor in the hierarchy, the higher-level contributor being an intermediate contributor between the lower-level contributors and the even higher-level contributor.

Statement 9. The method of any preceding Statement, wherein the higher-level contributor transaction contains a discretionary signature generated by applying a signature function to a private key of the higher-level contributor and a proof of the higher-level contribution, the proof of the higher-level contribution being the higher level contribution or a hash or other function thereof, wherein the proof of the higher-level contribution is not contained in the higher-level contributor transaction.

Statement 10. The method of any preceding Statement, wherein the contribution commitments are contribution hashes.

Statement 11. The method of Statements 9 and 10, wherein the higher-level contribution hash is a hash of the proof of the higher-level contribution.

Statement 12. The method of Statement 11, wherein the proof of the higher-level contribution is the higher-level contribution and the higher-level contribution hash is a single hash of the higher-level contribution; or wherein the proof of the higher-level contribution is a single hash of the higher-level contribution and the higher-level contribution hash is a double hash of the higher-level contribution.

The term "double hash" does not necessarily imply that the same hash function is applied twice. In general, a double hash of some data D can be expressed mathematically as $H_1(H_2(D))$ where $H_1$ and $H_2$ may be the same hash function ($H_1=H_2$) or different hash functions ($H_1 \neq H_2$).

Statement 13. The method of any of Statements 6 to 12, wherein the proof-of-receipt challenge, the transaction signature challenge for the receiving entity and/or the discretionary signature are contained in one or more outputs of the higher-level contributor transaction.

Statement 14. The method of Statement 13 when dependent on Statements 6, 7 and 9, wherein at least the proof-of-receipt challenge and the transaction signature challenge are comprised in an output of the one or more outputs, which is spendable independently of the discretionary signature.

Statement 15. The method any preceding Statement, wherein the one or more outputs comprise:

a summary hash computed by hashing a concatenated string comprising a single or multi-hash of the first lower-level contribution and a single or multi-hash of the second lower-level contribution, the spendable output being spendable independently of the summary hash.

Statement 16. A computer-implemented method of recording, in one or more blockchain transactions, contributions to a work by contributors having respective levels in a defined hierarchy, in which first and second lower-level contributors provide, to an intermediate-level contributor, first and second lower-level contributions respectively, and the intermediate-level contributor provides, to a higher-level contributor, an intermediate-level contribution responsive to the first and second lower-level contributions, the method comprising:

at computer equipment of the intermediate-level contributor, creating or modifying a blockchain transaction, the created or modified blockchain transaction comprising:
one or more inputs comprising:
a first proof of receipt of the first lower-level contribution,
a second proof of receipt of the second lower-level contribution, and
a transaction signature of the intermediate-level contributor;

one or more outputs comprising:
a proof-of-receipt challenge for the intermediate-level contribution,
a transaction signature challenge for the higher-level contributor, and
a discretionary signature;
wherein the discretionary signature is generated by applying a signature function to a private key of the intermediate-level contributor and the intermediate-level contribution or a hash thereof; and
wherein at least the proof-of-receipt challenge and the transaction signature challenge are comprised in an output of the one or more outputs, which is spendable independently of the discretionary signature.

Statement 17. The method Statement 16, wherein the one or more outputs comprise:
a summary hash computed by hashing a concatenated string comprising a single or multi-hash of the first lower-level contribution and a single or multi-hash of the second lower-level contribution, the spendable output being spendable independently of the summary hash.

Statement 18. The method of Statement 16 or 17, in which a second intermediate-level contributor provides a second intermediate-level contribution to the higher-level contributor;
wherein the one or more inputs of the blockchain transaction further comprise:
a third proof of receipt of a third lower-level contribution,
a transaction signature of the second intermediate-level contributor;
wherein the one or more outputs further comprise:
a proof-of-receipt challenge for the second intermediate-level contribution, and
a second discretionary signature;
wherein at least the challenge for the second intermediate-level contribution is comprised in said spendable output of the one or more outputs or another spendable output of the one or more outputs;
wherein the second discretionary signature is generated by applying a signature function to a single or multi-hash of the second intermediate-level contribution and said private key or another private key of the intermediate-level contributor.

Statement 19. The method of Statement 18, wherein the one or more outputs comprise a second summary hash, wherein the secondary summary hash is computed by hashing a preimage, the preimage comprising a single or multi-hash of the third lower-level contribution.

Statement 20. The method of Statement 19, wherein the one or more inputs of the blockchain transaction further comprise:
a fourth proof of receipt of a fourth lower-level contribution;
wherein the preimage hashed to compute the second summary hash is in the form of a second concatenated string comprising the single or multi-hash of the third lower-level contribution and a single or multi-hash of the fourth lower-level contribution.

Statement 21. The method of any preceding Statement, wherein the discretionary signature is comprised in one or more un-spendable outputs of the blockchain transaction.

Statement 22. The method of Statement 21 when dependent on Statement 17, wherein the one or more un-spendable outputs comprise the summary hash.

Statement 23. The method of Statement 21 or 22, wherein the one or more un-spendable outputs also comprise a single or multi-hash of the first lower-level contribution and a single or multi-hash of the second lower-level contribution.

Statement 24. The method of any of Statements 16 to 20, wherein the discretionary signature is comprised in the spendable output, the transaction signature challenge being a functional operand of a multi-signature check opcode and the discretionary signature being a dummy operand of the multi-signature check opcode.

Statement 25. The method of Statement 24 when dependent on Statement 17, wherein the summary hash is comprised in the spendable output as a dummy operand of the multi-signature check opcode.

Statement 26. The method of Statement 24 or 25, wherein a single or multi-hash of the first lower-level contribution and a single or multi-hash of the second lower-level contribution are also included as dummy operands of the multi-signature check opcode.

Statement 27. The method of any preceding Statement comprising the step of transmitting the blockchain transaction to a node of a blockchain network for processing at the node for recording in a blockchain.

Statement 28. The method of any of Statements 1 to 26, comprising the step of sending the blockchain transaction to an off-chain system for processing.

Statement 29. The method of any preceding Statement, wherein the higher-level contributor creates a second blockchain transaction for spending the spendable output, the second blockchain transaction comprising:
one or more inputs comprising:
the proof of receipt of the intermediate-level contribution,
a transaction signature of the higher-level contributor,
one or more outputs comprising:
a further proof-of-receipt challenge for a higher-level contribution of the higher-level contributor,
a transaction signature challenge for a recipient of the higher-level contribution,
a further discretionary signature;
wherein the further discretionary signature is generated by applying a signature function to a private key of the higher-level contributor and a single or multi-hash of the higher-level contribution.

Statement 30. The method of Statement 29, wherein the one or more outputs of the second blockchain transaction comprise a further summary hash computed by hashing a further concatenated string, the further concatenated string comprising the summary hash and a single or multi-hash of the contribution of the higher-level contributor.

Statement 31. The method of Statement 29 or 30, wherein the higher-level contribution is in the form of a final work responsive to all contributions received from all contributors within the hierarchy, the further proof-of-receipt challenge being satisfied by a proof of receipt of the final work.

Statement 32. A further aspect herein provides a blockchain transaction embodied in transitory or non-transitory media, the blockchain transaction evidencing a contribution of a higher-level contributor in a defined contributor hierarchy, the blockchain transaction comprising:
one or more inputs comprising:
a first proof of receipt of a first lower-level contribution,
a second proof of receipt of a second lower-level contribution, and
a transaction signature of the intermediate-level contributor;
one or more outputs comprising:
a proof-of-receipt challenge for an intermediate-level contribution,
a transaction signature challenge for a receiving entity, and
a discretionary signature verifiable based on a private key of the higher-level contributor and a proof of the intermediate-level contribution, the proof of the higher-level contribution being the higher-level contribution or a hash thereof, wherein the blockchain transaction does not contain the proof of the higher-level contribution;
wherein at least the proof-of-receipt challenge and the transaction signature challenge are comprised in an output of the one or more outputs, which is spendable independently of the discretionary signature.

According to another aspect disclosed herein, there may be provided a method comprising the actions of the first party, second party, any third party that may be involved, and/or any one or more of the network of nodes.

According to another aspect disclosed herein, there may be provided a system comprising the computer equipment of the first party, the computer equipment of the second party, the computer equipment of any third party, and/or any one or more of the network of nodes.

Other variants or use cases of the disclosed techniques may become apparent to the person skilled in the art once given the disclosure herein. The scope of the disclosure is not limited by the described embodiments but only by the accompanying claims

The invention claimed is:

1. A computer-implemented method of recording, in one or more blockchain transactions, contributions to a work by contributors having respective levels in a defined hierarchy, in which one or more lower-level contributors provide, to a higher-level contributor, one or more lower-level contributions respectively, and the higher-level contributor provides a higher-level contribution responsive to one or more lower-level contributions, the method comprising:
at computer equipment of the higher-level contributor, creating or modifying a higher-level contributor transaction to evidence the higher-level contribution, the created or modified higher-level contributor transaction comprising:
one or more inputs comprising:
one or more pointers to one or more spendable outputs of one or more lower-level contributor transactions, the one or more lower-level contributor transactions containing one or more lower-level contribution commitments evidencing the one or more lower-level contributions respectively, and
one or more transaction signatures of the higher-level contributor satisfying one or more signature challenges of the one or more spendable outputs,
wherein the higher-level contributor transaction contains a higher-level contribution commitment computed from the higher-level contribution, wherein the one or more pointers and the contribution commitments represent a relationship between the higher-level contributor and the one or more lower-level contributors within the defined hierarchy, and the one or more transaction signatures prove that relationship.

2. The method of claim 1, wherein the one or more lower-level contributors comprise first and second lower-level contributors, the one or more lower-level contributions comprising first and second lower-level contributions of the first and second lower-level contributors respectively, the one or more lower-level contribution commitments comprising first and second lower-level contribution commitments evidencing the first and second lower-level contributions respectively.

3. The method of claim 2, wherein the higher-level contributor transaction contains one or more proofs of receipt of the one or more lower-level contributions, wherein the one or more proofs of receipt comprise:
a first proof of receipt of the first lower-level contribution, and
a second proof of receipt of the second lower-level contribution.

4. The method of claim 2, wherein the one or more outputs comprise:
a summary hash computed by hashing a concatenated string comprising a single or multi-hash of the first lower-level contribution and a single or multi-hash of the second lower-level contribution, the spendable output being spendable independently of the summary hash.

5. The method of claim 1, wherein the higher-level contributor transaction contains one or more proofs of receipt of the one or more lower-level contributions.

6. The method of claim 5, wherein the one or more proofs of receipt are contained in the one or more inputs and satisfy, respectively, one or more proof-of-receipt challenges of the one or more spendable outputs of the one or more lower-level contributor transactions.

7. The method of claim 1, wherein the higher-level contributor transaction contains a proof-of-receipt challenge for the higher-level contribution.

8. The method of claim 7, wherein the proof-of-receipt challenge, the transaction signature challenge for the receiving entity and/or the discretionary signature are contained in one or more outputs of the higher-level contributor transaction.

9. The method of claim 1, wherein the higher-level contributor transaction contains a transaction signature challenge for a receiving entity.

10. The method of claim 1, wherein the higher-level contributor transaction contains a discretionary signature generated by applying a signature function to a private key of the higher-level contributor and a proof of the higher-level contribution, the proof of the higher-level contribution being the higher level contribution or a hash or other function thereof, wherein the proof of the higher-level contribution is not contained in the higher-level contributor transaction.

11. The method of claim 1, wherein the contribution commitments are contribution hashes.

12. A computer-implemented method of recording, in one or more blockchain transactions, contributions to a work by contributors having respective levels in a defined hierarchy, in which first and second lower-level contributors provide, to an intermediate-level contributor, first and second lower-level contributions respectively, and the intermediate-level contributor provides, to a higher-level contributor, an intermediate-level contribution responsive to the first and second lower-level contributions, the method comprising:
at computer equipment of the intermediate-level contributor, creating or modifying a blockchain transaction, the created or modified blockchain transaction comprising:
one or more inputs comprising:
a first proof of receipt of the first lower-level contribution,
a second proof of receipt of the second lower-level contribution, and
a transaction signature of the intermediate-level contributor;
one or more outputs comprising:
a proof-of-receipt challenge for the intermediate-level contribution,
a transaction signature challenge for the higher-level contributor, and
a discretionary signature;
wherein the discretionary signature is generated by applying a signature function to a private key of the intermediate-level contributor and the intermediate-level contribution or a hash thereof; and
wherein at least the proof-of-receipt challenge and the transaction signature challenge are comprised in an output of the one or more outputs, which is spendable independently of the discretionary signature.

13. The method of claim 12, wherein the one or more outputs comprise:
a summary hash computed by hashing a concatenated string comprising a single or multi-hash of the first lower-level contribution and a single or multi-hash of the second lower-level contribution, the spendable output being spendable independently of the summary hash.

14. The method of claim 13, wherein the discretionary signature is comprised in the spendable output, the transaction signature challenge being a functional operand of a multi-signature check opcode and the discretionary signature being a dummy operand of the multi-signature check opcode, wherein the summary hash is comprised in the spendable output as a dummy operand of the multi-signature check opcode.

15. The method of claim 12, in which a second intermediate-level contributor provides a second intermediate-level contribution to the higher-level contributor;
wherein the one or more inputs of the blockchain transaction further comprise:
a third proof of receipt of a third lower-level contribution,
a transaction signature of the second intermediate-level contributor;
wherein the one or more outputs further comprise:
a proof-of-receipt challenge for the second intermediate-level contribution, and
a second discretionary signature;
wherein at least the challenge for the second intermediate-level contribution is comprised in said spendable output of the one or more outputs or another spendable output of the one or more outputs;
wherein the second discretionary signature is generated by applying a signature function to a single or multi-hash of the second intermediate-level contribution and said private key or another private key of the intermediate-level contributor.

16. The method of claim 15, wherein the one or more outputs comprise a second summary hash, wherein the second summary hash is computed by hashing a preimage, the preimage comprising a single or multi-hash of the third lower-level contribution.

17. The method of claim 16, wherein the one or more inputs of the blockchain transaction further comprise:
a fourth proof of receipt of a fourth lower-level contribution;
wherein the preimage hashed to compute the second summary hash is in the form of a second concatenated string comprising the single or multi-hash of the third lower-level contribution and a single or multi-hash of the fourth lower-level contribution.

18. The method of claim 12, wherein the discretionary signature is comprised in one or more un-spendable outputs of the blockchain transaction.

19. The method of claim 12, wherein the discretionary signature is comprised in the spendable output, the transaction signature challenge being a functional operand of a multi-signature check opcode and the discretionary signature being a dummy operand of the multi-signature check opcode.

20. A non-transitory medium storing instructions, when executed by a processor, that cause the processor to perform a method of creating or modifying a blockchain transaction evidencing a contribution of a higher-level contributor in a defined contributor hierarchy, the blockchain transaction comprising:
one or more inputs comprising:
a first proof of receipt of a first lower-level contribution,
a second proof of receipt of a second lower-level contribution, and
a transaction signature of an intermediate-level contributor;
one or more outputs comprising:
a proof-of-receipt challenge for an intermediate-level contribution,
a transaction signature challenge for a receiving entity, and
a discretionary signature verifiable based on a private key of the higher-level contributor and a proof of the intermediate-level contribution, the proof of the higher-level contribution being the higher-level contribution or a hash thereof, wherein the blockchain transaction does not contain the proof of the higher-level contribution;
wherein at least the proof-of-receipt challenge and the transaction signature challenge are comprised in an output of the one or more outputs, which is spendable independently of the discretionary signature.

* * * * *